(12) United States Patent
Scodary et al.

(10) Patent No.: US 12,132,866 B2
(45) Date of Patent: Oct. 29, 2024

(54) CONFIGURABLE DYNAMIC CALL ROUTING AND MATCHING SYSTEM

(71) Applicant: Gridspace Inc., San Francisco, CA (US)

(72) Inventors: Anthony Scodary, Los Angeles, CA (US); Nicolas Benitez, Los Angeles, CA (US); Adam Miller, Los Angeles, CA (US)

(73) Assignee: Gridspace Inc., San Francisco, CA (US)

( * ) Notice: Subject to any disclaimer, the term of this patent is extended or adjusted under 35 U.S.C. 154(b) by 860 days.

(21) Appl. No.: 17/062,083

(22) Filed: Oct. 2, 2020

(65) Prior Publication Data

US 2021/0021709 A1   Jan. 21, 2021

Related U.S. Application Data

(63) Continuation-in-part of application No. 15/653,411, filed on Jul. 18, 2017, now Pat. No. 10,861,436.

(60) Provisional application No. 62/378,778, filed on Aug. 24, 2016.

(51) Int. Cl.
    *H04M 3/523* (2006.01)
(52) U.S. Cl.
    CPC ................ *H04M 3/5233* (2013.01)
(58) Field of Classification Search
    CPC ................................. H04M 3/5233
    USPC .................................... 379/266.01
    See application file for complete search history.

(56) References Cited

U.S. PATENT DOCUMENTS

| 5,918,222 | A | 6/1999 | Fukui et al. |
|---|---|---|---|
| 8,538,987 | B1 | 9/2013 | McBride et al. |
| 8,972,243 | B1 | 3/2015 | Strom et al. |
| 9,413,891 | B2 | 8/2016 | Dwyer et al. |
| 10,332,508 | B1 | 6/2019 | Hoffmeister |
| 2002/0131399 | A1* | 9/2002 | Philonenko ......... H04M 3/5232 370/411 |
| 2005/0246165 | A1 | 11/2005 | Pettinelli et al. |
| 2009/0006085 | A1 | 1/2009 | Horvitz et al. |
| 2010/0036660 | A1 | 2/2010 | Bennett |
| 2011/0238407 | A1 | 9/2011 | Kent |
| 2013/0185057 | A1 | 7/2013 | Yoon et al. |
| 2013/0262096 | A1 | 10/2013 | Wilhelms-Tricarico et al. |
| 2014/0067375 | A1 | 3/2014 | Wooters |
| 2014/0112556 | A1 | 4/2014 | Kalinli-Akbacak |
| 2014/0180675 | A1 | 6/2014 | Neuhauser et al. |
| 2014/0249799 | A1 | 9/2014 | Yih et al. |
| 2015/0012271 | A1 | 1/2015 | Peng et al. |
| 2015/0066496 | A1 | 3/2015 | Deoras et al. |
| 2015/0179170 | A1 | 6/2015 | Sarikaya et al. |
| 2015/0195406 | A1 | 7/2015 | Dwyer et al. |
| 2016/0316059 | A1 | 10/2016 | Nuta et al. |
| 2016/0337776 | A1 | 11/2016 | Breebaart et al. |
| 2016/0352902 | A1 | 12/2016 | Raanani et al. |

(Continued)

*Primary Examiner* — Ahmad F. Matar
*Assistant Examiner* — Jirapon Tulop
(74) *Attorney, Agent, or Firm* — Rowan TELS LLC

(57) ABSTRACT

A call flow manager includes a graph of connected nodes implementing a call center routing flow, and corresponding views for examining and modifying the nodes and graph. The call flow manager implements a set of fundamental node types, with complexity and behavior encapsulated within the nodes. The nodes process calls and add tags to the calls that may be utilized in downstream nodes of the call flow.

10 Claims, 42 Drawing Sheets

(56) References Cited

U.S. PATENT DOCUMENTS

| | | |
|---|---|---|
| 2016/0379632 A1 | 12/2016 | Hoffmeister et al. |
| 2017/0013124 A1 | 1/2017 | Havelka et al. |
| 2017/0047063 A1 | 2/2017 | Ohmura et al. |
| 2017/0068976 A1* | 3/2017 | Wawrzynowicz .. H04M 3/5175 |
| 2017/0214799 A1 | 7/2017 | Perez et al. |
| 2018/0052842 A1 | 2/2018 | Hewavitharana et al. |

* cited by examiner

CONFIGURABLE DYNAMIC CALL ROUTING AND MATCHING SYSTEM

CROSS-REFERENCE TO RELATED APPLICATIONS

This application claims priority and benefit as a continuation-in-part of U.S. application Ser. No. 15/653,411, titled AUDIO CALL CLASSIFICATION AND SURVEY SYSTEM, filed on Jul. 18, 2017, the contents of which are incorporated herein by reference in their entirety. Application Ser. No. 15/653,411, claims priority and benefit under 35 USC 119(e) to U.S. Application Ser. No. 62/378,778, titled AUDIO CALL CLASSIFICATION AND SURVEY SYSTEM, filed on Aug. 24, 2016, the contents of which are also incorporated by reference herein in their entirety.

BACKGROUND

Conventional communication system metric controls include quality assurance (QA) metrics, customer satisfaction metrics (CSAT), and the net promoter score (NPS). These metric controls share two drawbacks when applied as feedback to adapt the system: rarity and uniformity. Conventional metric controls may rely on a random and/or low-frequency sampling of inputs from different processing agents in the system. This may result in a sparse signal for adapting agent and system behavior.

It is thus advantageous to generate adaptive controls from a greater percentage (or from all) inputs, and therefore provide a more responsive and precise feedback control for communication systems. Traditional metric controls may be noisy and bimodal, often limiting the usefulness and accuracy of singular measurements.

Call centers are increasingly utilized by organization for many reasons related to servicing customer inquiries and problems. Call centers are a key point of contact between large organizations and their customers, and therefor organizations are increasingly concerned with the quality of service provided to callers and to efficiency of call center operations.

A growing area of interest by organizations is therefor the improvement of call center service and efficiency, including the efficient and accurate allocation of resources such as agents to calls.

Many call systems have sparse data about as to which calls went well across their tracked metrics. Common metrics include quality metrics, such as was a successful outcome reached, was the call agent competent, etc., and matching human survey results, such as quality assurance audits, customer survey results, etc. In general, to determine these metrics, humans listen to and manually provide feedback, which may be cost ineffective and time consuming.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
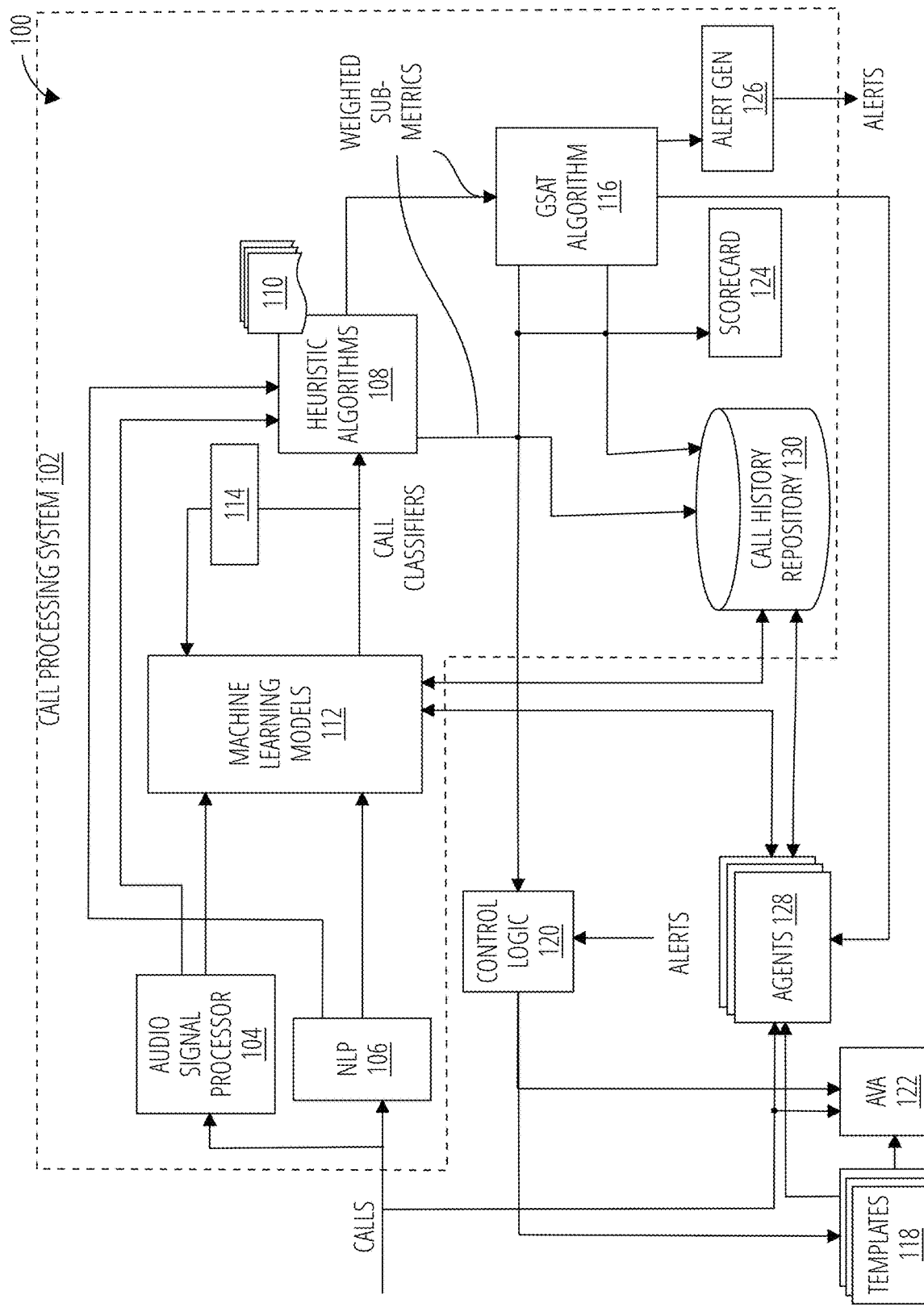
FIG. 1 depicts a communication system 100 in accordance with one embodiment.

Embodiments of a communication system are disclosed utilizing metric controls generated using a combination of audio signal processing, natural language processor (NLP) transcription, machine learning models, and heuristic algorithms. The metric controls may be applied to adapt the system toward higher efficiency and accuracy when processing calls. The system may generate aggregate metric controls in the form of an automated ensemble of programmatic statistical models. The system provides adaptive feedback responsive to more and more frequent inputs than do conventional communication systems, so that corrective action may be applied for exceptional situations and so that processing agents and components operative in the system receive a continuous adaptive feedback control that enables more rapid correction and improvement of call processing. The system may provide more stable metric controls to more accurately compare performance between system agents, components, and/or groups and combinations thereof.

In another aspect the system may include global configuration settings for controlling a reference time frame for time series graphs of various operational metrics that are plotted against historical values on a corresponding time frame. Exemplary time frame settings may in one embodiment include:

Yesterday
A week ago
This day a month ago
Average for a particular day of the week
Average for any day of the week
Whether to utilize raw values for metrics or utilize change rates for the metrics for control, reports, user interfaces, and visualizations.

In some aspects, a communication system for processing a call includes control logic and at least one machine learning model generating call classifiers from outputs of an audio signal processor and a natural language processor operated on the call. Heuristic logic transforms the call classifiers into weighted sub-metrics for the call, and aggregate normalized Gaussian logic transforms the weighted sub-metrics into a metric control that may be applied as a feedback signal to adapt the operation of the control logic. The control logic in turn may adapt the behavior of the automated voice attendant or a template utilized in a call flow.

In other aspects, an alert generator in a communication system for processing a call includes at least one machine learning model generating call classifiers from outputs of an audio signal processor and a natural language processor configure to operate on the call. Heuristic logic is configured to transform the call classifiers into a plurality of weighted sub-metrics for the call, and aggregate normalized Gaussian logic is configured to transform the weighted sub-metrics into a metric control. A threshold analyzer is configured to generate an alert signal to the communication system based on the metric control meeting a condition.

In other aspects, the alert generator includes an anomaly detector configured to identify anomalous calls. In some embodiments, the alert signal configures the communication system for priority response to the condition. In some embodiments, the alert signal is associated with portions of the call comprising content that contributed to activation of the alert signal. The call may be an active call or a recorded call. In some embodiments, the alert generator incorporates a learning function utilizing a call history and one or more of the weighted sub-metrics and the metric control.

In other aspects, a communication system for processing a call includes a scorecard user interface display, at least one machine learning model generating call classifiers from outputs of an audio signal processor and a natural language processor configured to operate on the call, heuristic logic configured to transform the call classifiers into a plurality of weighted sub-metrics for the call, and aggregate normalized Gaussian logic to transform the weighted sub-metrics into a metric control, the metric control applied as feedback to adapt control logic of the communication system. The scorecard interface is operable to select a target and an indication of the metric control to apply for the target, and to apply the metric control to generate and display a historical performance visualization and a performance feed of the metric for the target.

Disclosed herein are embodiments of a call flow manager that may be utilized in conjunction with aspects of said communication systems. In some aspects, the call flow manager includes a graph of connected nodes implementing a call center routing flow, and corresponding views for examining and modifying the nodes and graph. The call flow manager implements a set of fundamental node types, with complexity and behavior encapsulated within the nodes. Routes in the call flow, and hence the graphs, may be cyclic. Call flow is primarily defined by adding and removing child nodes to and from existing nodes.

Calls may be tagged with routing tags, either by outcomes determined by bot nodes, by a call classification system, or by agents. An exemplary routing tag is LANGUAGE: SPANISH for callers that speak Spanish. Agents may be tagged with agent tags. An exemplary agent tag is STATE: NEW MEXICO CAR INSURANCE for an agent qualified to handle New Mexico car insurance calls. Queues may also have tags. When a caller enters a queue, they temporarily receive all the tags of the queue. For instance, a queue may be tagged NEW ACCOUNT: TRUE if the caller has just created their account. However, once the call is routed out of the queue, the call loses that tag. In one embodiment, there is a default tag called QUEUE: <QUEUE-NAME> that is always applied.

In one embodiment, tags may have one or multiple values and a single key. Every call, agent, and queue may have zero, one, or multiple values selected. For instance, an agent may speak English and Spanish. In some cases only one or no value may be set for a given key.

If an agent or call has multiple values set for a tag key, then any one property may be sufficient for a match. For example, if an agent has LANGUAGE: SPANISH and LANGUAGE: ENGLISH values set, they may handle either Spanish or English calls. If a caller has INTENT: NEW POLICY and INTENT: REMOVE ACCOUNT set, an agent with either tag may take their call (and perhaps later clear that tag). In one embodiment, if no active agents (including busy agents) have all the tags needed to handle a particular call, the caller must be moved from their current queue to a failsafe route. If the failsafe route comprises a queue, the queue becomes a failsafe queue. Failsafe queues have the property that the call is stripped of all its tags (for routing purposes) and only retains the tags of the new queue. This increases the chances that the call is no longer over-constrained, but still enables control over which agents are permitted to handle failsafe calls.

The exemplary embodiments enable a routing management solution that reduces the complexity and management overhead of enterprise ACD systems. The exemplary embodiments may utilize a combination of heuristics and machine learning to match agents based on their historical performance on similar calls.

In one embodiment, if a call is rerouted by an agent, three options are:
1. The agent de-matches with the caller, and the caller is re-matched to any other agent based on match score.
2. The agent routes the caller to another node (e.g., an outlet node) or agent. The agent adds a new "hard" call tag that compels the new node or new agent to service the call.
3. The agent routes the caller to another queue node again with a hard tag.

In the case that hard tags over-constrain matching, the caller may be routed to a failsafe queue node.

A routing history for a call may be generated and stored for later analysis, including 1) routing decisions, and why an agent and caller were matched, and 2) a list of agents and their performance scores for each tag, and for tags that lack sufficient coverage.

Examples of tag-based call routing include but are not limited to the processing of two types of calls, gold and bronze, utilizing two types of agents, gold and bronze. Gold agents can support gold and bronze calls. Bronze agents only support bronze calls. Calls of both types are routed into a single queue. Calls are tagged SUPPORT LEVEL: GOLD or SUPPORT LEVEL: BRONZE. Some agents are tagged with both SUPPORT LEVEL: GOLD and SUPPORT LEVEL: BRONZE. Other agents are only tagged SUPPORT LEVEL: BRONZE. The bootstrap score matches explicit agent tags for support level and callers that are escalated to the same support level. Over time, if the S model is enabled, some agents in the lower, bronze support level may occasionally need to handle gold calls. If they perform comparably to gold agents, they become de facto promoted to gold. If this behavior is undesirable then the user has the option to slide the S model control (in the exemplary embodiments utilizing slider controls) to an acceptably low level.

In some embodiments, a call center creation application may be invoked to configure new call flows or modify existing call flows. One example of actions to create a new call flow is:

Name the call flow
Pick a first inbound phone number
Identify type of call flow to start?
  Bot only
  Bot with recorders and one outlet
  Bot and queues with survey
  Dispatcher with heavy fan-out
  Empty
Identify next action
  Setup call flow nodes
  Add new nodes to flow
  Test call flow and add agents
Invoke the call flow manager In some embodiments a flat list of nodes in a call flow may be provided, that can be filtered by type or by a search query. The list provides the raw settings of each node so that properties like outbound routes or bots may be enumerated and viewed.

In some embodiments, a system includes a communication interface configured to receive a call from a telephony carrier network. The system may be configured with a call flow between the communication interface and one or more of an outlet node and a call hangup node. The call flow may include an inlet node binding a communication address to one or more queue nodes, with at least one of the queue nodes coupled to one of the outlet node and the call hangup node. In one aspect, the call flow also includes at least one bot node. The bot node may configured to route the call to particular child nodes of the bot node according to particular outcomes of the bot node, and to apply tags to the call and route the call to the child nodes based on the applied tags.

In some embodiments, each queue node may include a state forwarding switch to enable or disable the propagation of state information from the queue node to a next node in the call flow, wherein the state includes tags placed on the call at the queue node. The queue node may be configured to perform state forwarding upon one or both of entry to the queue node and exit from the queue node and may be configured with configured with a state forwarding outlet type comprising one of HTTP GET, HTTP POST, email, and SMS, for example. The outlet node may be configured in some embodiments to operate a proxy to continue generating call analytics after routing of the call from the outlet node.

In some embodiments, the queue node may be configured with a priority and/or with tags associating the queue node with properties of a human agent, and/or with a failsafe child node, and/or with a control balancing the contributions of first-in, first-out priority and matching of the call to agent attributes to a service priority of calls in the queue node. In some embodiments, the control may be slide-configurable, and may set parameters α and β of the service priority algorithm set forth in Equation 1. The S model of the service priority algorithm may implement a machine learning model.

In some embodiments, one or more of the queue nodes may be configured to apply an inherent queue tag to the call upon the call entering the queue node, and to remove the queue tag upon exit of the call from the queue node. One or more of the queue nodes may also be configured in some embodiments to apply to the call an agent-provided tag provided by an agent servicing the queue node and retain the agent-provided tag on the call upon the exit of the call from the queue node. In some embodiments, one or more of the queue nodes may be further configured such that if no active agents are assigned agent tags matching tags applied to the call, the call is routed to a configured failsafe route, and on condition that the failsafe route comprises a queue, the queue of the failsafe route is configured as a failsafe queue to strip the call of any of the tags applied to the call that affect routing of the call. In one aspect of some embodiments, the agent-provided tag determines a child node of the queue node to which the call is routed upon the exit of the call from the queue node.

In another aspect, a system extracts useful metrics from spoken conversation, using call grading and call similarity. Call grading extracts important metrics from audio using a combination of direct audio content analysis (how things are said) and analysis of the speech content (words spoken). For the majority of the calls, there are enough examples of that exact type of call (subject, quality, outcome) to very effectively determine the audio and speech aspects of that type of call. For the minority of calls, there may be factors that are relatively rare among the dataset, and extraction of useful metrics may be difficult using call grading alone. In such cases, metrics are retrieved from a similar call to serve as a surrogate. The call grading and call similarity are then weighted, improving confidence in the scoring.

To ensure that the direct call grading and call similarity may be used together and averaged, multiple components of a communication system may utilize the same metrics on the same scale. The metrics may be utilized to track longitudinal histories for audio content by caller, agent, bot, etc. They may also be used in aggregate to track organizational metrics.

Compatibility may also be a concern of the system as the system may be continually trained over time. If the rubrics used to provide human labels change, there may be a temporal bias in the model control structure. Or in severe cases, the model control structure may start to return much less accurate predictions.

In the case that a small dataset may be available to retrain an existing model to a new set of metrics, the bulk of old system may be "freezed" and the final stage of the system may be trained. The original system, in later stages may have a bottleneck stage wherein the system may provide a rich encoding of the audio content before the final predictions. The bottleneck, typically a low-dimensional vector in the system, may be of limited size and, therefore, may efficiently and compactly describe the audio content before providing the final "human-readable" output.

That final transformation, from bottleneck stage to final predictions may often be <1% of the model control structure complexity (and free parameters). As a result, the conversion may be taught with a reduced number of examples. This enable the model to be reused and retrained across different system component and efficiently. In some cases, the bottleneck stage may be a useful output that may be used by organizations.

Call grading may be used in any application where audio content may be analyzed for both semantic and vocal content to measure some set of metrics. Ideal use cases include call centers, conference call systems, internal company meetings, fraud detection, employee training, sales, organizational or legal compliance, and education evaluation.

Human speech differs substantially across domains, cultures, and pretext and all applications may have systems be rebuilt while adhering to the same architecture. Depending the source of audio content, the preconditioning, transcription, and embedding systems may be rebuilt on data from the relevant domains. However, in some cases, metrics may be selected to be general enough to be useful across many different applications, either at the final or bottleneck stage.

A call processing system may physically transform received audio content into a display on a machine, such as a light-emitting device. The display may comprise a grade associated with the audio content received, the displayed grade being useful, concrete, and tangible result of the received audio content. The audio content may represent physical characteristics emitted by a sound producing device, such as a human emitting speech, the physical characteristics including the words spoken and how those words were spoken, and the grade of the machine display is a transformation representing those physical characteristics.

A call processing system may also improve the computerization of a technological process by determining an input for a metric-generating model from a received audio content wherein the audio content is split within the machine into at least two parts, the speech semantic content and the speech vocal content, each of which is then transformed into a vector that may be combined to provide an input, which may be a dense vector, to the metric-generating model.

Specifically, by utilizing multiple model control structures and weighting the results for identifying the speech semantic content from the audio content, identifying the speech vocal content from the audio content, and determining the model control structure from the combined message content, the accuracy, reliability, and quality of the resulting output may be increased. The processing speed of a large data set may be increased by selecting the audio content to which to determine similar audio content, which if applied may also improve the accuracy, reliability, and quality of the resulting computation.

In some embodiments, a slot of a neural network is configured to emphasize a portion of the received audio content, resulting in an enhanced analysis of portions of the audio content that are determined to be more important to a metric.

FIG. 1 depicts a communication system 100 in one embodiment. Calls are received by a call processing system 102, analyzed and processed using audio signal processor 104 and a natural language processor 106, and results of the analysis and processing are provided to heuristic algorithms 108. The heuristic algorithms 108 apply weights 110 to call classifiers generated by machine learning models 112 utilizing one or more learning function 114. The heuristic algorithms 108 may also operate on outputs from the audio signal processor 104 and natural language processor 106. The machine learning models 112 may in one embodiment comprise an ensemble learning model.

The weighted sub-metrics are input to a GSAT algorithm 116 that generates aggregate metric controls, in particular normalized aggregate Gaussian metric controls. Herein "GSAT" refers to a normalized aggregate Gaussian metric. The GSAT metric controls are applied as a feedback signal to the call processing system 102 to adapt one or more of templates 118, call processing control logic 120, agent behavior, and the behavior of one or more automated voice attendant 122. The GSAT metric controls and weighted sub-metrics may be provided in various form to a scorecard display interface 124. The GSAT metric controls and possibly the weighted sub-metrics may also be utilized by an alert generator 126 that may raise an alert on the scorecard display interface 124 for anomalous calls.

The GSAT metric controls may also be utilized by the agents 128 and other components (e.g., automated voice attendant 122) in real-time (existing call in progress) to adapt their behavior when processing and responding to calls. A call history repository 130 stores call transcripts, raw audio, weighted sub-metrics, and GSAT metric controls (as well as other information, potentially) for use by other components of the communication system 100, for example for use in machine learning and reporting on agent, call, site, and team performance.

Exemplary sub-metrics that the heuristic algorithms 108 may generate are provided in Table 1 below.

TABLE 1

| Sub-metric | Description | Target |
|---|---|---|
| callback_signature | An indication the caller must callback later | Low is good |
| caller_cross_talk_percentage | How much the caller interrupted the agent | Low is good |
| silence_percentage | How much dead air the call contained | Low is good |
| agent_politeness | How polite the agent was | High is good |
| agent_cross_talk_percentage | How much the agent interrupted the caller | Low is good |
| caller_average_syllables | Average syllables per word used by the caller | Eccentric is bad |
| caller_word_count | Number of words used by the caller | Eccentric is bad |
| word_count | Number of words in the call | Eccentric is bad |
| agent_misunderstand_rate | Rate at which the agent asks the caller for clarification | Low is good |
| agent_empathy_rate | Indications the agent expresses sympathy for the caller | High is good |
| agent_valence_trend | Improvement in emotional valence over the course of the call for the agent | High is good |
| agent_average_syllables | Average syllables per word used by the agent | Eccentric is bad |
| caller_sentence_length | Average number of words per sentence used by the agent | Eccentric is bad |
| caller_valence_trend | Improvement in emotional valence over the course of the call for the caller | High is good |
| filler_word_rate | Rate of occurrence of filler words in the call | Low is good |
| agent_discovery_questions | The agent uses discovery questions to learn more about the caller's situation | High is good |
| agent_talk_time_s | The duration of agent talk time | Eccentric is bad |
| caller_gunning_fog | A measure of language complexity | Eccentric is bad |
| caller_flesch_reading_ease | A measure of language complexity | Eccentric is bad |
| question_rate | Rate at which questions are asked in the call | High is good |
| caller_question_rate | Rate at which questions are asked by the caller in the call | High is good |
| agent_talk_time_ratio | The ratio of agent to caller talk time | Low is good |
| caller_informality | The use of informal language by the caller | Eccentric is bad |
| caller_discovery_questions | The caller uses discovery questions to learn more | High is good |
| caller_misunderstand_rate | The rate at which the caller misunderstands the agent | Low is good |
| agent_average_emotion_valence | The average emotional valence of the agent | High is good |
| agent_flesch_reading_ease | A measure of language complexity | Eccentric is bad |
| confirmation_rate | The rate at which actions are confirmed | High is good |
| agent_informality | The use of informal language by the agent | Eccentric is bad |
| agent_question_rate | The rate at which the agent asks questions | High is good |
| empathy_valence_correlation | A measure of empathy measuring the relatedness of the agent and caller emotional valence | High is good |
| agent_wpm | The rate at which the agent spoke | Eccentric is bad |
| cross_talk_percentage | How much of the call had the parties speaking over each other | Los is good |
| agent_word_count | The number of words the agent spoke in the call | Eccentric is bad |
| resolution_signature | An indication the call was resolved | High is good |
| caller_average_emotion_valence | The average emotion of the caller | High is good |
| agent_filler_word_rate | The number of filler words used by the agent | Low is good |
| caller_wpm | The rate at which the caller spoke | Eccentric is bad |

TABLE 1-continued

| Sub-metric | Description | Target |
|---|---|---|
| agent_complexity | An overall measure of complexity in the agent's speech | Eccentric is bad |
| caller_talk_time_s | The duration of caller talk time | Eccentric is bad |
| wpm | The overall rate of speech in the call | Eccentric is bad |
| agent_competence | Indications the agent is competent | High is good |
| agent_sentence_length | The average number of words used in a sentence by the agent | Eccentric is bad |
| greeting_signature | An indication the agent properly greeted the caller | High is good |
| average_emotion_valence | The average emotion of the call | High is good |
| caller_empathy_rate | Indication the caller showed empathy for the agent | High is good |
| caller_complexity | An overall measure of complexity in the caller's speech | Eccentric is bad |
| caller_competence | Indications the caller showed awareness of their own situation | High is good |
| caller_filler_word_rate | Use of filler words by the caller | Low is good |
| valence_trend | The overall trend in the emotional valence in the call | High is good |
| agent_gunning_fog | A measure of language complexity | Eccentric is bad |
| caller_politeness | How polite was the caller to the agent | High is good |

One of ordinary skill in the art will appreciate that the sub-metrics in Table 1 may be computed using a number of techniques known in the art. For example, machine learning models (e.g., deep neural networks) may be utilized to predict metrics directly as classifiers, either per-utterance (a segment of an audio call) or over the full call. If computed per utterance, it is then summed and a maximum, minimum, mean, average, or some other descriptive statistic is computed. Statistical models may also be utilized downstream of one or more machine learning model, or on a time series output of a model. An example of this technique is computing the slope of the best fit curve of emotional valence (itself a model output). Statistical natural language processing techniques may also be utilized. For example, precomputed weights for different words and phrases may be implemented in a lookup table, and a word-trie data structure generated to efficiently count occurrences of words and phrases, weighted by configured coefficients. An example is counting all the filler words ("umm", "you know"), with different penalties assigned per filler word/phrase based on rarity or severity.

Exemplary weights for the sub-metrics in the control metric calculations are given in Table 2 below. One of ordinary skill in the art will appreciate that these weights may be computed in multiple ways known in the art. One technique utilizes linear regression for a given metric against a different metric of call quality (ground truth sources such as human labelers, CSAT, NPS, or a custom QA score, or some combination of several ground truth sources). The linear regression produces an indication of how much each model should be weighted. Metrics may also be weighted more based on their accuracy. With regards to including accuracy and statistical independence, an ensemble model averaging and boosting technique may be utilized, in manners known in the art.

TABLE 2

| | |
|---|---|
| callback_signature | 0.6493506494 |
| caller_cross_talk_percentage | 0.6493506494 |

TABLE 2-continued

| | |
|---|---|
| silence_percentage | 6.493506494 |
| agent_politeness | 6.493506494 |
| agent_cross_talk_percentage | 0.6493506494 |
| caller_average_syllables | 0 |
| caller_word_count | 0.6493506494 |
| word_count | 0 |
| agent_misunderstand_rate | 0.6493506494 |
| agent_empathy_rate | 1.298701299 |
| agent_valence_trend | 0.6493506494 |
| agent_average_syllables | 0 |
| caller_sentence_length | 0 |
| caller_valence_trend | 1.948051948 |
| filler_word_rate | 0 |
| agent_discovery_questions | 1.298701299 |
| agent_talk_time_s | 0.6493506494 |
| caller_gunning_fog | 0 |
| caller_flesch_reading_ease | 0.6493506494 |
| question_rate | 1.948051948 |
| caller_competence | 0 |
| agent_talk_time_ratio | 3.246753247 |
| caller_informality | 0.6493506494 |
| caller_discovery_questions | 0.6493506494 |
| caller_misunderstand_rate | 3.246753247 |
| agent_average_emotion_valence | 1.298701299 |
| agent_flesch_reading_ease | 0.6493506494 |
| confirmation_rate | 0.6493506494 |
| agent_informality | 0.6493506494 |
| agent_question_rate | 1.948051948 |
| empathy_valence_correlation | 1.948051948 |
| agent_wpm | 6.493506494 |
| cross_talk_percentage | 6.493506494 |
| agent_word_count | 1.298701299 |
| resolution_signature | 3.246753247 |
| caller_average_emotion_valence | 3.246753247 |
| agent_filler_word_rate | 9.74025974 |
| caller_wpm | 0 |
| agent_complexity | 1.948051948 |
| caller_talk_time_s | 0 |
| wpm | 0.6493506494 |
| agent_competence | 1.298701299 |
| agent_sentence_length | 0.6493506494 |
| greeting_signature | 3.246753247 |
| average_emotion_valence | 12.98701299 |

TABLE 2-continued

| | |
|---|---|
| caller_empathy_rate | 0.6493506494 |
| caller_complexity | 0.6493506494 |
| caller_filler_word_rate | 0.6493506494 |
| valence_trend | 0.6493506494 |
| agent_gunning_fog | 1.298701299 |
| caller_politeness | 3.246753247 |
| caller_question_rate | 1.948051948 |

The distribution of each sub-metric may be independently determined over a large sample size of calls.

The alert generator 126 generates an alert to a system operator on condition that a set of one or more calls that have been detected by models that look for particularly alarming and/or anomalous situations that require special and possibly urgent handling. In one embodiment the alert generator 126 is configured with alert condition (condition settings 202) by weighting a large set of empirically discovered call content patterns based on their historical predictiveness in labelled (training set) calls. Additional weight is assigned based on where in the call the pattern occurs, its rarity, and the outputs of emotion valence models.

While such calls may not always be truly urgent, they are anomalous and unusually likely to require escalation. Each call reported in the set may in one embodiment comprise the following attributes:

State of the call (live or completed)
Agent name and org chart
Excerpts from the most anomalous parts of the call
The phone number and name of the caller
The ability to live listen or review recording snippets from the call
A navigation control to the conversation view
Date/time of the call, if not live
A control to snooze or dismiss alerts that are non-emergent.

Figure 2:
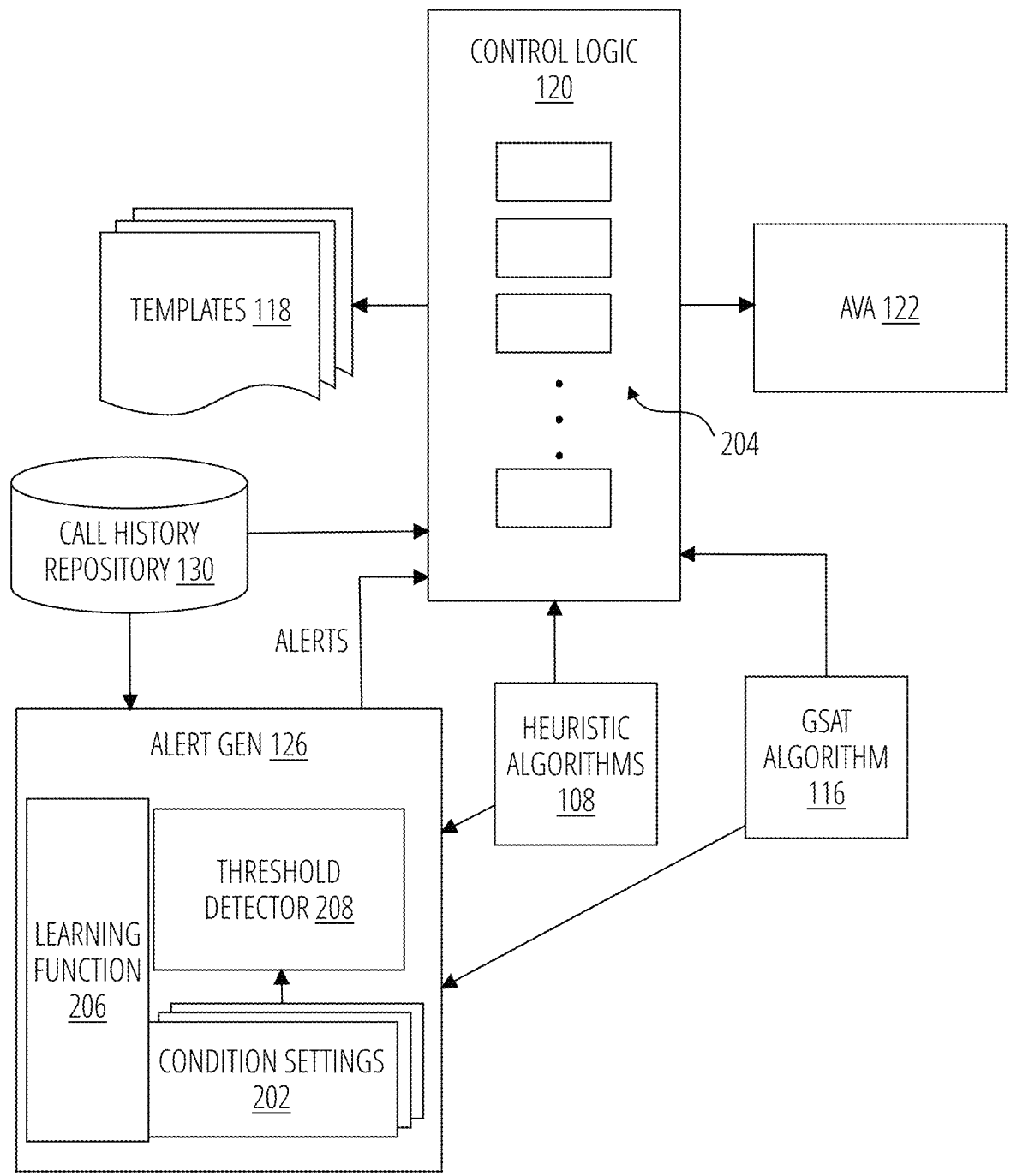
FIG. 2 depicts additional aspects of the communication system 100 in accordance with one embodiment.

Certain systemic metrics may be determined and displayed to a system operator (e.g., on a system-wide view of the scorecard display interface 124), such as:

Number of calls processed in the present day
Call resolution rate
Number of active calls
Whether the system is active
Average GSAT metric control for the system FIG. 2 depicts additional aspects of the communication system 100 in one embodiment. The call processing control logic 120 comprises an ensemble of machine learning models 204 utilized to control the behavior of agents and/or the automated voice attendant 122, and/or to determine the content of templates 118 used thereby. Other embodiments may utilize a single machine learning model rather than an ensemble.

The machine learning models 204 receive the GSAT metric controls (for an agent, automated voice attendant, team, or site) from the GSAT algorithm 116 and the weighted sub-metrics from the heuristic algorithms 108. The call processing control logic 120 identifies calls for which information is stored in the call history repository 130 that match characteristics of a particular call (either a completed call or an in-process call) and identifies those calls having more desirable GSAT metric controls and/or weighted sub-metrics. Such superior calls may indicate improved agent and/or automated voice attendant 122 performance as compared to the particular call. Differences between agent/automated voice attendant 122 behavior on those superior calls may be applied as a learning function to the machine learning models 204 to improve agent/automated voice attendant 122/templates 118 performance on the particular call, if ongoing, or on future calls for a particular agent/automated voice attendant 122/team/site.

The alert generator 126 may in one embodiment comprise a learning function 206 and a threshold detector 208 responsive to configured condition settings 202. If one or more metrics meets the condition settings 202, an alert is generated to the system, which may respond to the alert on a priority basis (meaning the alert receives a high priority for remediation over other tasks in the system). The threshold detector 208 may be implemented as or may utilize a learning function 206 to learn c/all content patterns, metrics, and sub-metrics, and/or combinations thereof, constituting an alert condition, over time and as more calls are processed.

Figure 3:
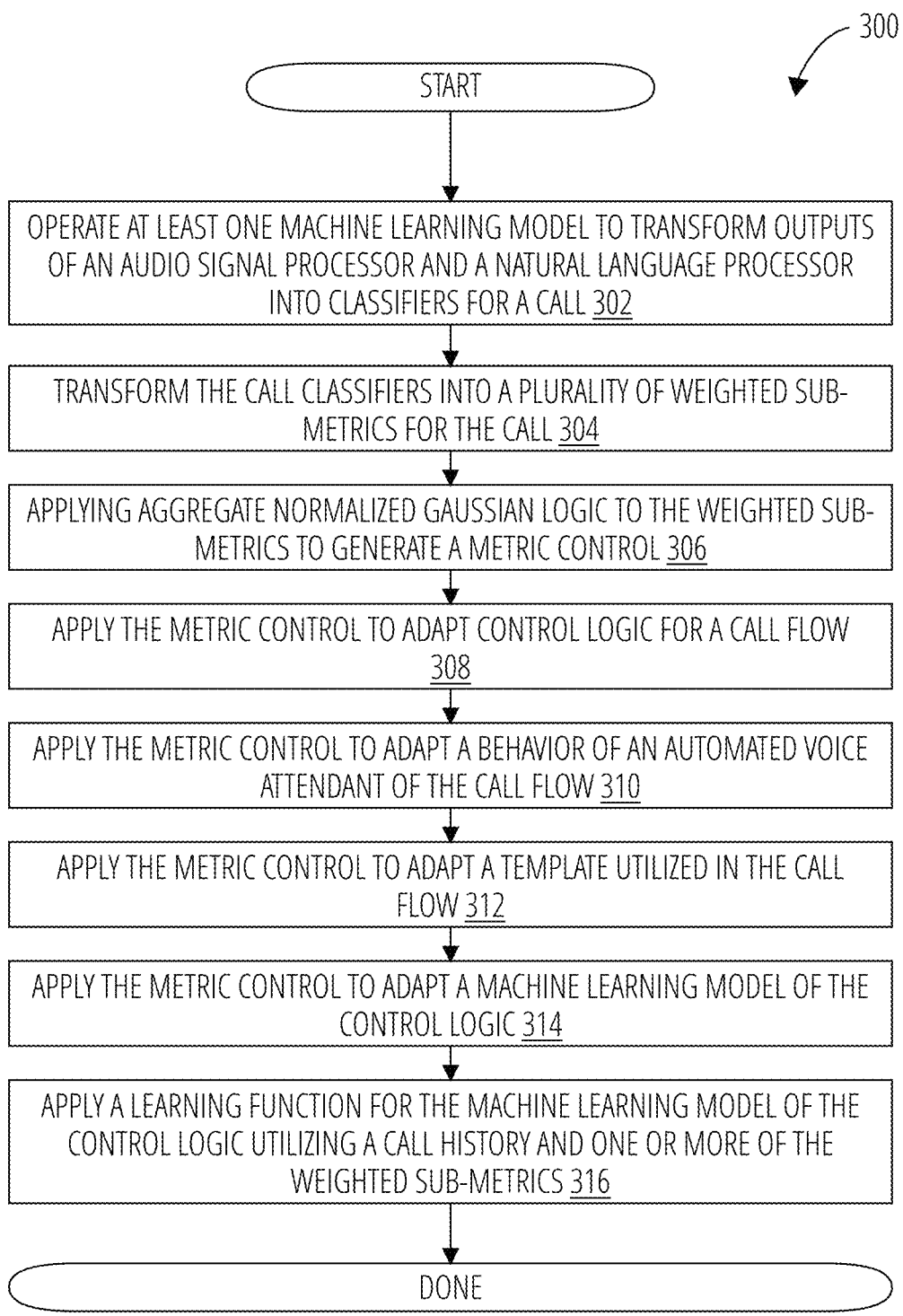
FIG. 3 depicts a call flow process 300 in accordance with one embodiment.

FIG. 3 depicts a call flow process 300 in one embodiment. In block 302, the call flow process 300 operates at least one machine learning model to transform outputs of an audio signal processor and a natural language processor into classifiers for a call. In block 304, the call flow process 300 transforms the call classifiers into a plurality of weighted sub-metrics for the call. In block 306, the call flow process 300 applies aggregate normalized Gaussian logic to the weighted sub-metrics to generate a metric control. In block 308, the call flow process 300 applies the metric control to adapt control logic for a call flow. In block 310, the call flow process 300 applies the metric control (e.g., via the control logic) to adapt a behavior of an automated voice attendant of the call flow. In block 312, the call flow process 300 applies the metric control to adapt a template utilized in the call flow.

In block 314, the call flow process 300 specifically applies the metric control to adapt a machine learning model of the control logic. In block 316, the call flow process 300 applies a learning function for the machine learning model of the control logic utilizing a call history and one or more of the weighted sub-metrics.

Figure 4:
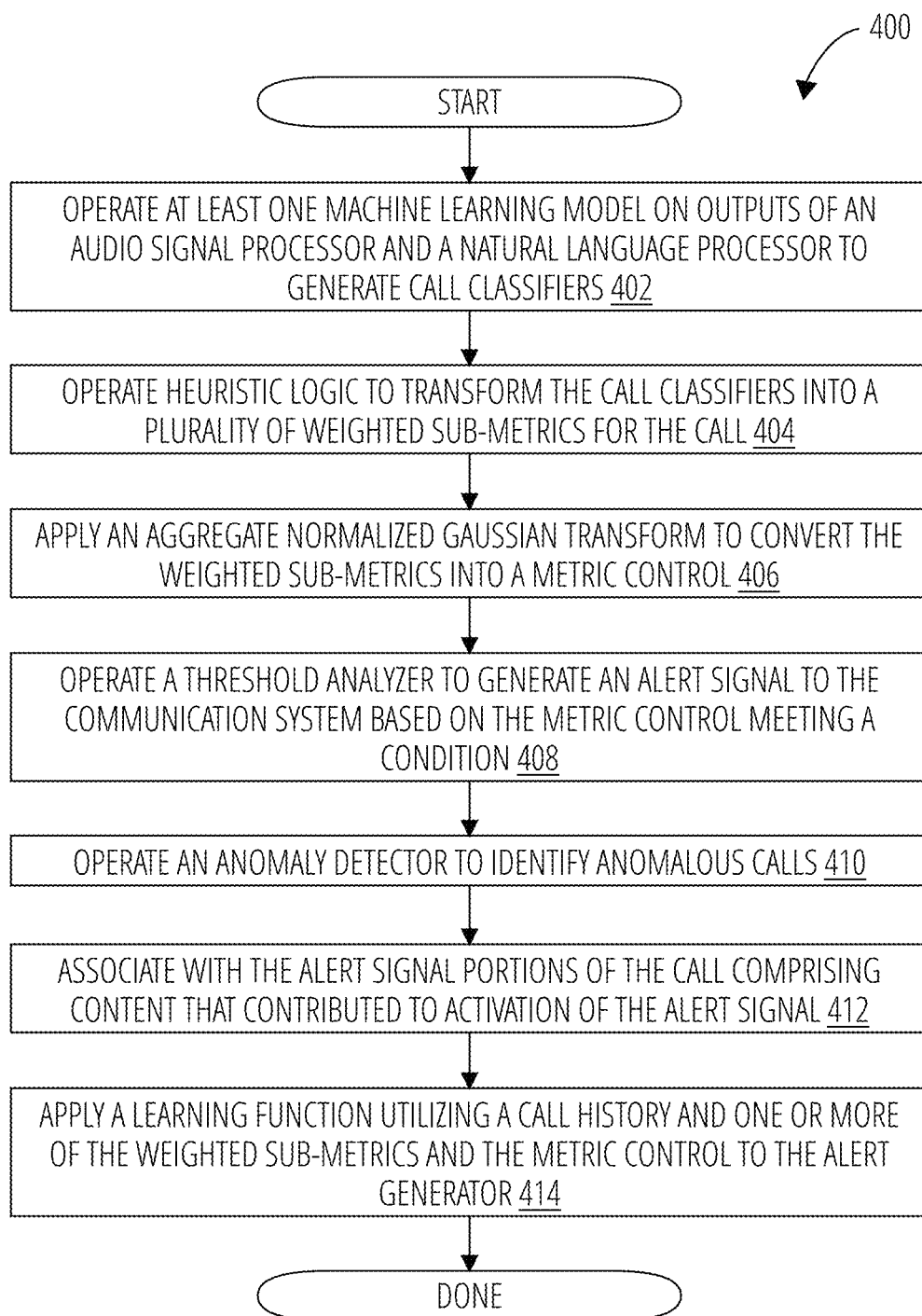
FIG. 4 depicts an alert generation process 400 for processing a call in accordance with one embodiment.

FIG. 4 depicts an alert generation process 400 in one embodiment. In block 402, the alert generation process 400 operates at least one machine learning model on outputs of an audio signal processor and a natural language processor to generate call classifiers. In block 404, the alert generation process 400 operates heuristic logic to transform the call classifiers into a plurality of weighted sub-metrics for the call. In block 406, the alert generation process 400 applies an aggregate normalized Gaussian transform to convert the weighted sub-metrics into a metric control. In block 408, the alert generation process 400 operates a threshold analyzer to generate an alert signal to the communication system based on the metric control meeting a condition. In block 410, the alert generation process 400 operates an anomaly detector to identify anomalous calls. In block 412, the alert generation process 400 associates with the alert signal portions of the call comprising content that contributed to activation of the alert signal. In block 414, the alert generation process 400 applies a learning function utilizing a call history and one or more of the weighted sub-metrics and the metric control to the alert generator.

Treated as Gaussian-distributed random variables, measured values of each sub-metric may be converted to a percentile (e.g., valued between 0 and 100). Exemplary percentiles are depicted in Table 3.

TABLE 3

| sub-metric | mean | standard deviation |
|---|---|---|
| callback_signature | 0.002193350031 | 0.004324431647 |
| caller_cross_talk_percentage | 3.689861059 | 2.85944121 |
| silence_percentage | 21.48067966 | 20.55663798 |
| agent_politeness | 0.01127338096 | 0.01250224712 |
| agent_cross_talk_percentage | 4.205988008 | 3.476569507 |
| caller_average_syllables | 1.376697396 | 0.2479577472 |
| caller_word_count | 499.387 | 578.6667493 |
| word_count | 1163.2747 | 1194.481232 |
| agent_misunderstand_rate | 0.0002851493887 | 0.001207464601 |
| agent_empathy_rate | 0.01162022015 | 0.009118521139 |
| agent_valence_trend | −3.267964598 | 286.4869979 |
| agent_average_syllables | 1.298399398 | 0.215599697 |
| caller_sentence_length | 7.532632466 | 4.819205579 |
| caller_valence_trend | 10.02206373 | 118.4065939 |
| filler_word_rate | 0.08005463167 | 0.02589997164 |
| agent_discovery_questions | 0.003339509384 | 0.005429121433 |
| agent_talk_time_s | 215.3785086 | 230.766088 |
| caller_gunning_fog | 6.1270145 | 1.948530848 |
| caller_flesch_reading_ease | 75.35869064 | 22.44912271 |
| question_rate | 0.01645719626 | 0.0086567448 |
| caller_competence | 0.003747600088 | 0.005428752546 |
| agent_talk_time_ratio | 1.615067846 | 4.474575973 |
| caller_informality | 0.02604208658 | 0.02097130745 |
| caller_discovery_questions | 0.001614181762 | 0.00394113975 |
| caller_misunderstand_rate | 0.0004285179372 | 0.001450411971 |
| agent_average_emotion_valence | 0.05528624287 | 0.08072299585 |
| agent_flesch_reading_ease | 79.47043234 | 21.66858029 |
| confirmation_rate | 0.003527068719 | 0.004091087222 |
| agent_informality | 0.0220819607 | 0.02005130022 |
| agent_question_rate | 0.01661280491 | 0.01147638111 |
| empathy_valence_correlation | 0.05725664056 | 0.1847449595 |
| agent_wpm | 134.4429625 | 37.31875648 |
| cross_talk_percentage | 7.895849067 | 4.873520869 |
| agent_word_count | 663.8877 | 677.136768 |
| resolution_signature | 0.001632720409 | 0.003495219312 |
| caller_average_emotion_valence | 0.005794915196 | 0.08961372947 |
| agent_filler_word_rate | 0.08232557671 | 0.03282836458 |
| caller_wpm | 123.7567286 | 29.71801835 |
| agent_complexity | 7.204628287 | 2.692614303 |
| caller_talk_time_s | 163.1467771 | 190.0271048 |
| wpm | 130.5603541 | 26.60579896 |
| agent_competence | 0.005742123748 | 0.005684128342 |
| agent_sentence_length | 8.958165494 | 6.342409902 |
| greeting_signature | 0.007264860666 | 0.04195415668 |
| average_emotion_valence | 0.03046022953 | 0.06132025738 |
| caller_empathy_rate | 0.007908821427 | 0.009257031699 |
| caller_complexity | 6.77222244 | 3.452068014 |
| caller_filler_word_rate | 0.07822705185 | 0.03586952342 |
| valence_trend | 7.387552309 | 26.42199593 |
| agent_gunning_fog | 7.51933221 | 2.620387456 |
| caller_politeness | 0.01005231037 | 0.01611117146 |
| caller_question_rate | 0.01642370127 | 0.01174526709 |

Figure 5:
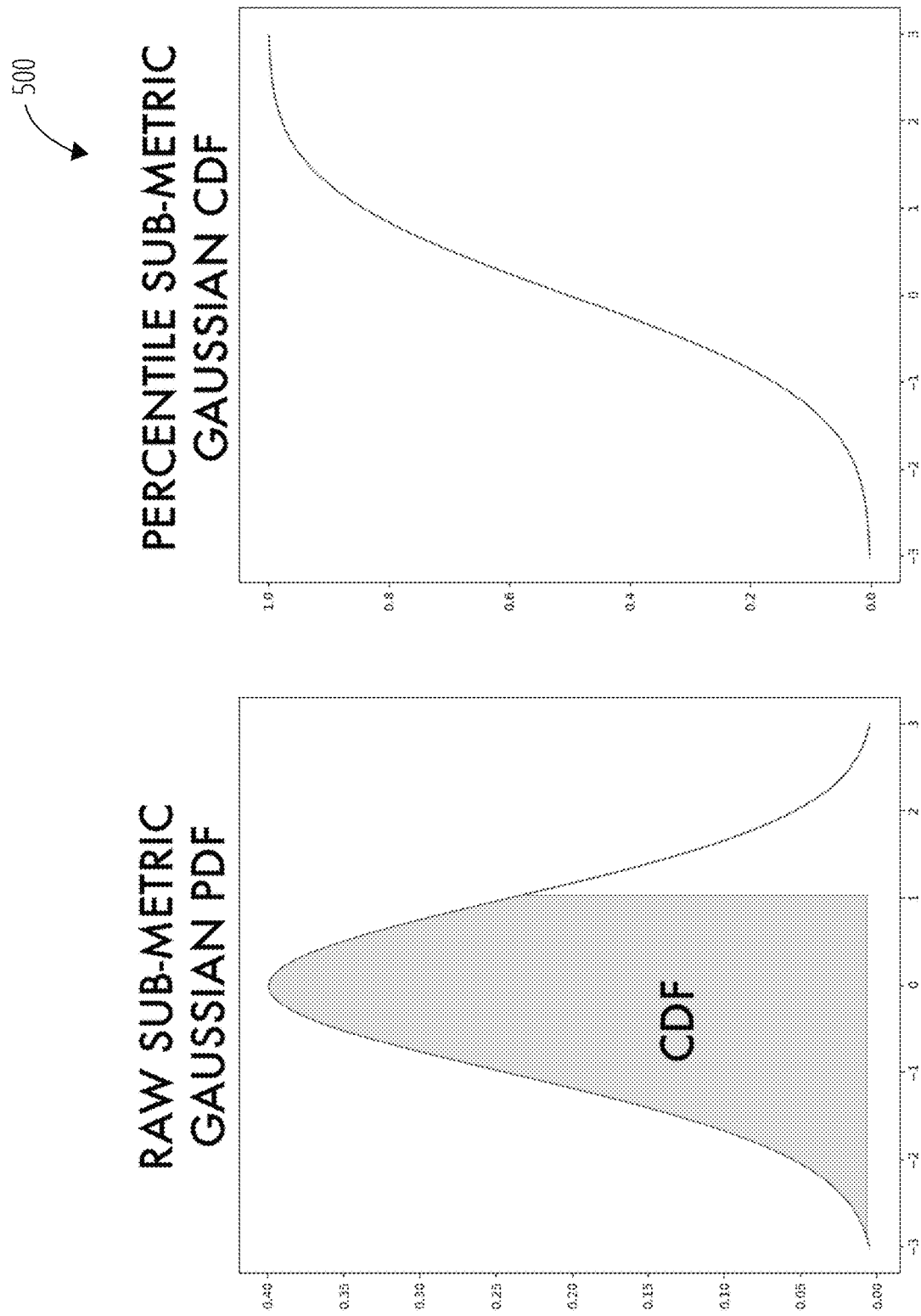
FIG. 5 depicts a Gaussian cumulative distribution function 500 in accordance with one embodiment.
Figure 6:
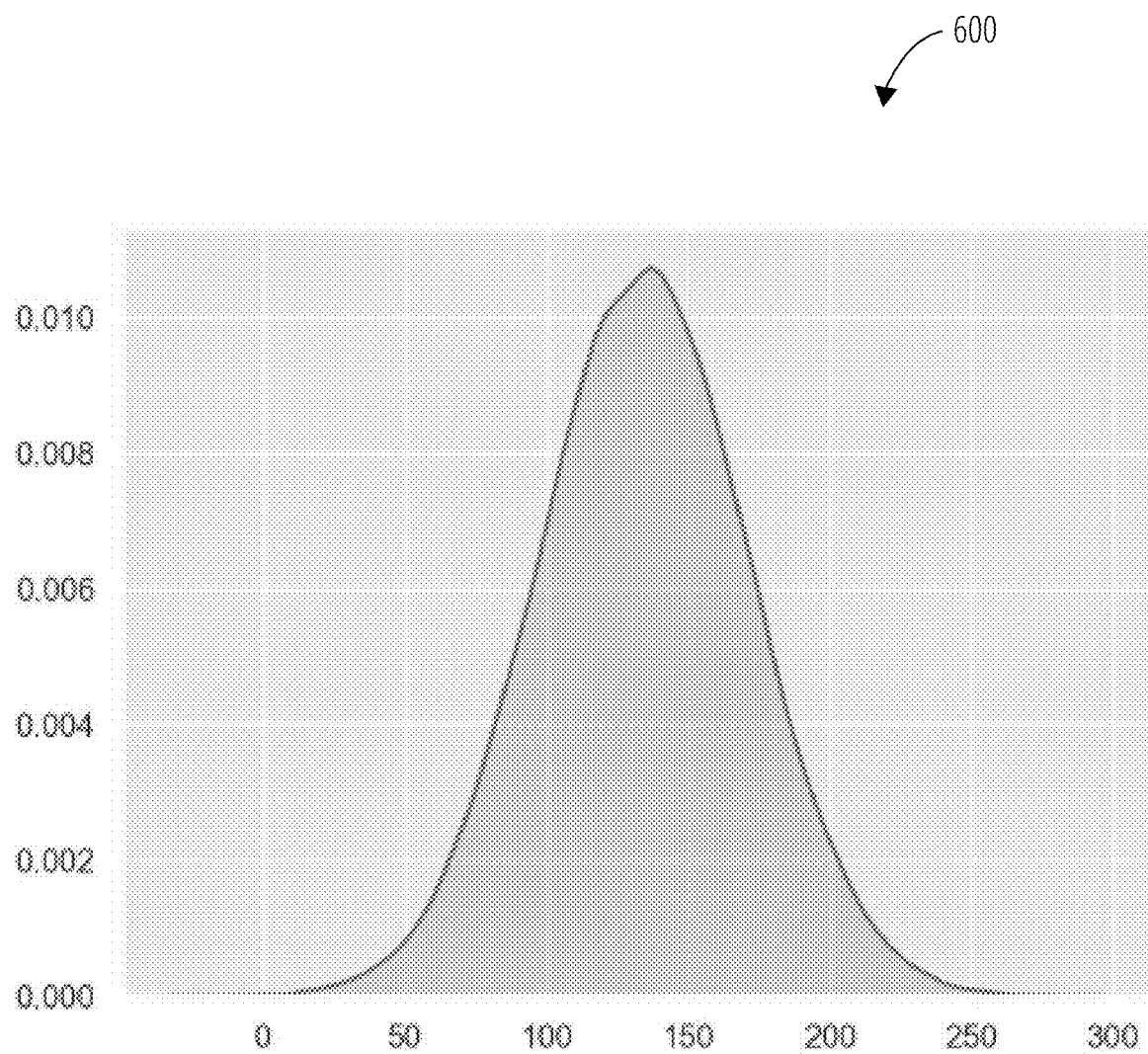
FIG. 6 depicts a renormalized metric control 600 in accordance with one embodiment.

Each sub-metric for example from Table 1 may be converted to a percentile using a Gaussian cumulative distribution function 500 (CDF). Such a function is exemplified in the depiction in FIG. 5. The percentiles may be weighted in accordance with the allocations depicted in Table 2. The weighted percentiles may summed to a single raw GSAT that resembles the percentile distribution for example as depicted in Table 3. The raw GSAT may then be renormalized and converted to a percentile (e.g., the raw GSAT has a mean of 49.49 and a STD of 8.32), for example as depicted by the renormalized metric control 600 in FIG. 6.

The GSAT metric control, such as renormalized metric control 600, may be applied as feedback into the communication system to modify call processing, component behavior, and templates. In some embodiments, templates comprise forms generated and displayed to callers by bot nodes (described below). For example, the metric control may be utilized to modify the audio behavior (questions and responses) of an automated attendant based on audio and semantic attributes of particular callers. The metric control may also be utilized to modify the content of forms generated and presented to callers by said automated attendants, and the processing of those forms.

Figure 7:
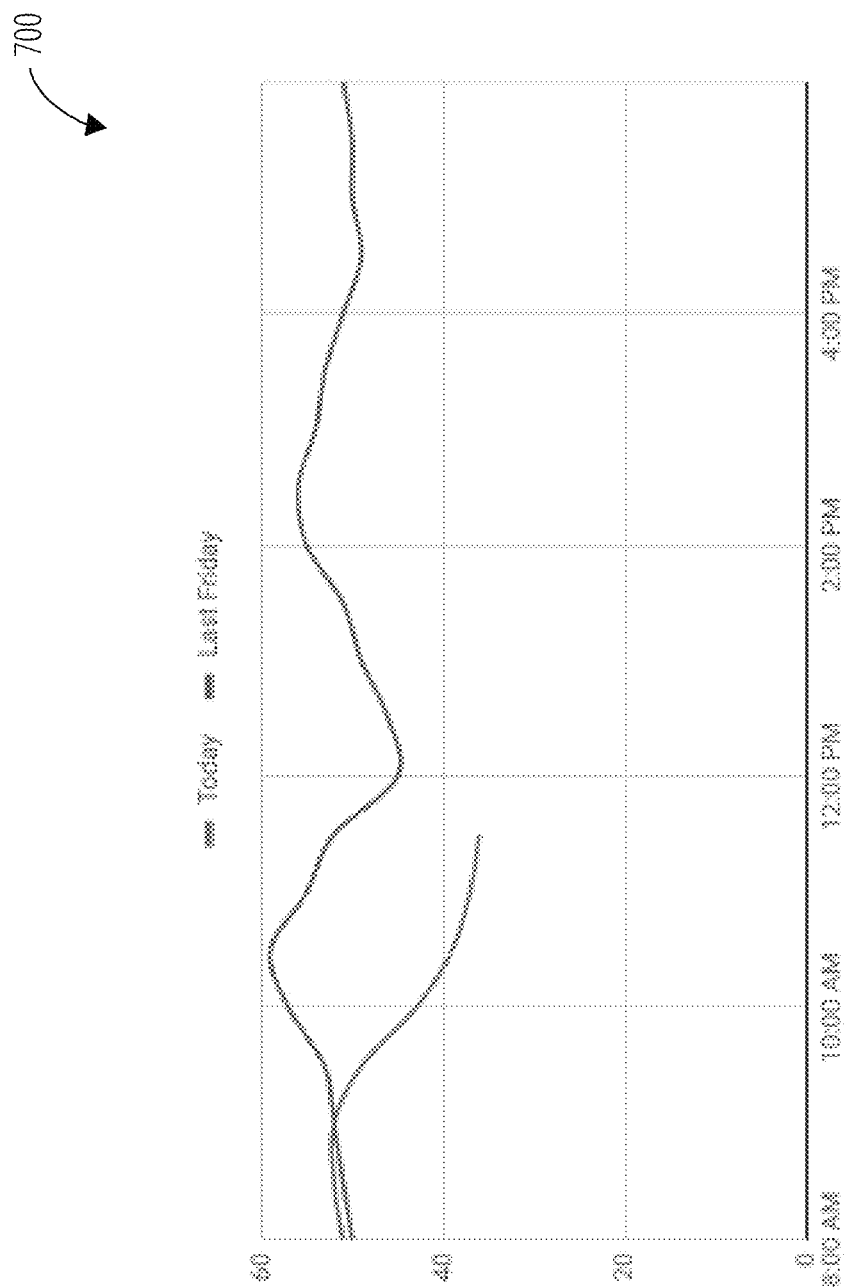
FIG. 7 depicts a time series graph 700 in accordance with one embodiment.

For trending topics and saved searches, anomalies may control which types of system, agent, or agent group metrics are made prominent to the system operator. Some types of metrics may be mainstays (e.g., a non-dynamic set of configured call metrics to emphasize). Metric comparisons may be presented as time series graphs contrasted with the same metrics over a historical period, as for example depicted in the time series graph 700 depicted in FIG. 7. Examples of time series metrics in one embodiment include:

Call Metrics—A set of trends for call metrics. These metrics depict time dynamics and day over day performance. Metrics may be limited to metrics likely to change day to day, for instance, average emotion (which may be driven more directly by external factors than GSAT) and average handle time. Exemplary metrics include:

Average call processing time
Average emotion score for calls
Average emotion trend for calls
Call resolution
Average silence period in calls
Call volume Trending Topics—Words, phrases, or entities that are occurring anomalously frequently in a given time frame. Trending topics may also or additionally include a burst or cluster of calls relating to a topic or issue. Exemplary trending topics include:

Saved Searches—A reduced set of saved searches, possibly curated by how anomalous they are for the time frame, and possibly customized from a larger set. If customized, a control to "add to daily briefing" may be generated in the saved search builder.

Time series may comprise the following attributes:
The raw numeric value of a particular metric for the time frame (if selected or if the metric is not a global rate metric)
The rate (percentage of calls) comprising some attribute for the time frame (e.g., for a binary metric).

Figure 8:
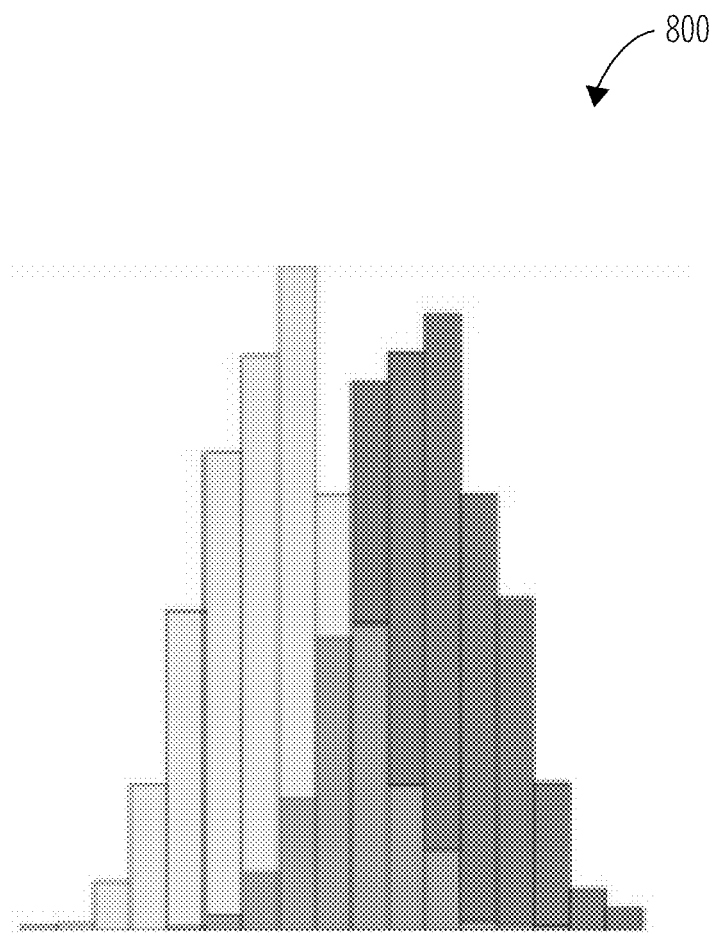
FIG. 8 depicts a composite histogram display 800 in accordance with one embodiment.

Metrics and visualizations for call and/or system dynamics (metric change or change rate over time) may be generated and displayed, for example in the scorecard display interface 124 for a given call, agent, team (agent group), or system-wide. These metrics may in one embodiment only apply to binary categories (e.g., saved searches, whether a call contains a trending topic, but not, for instance, average handle time). The emotion associated with a topic may be identified as neutral, positive, or negative and whether it has become more negative than historical. This characteristic may be visualized by a pair of histograms over emotional content for calls. See for example the exemplary composite histogram display 800 depicted in FIG. 8.

More generally, metrics and visualizations for dynamics may in one embodiment take the form of one or more of the following:

A time series graph of the call property for a time frame compared periodically to a reference time frame. Whether to display raw values or rates for the value also may configurable.

List of related topics that co-occur with the binary property. These are related topics to trending topics or to unresolved calls or to saved searches. For example, "burning" has related topics "fire" and "fire insurance".

Pull quotes from matching calls (binary) or extreme values (continuous). For continuous values like emotion or other call metrics, pull quotes may show if they come from high or low examples.

An ability to navigate to a list of relevant calls, meaning a set of calls that match the target extreme, or for a related topic, a subset that also contain that related topic. This metric provides an indicator of how anomalous a given call is or calls in a time frame are.

In one embodiment, the system may generate reports in the form of site, team, and agent rankings comprising ranked lists of top-performing systems, teams, and agents by average GSAT.

In one embodiment, the system may pull quotes from calls that represent the nature of the call enabling listening at targeted locations in the call. This report may also depict the resolution of the call.

Figure 9:
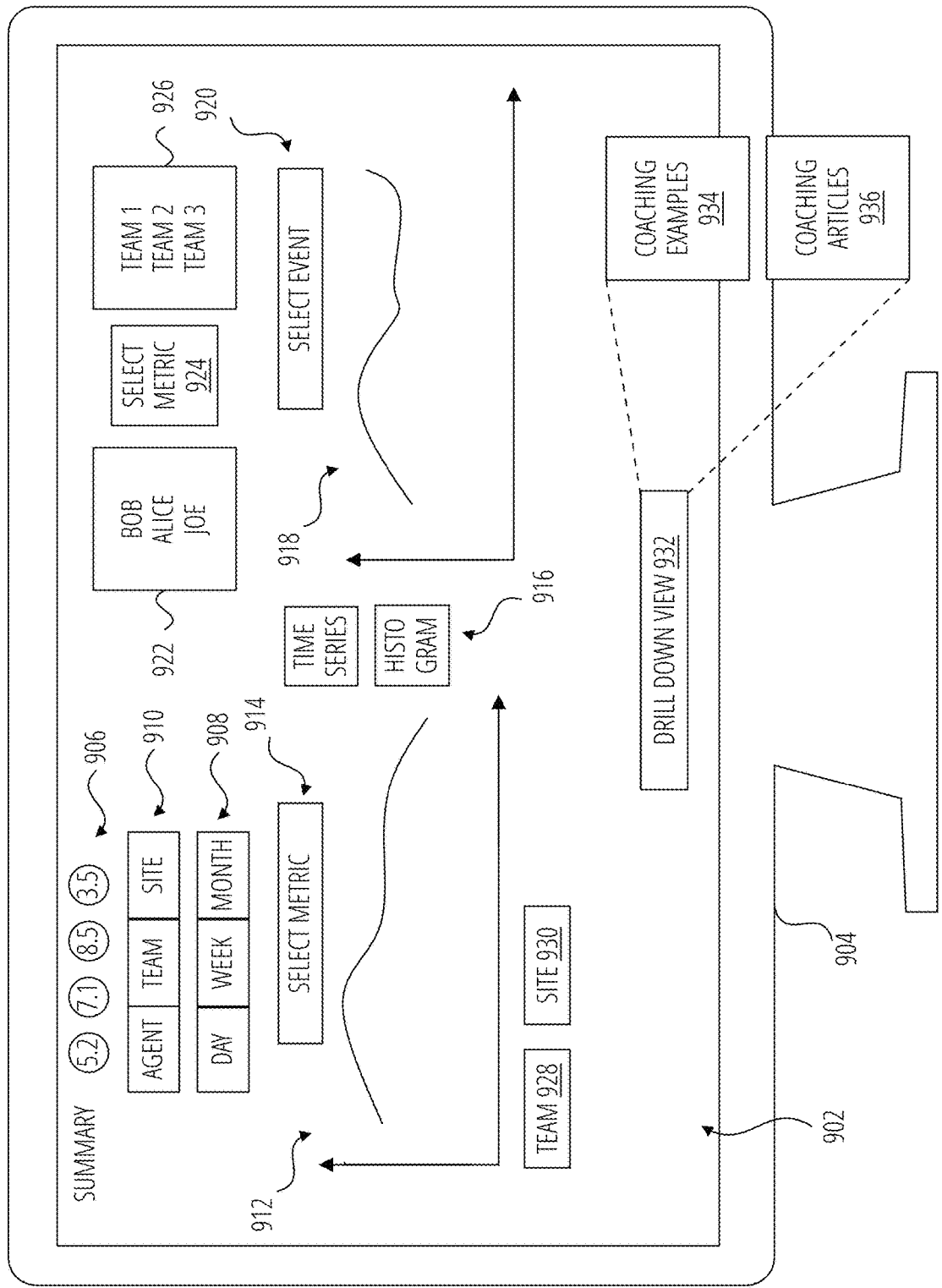
FIG. 9 depicts a scorecard display interface 902 in accordance with one embodiment.

FIG. 9 depicts a scorecard display interface 902 implemented on an interactive machine display 904 in one embodiment. The scorecard display interface 902 may be configured for reporting metrics on an agent, a team of agents, or system-wide (a "site"). The scorecard display interface 902 may comprise these primary components:

Scorecard Summary—A set of high level metrics (metric values 906) that describe, in aggregate, how well an agent (or team etc.) is performing on configured metrics (e.g., globally configured metrics) over a selectable (interval selection control 908) time frame. The metric values 906 of the scorecard summary may comprise moving averages of the globally configured scorecard metrics.

Conversation Filter—A control (target control 910) to filter the set of calls included in the aggregations.

Performance History—A history (performance history 912) for a selected metric (metric selection control 914) by time interval, and/or a histogram (visualization selection controls 916).

Performance Feed (agent only)—A timeline (performance feed 918) of a selectable agent performance events (event selection control 920).

Agent List (team or site only)—A list of agents in a site or team (target list 922). Sortable by any metric (metric selection control 924).

Team List (site only)—A list of teams in the site (target list 926). Sortable by any metric (metric selection control 924).

The scorecard display interface 902 may further comprise a drill-down view for each item in the performance history. The drill-down view may pair a metric (e.g., "politeness") and a target (e.g., "Agent Bob Smith") and may in one embodiment comprise the following:

Header—The metric name and target being drilled into
Coaching Examples—The best and worst calls list for that metric for that target.
Coaching Article—A written description of advice for how to improve that metric (if available).

The metric values 906 of the scorecard display interface 902 may comprise objective, stable metrics to support agent coaching and may incorporate hysteresis such that reliable aggregate metrics of performance are presented and updated over time. The scorecard display interface 902 may enable the configuration of goals and monitoring of progress (e.g., via the performance feed 918) to achieve those goals for an agent, team, and/or site.

In one embodiment the metric values 906 of the scorecard display interface 902 comprise holistic metrics as numeric moving averages. These metrics change slowly relative to a time interval of interest (metric selection control 914), such as a day. The scorecard display interface 902 may in one embodiment comprise display of the following attributes for an agent. In some embodiments, some or all of the following attributes may be displayed in a modal or window when an agent is selected (e.g., by clicking on the agent or hovering on the agent) from the target list 922.

Agent/Team/Site Name
Agent ID (if relevant)
Start date (if relevant)
Average GSAT
Average evaluation score (if available)
Average CSAT (if available)
Average call handle time
Average calls per day The target control 910 enables filtering of a set of calls affecting the metric values 906 over which values are tracked and averaged. The set of metric values 906 that may be filtered may be pre-configured in the system global settings in one embodiment.

The performance history 912 may be responsive to configurable settings for tracking metrics historically and/or versus peers. Settings in one embodiment may include:

Comparison configuration (agent only)—Selects a group to compare either over time or as a histogram. The options may include:
Versus team (team comparison control 928)
Versus site (site comparison control 930)
Time series comparison configuration (agent only—see "TIME SERIES" control of the visualization selection controls 916)—Selects whether the time series graph also graphs against one of the following:
Number of time intervals active (average at the currently configured team/site). This may be applied to measure training and growth on newer agents.
Average for configured team/site on the same time x-axis. This enables comparison against more mature agents and facilitates corrections for business-related causes of performance ups and downs (e.g., more negative calls across the team due to dissatisfaction with the product or service).

Figure 10:
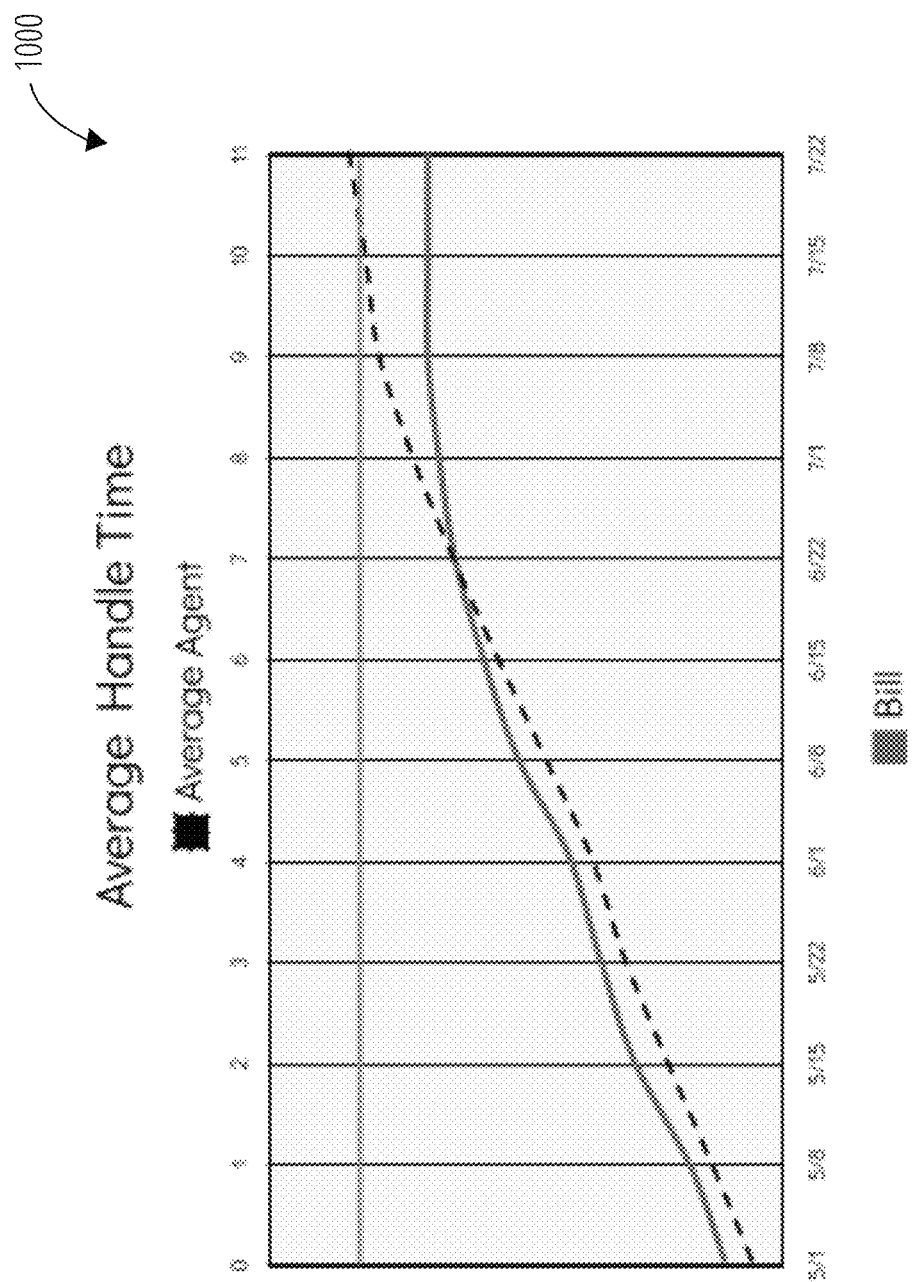
FIG. 10 depicts a comparative visualization display 1000 in accordance with one embodiment.
Figure 11:
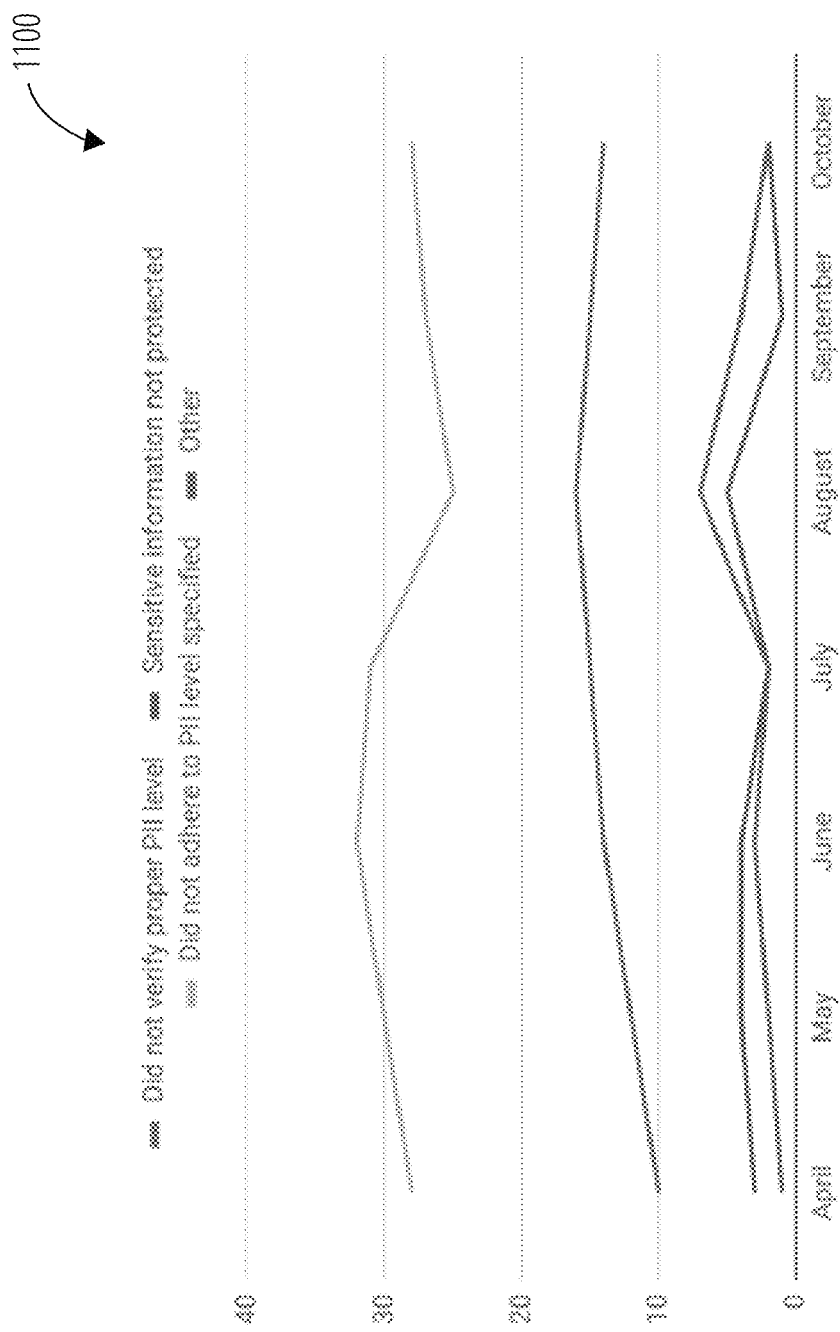
FIG. 11 depicts a categorical line chart display 1100 in accordance with one embodiment.
Figure 12:
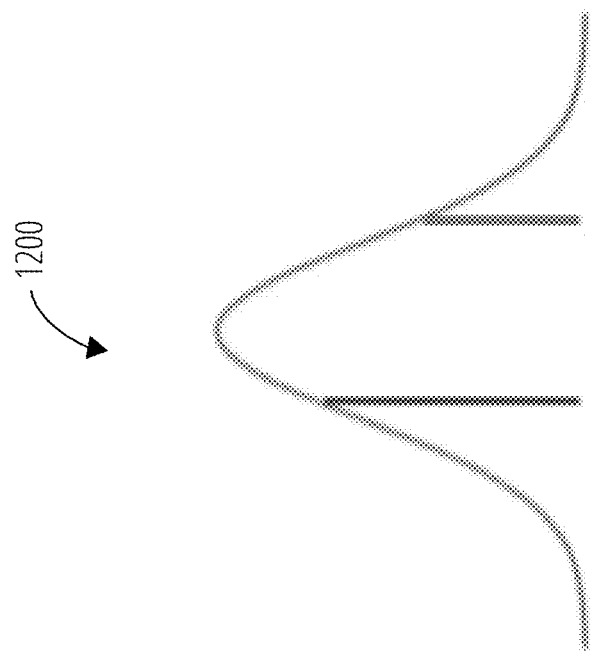
FIG. 12 depicts color coded distribution displays 1200 in accordance with one embodiment.
Figure 12:
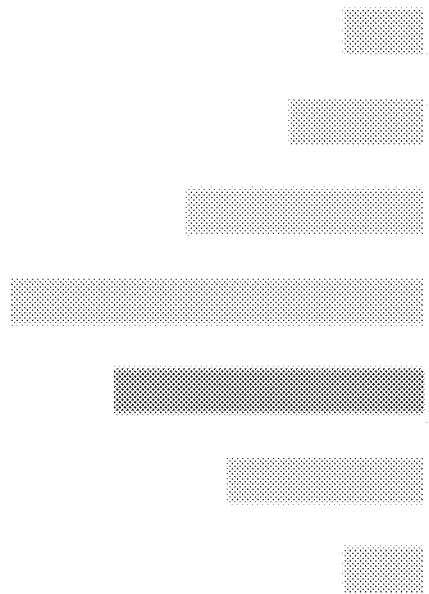

The set of available historical visualizations (performance history 912) for a selected metric (metric selection control 914) may enable multi-dimensional views of the target's strengths and weaknesses over time. The performance history 912 may in one embodiment include:

Current Value—The current numeric value for the target for the selected metric.
Time series (if not categorical)—An interval-binned time series graph of the target's performance on that metric over time. Graphed on the same graph is either a comparison of the average performance of an target with a comparable target with the same or similar time intervals of experience, or comparatively with a team or site overall. See for example the exemplary comparative visualization display 1000 depicted in FIG. 10.
Categorical Line Chart (if categorical)—If the selected metric is categorical (option based), the performance history 912 may comprise a series of line charts depicting an average percentage of responses in which a selected or each available option is selected (on one graph). See for example the categorical line chart display 1100 depicted in FIG. 11.
Current Goal (if a current goal is set)—A horizontal line on the time series and/or a cell on the histogram that depicts a goal set for the target.
Histogram—A histogram or a plotted gaussian (that matches the mean and standard deviation of the target org). The target's actual value on the selected metric may be marked as a vertical line or shaded region. The target's goal on that metric may be marked with a second line. See for example the color coded distribution displays 1200 depicted in FIG. 12.

The performance feed 918 may in one embodiment comprise a time-ordered feed depicting recent events of interest to the target. These may include in one embodiment:
Annotations made on the target's calls
Evaluations
CSAT's
Goals set
Goals reached
Work anniversaries The target list 922 may in one embodiment comprise a list of agents configured for a team or site. The list of agents in one embodiment may enable display of the following attributes when a particular agent is selected:

Agent name
Agent ID
Agent start date
Average GSAT
Average evaluation
Average CSAT
Average handle time
Average calls per day
Sort By—A dropdown of metrics to sort by. When something is sorted by a metric that's not in the default column set, it may be temporarily appended (e.g., filler words).
Order—Increasing or decreasing The target list 926 for sites may operate similar to the target list 922 for teams, but may display team attributes instead of agent attributes when a team is selected.

Figure 13:
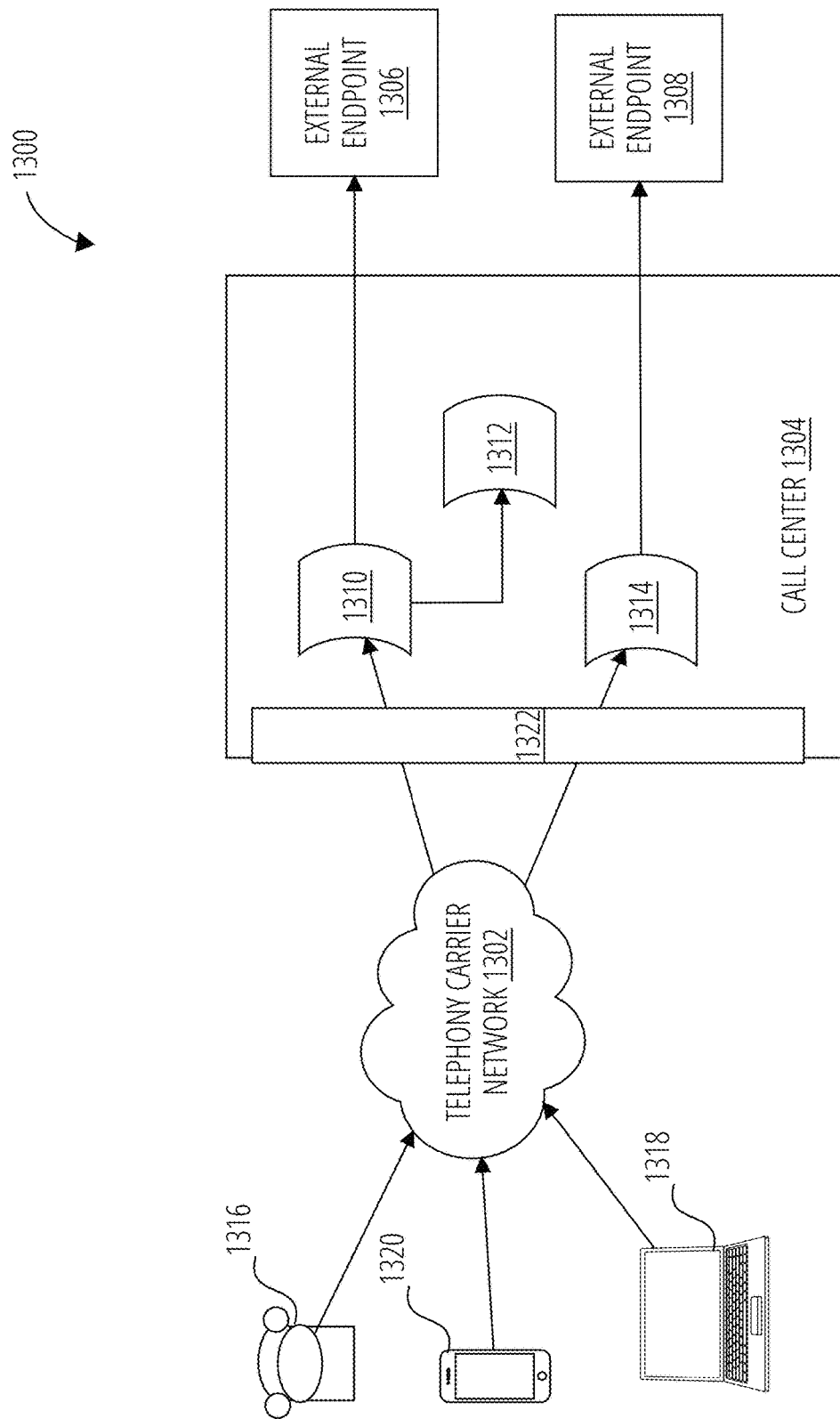
FIG. 13 depicts a call processing system 1300 in accordance with one embodiment.

Metrics available for selection or configuration for use in the scorecard display interface 902 may in one embodiment comprise:
Average GSAT, evaluation, and CSAT
Average handle time and average calls per day
Call metrics including in one embodiment:
Cross talk
Silence
Hold time
Filler words
Words spoken per minute
Average emotion
Emotion trend
Agent-to-caller talk ratio
Complexity
Politeness
Questions
Every CSAT question score
Every evaluation question score In some embodiments, a metric drilldown 9detail) view may be activated from the scorecard display interface 902 (drill down view activation control 932) and may in one embodiment display various attributes for the target and/or selected metric, as well as the following:

Coaching examples (coaching examples 934)—A set of recent calls that may be utilized to exemplify extreme examples of the metric for that target. These examples may be "best calls" or "worst calls" for that target sorted by that metric.
Good list—N best calls under that metric for that agent, team, or site.
Bad list—N worst calls under that metric for that agent, team, or site.
Coaching article (coaching articles 936)—Written content providing material about how to improve that metric. For some system generated metrics, this is a well-written article about the importance of improving x. For example, why it's important to control your speaking speed and exercises to improve it. For customer metrics (e.g., QA question score), this could be optionally authored by the org. By default, it's the question itself.
Article and references An embodiment of a call processing systems 1300 is depicted in FIG. 13 including a telephony carrier network 1302, a call center 1304, an external endpoint 1306, an external endpoint 1308, a call flow 1310, a call flow 1312, a call flow 1314, an analog handset 1316, a computing device 1318, and a mobile phone 1320.

Calls originate from sources such as the analog handset 1316, mobile phones 1320, or computing device 1318 (e.g., Skype call), for example. These calls are routed through one or more telephony carrier networks 1302 to a communication interface 1322 of a call center 1304. From the communication interface 1322 the calls are routed to different call flows such as call flow 1310 and call flow 1314. Call flows may process and forward, or terminate, the calls, or route them (e.g., via outlet nodes) to other call flows, such as call flow 1312. Calls may be forwarded to external endpoints outside the call center 1304 such as external endpoint 1306 and external endpoint 1308.

Figure 14:
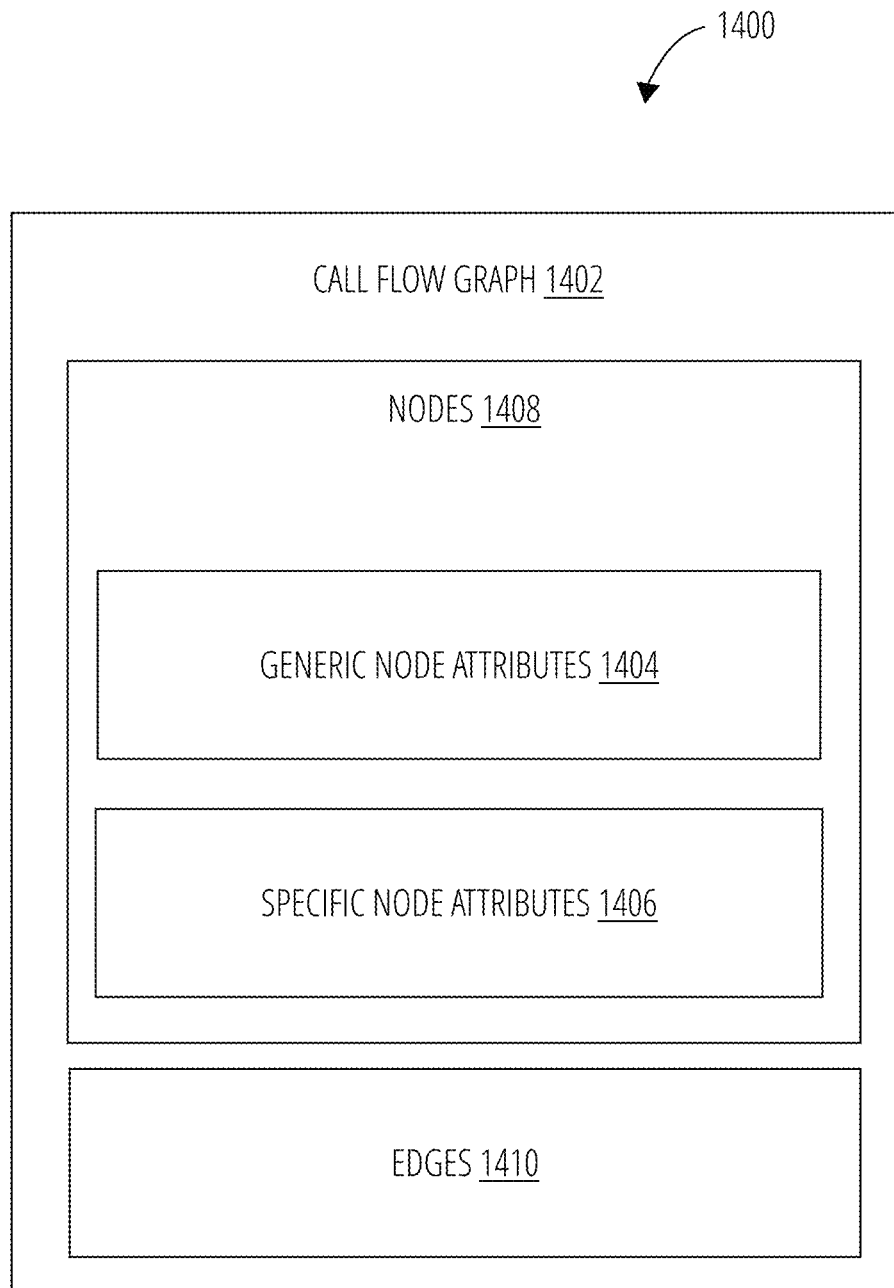
FIG. 14 depicts a call flow control structure 1400 in accordance with one embodiment.

A call flow control structure 1400 in one embodiment is depicted in FIG. 14, comprising a call flow graph 1402, generic node attributes 1404, specific node attributes 1406, nodes 1408, and edges 1410.

Nodes 1408 are configured and joined with edges 1410 to form a call flow graph 1402. The nodes 1408 each have generic node attributes 1404 common to all node types, and specific node attributes 1406 specific to particular types of nodes.

In one embodiment, each node type may include generic node attributes 1404 including:
  Name—The (mutable) name of the node. Conversations generated by the node use this name in the Node call metadata.
  Type—The (immutable) type of the node. Each type may be associated with a unique icon, badge, and/or color.
    Inlet
    Queue
    Bot
    Outlet
    Recorder
    Hosted Script
    Hangup
  Description—A description of the node and/or its purpose.
  Parents—Links to nodes that can route to a node.
  Children—Links to nodes that a node can route to.
  State Forwarding—A mechanism to propagate state information from a node to a target endpoint. State includes tags associated with a call, bot data, and general call data. This provides a mechanism to support outbound task fulfillment without utilizing a hosted script.
    Enable—Turn state forwarding on or off.
    Trigger—Condition upon which the forwarding is triggered
      On Enter Node
      On Exit Node
      Both
    Outlet Type
      HTTP GET
        URL
        URL Parameters
      HTTP POST
        URL
      Email
        Email address
      SMS
        Number
  Read only properties. Nodes may also have read only properties and statistics.

In one embodiment, the fundamental types of nodes include:
  Inlet—A phone number or address that can receive calls.
  Queue—A call queue serviced by human agents.
  Bot—A call queue serviced by machine agents.
  Ender—A hybrid of a queue node and bot node.
  Outlet—External (to the call flow manager) phone numbers and other communication endpoints.
  Recorder—A call recorder.
  Hosted Script—A flexible multipurpose node that implements custom call handling or business logic.
  Hangup—Terminates the call session.

Figure 15:
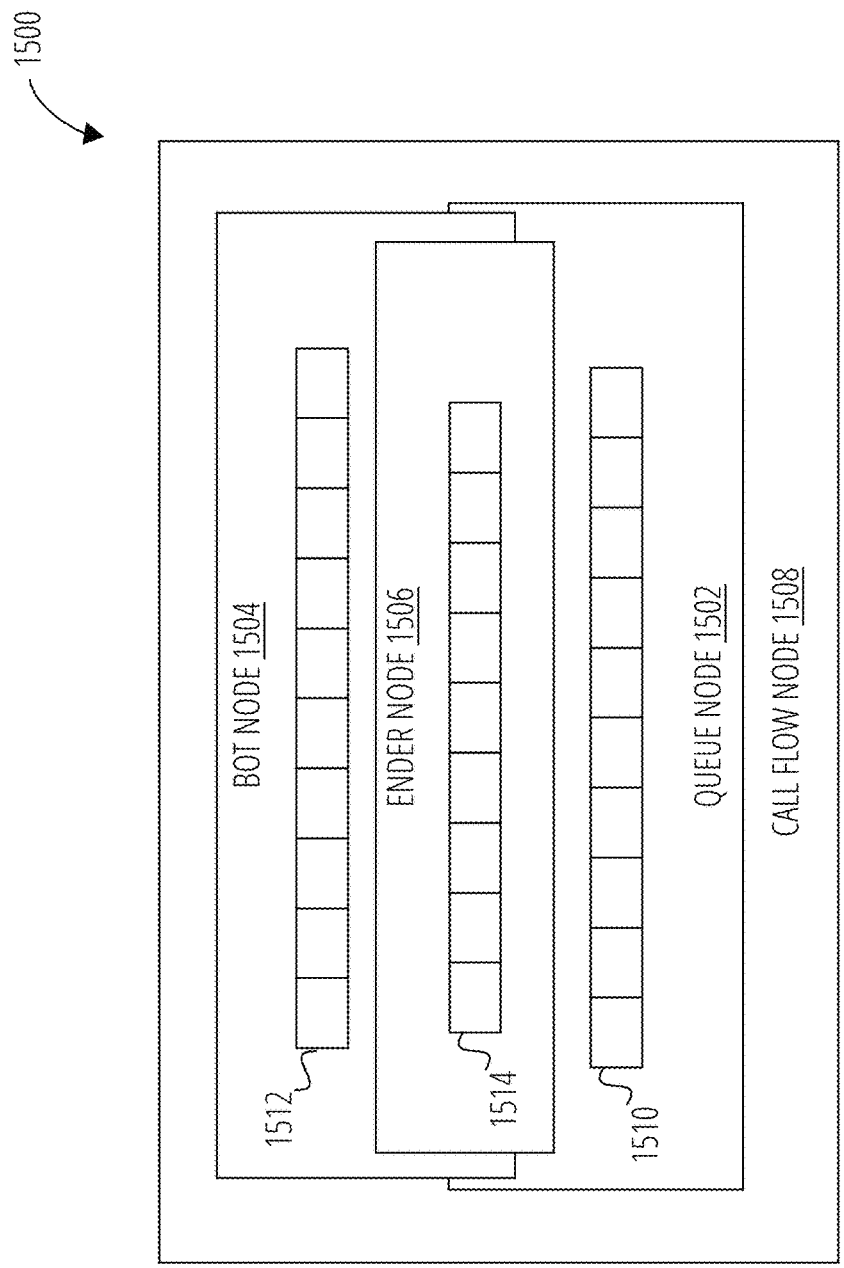
FIG. 15 depicts call flow control nodes 1500 in accordance with one embodiment.

FIG. 15 depicts a high-level structure of certain types of call flow control nodes 1500, in one embodiment, including a queue node 1502, a bot node 1504, and an ender node 1506. These types of call flow node 1508 each include a first-in-first-out structure (FIFO 1510, FIFO 1512, and FIFO 1514) for queueing calls for service at the node. The bot node 1504 type shares other attributes in common with the queue node 1502 type, and the ender node 1506 has attributes common to both of the bot node 1504 and the queue node 1502. Thus an ender node 1506 is a control structure that enables service by both bots and human agents, including the generation and presentation of forms (e.g., surveys or questionnaires) to callers.

Aspects of the communication systems disclosed herein may be utilized to provide adaptive feedback to modify the behavior of some node types. For example aspects of the communication system 100 depicted in FIG. 1 and FIG. 2 may be utilized to adapt the functioning of a queue node 1502, bot node 1504, and/or ender node 1506 in which automated voice attendants, agents, or templates are utilized, in manners previously described.

In one embodiment, a queue node such as queue node 1502/queue node 1602 (see FIG. 16) may include these properties:
  Priority—A number indicating the priority of the queue. Higher numbers indicate higher priority. Zero (0) is the lowest priority possible.
  Tags—Properties of the queue that are applied match agents to calls. For example, "insurance" or "management".
  Background Behavior
    Silence
    Music
      Custom Upload
      Multiple licensed defaults
  Periodic Announcement
    None
    Fixed Automated Message
    Approximate Wait Time
    Position in Queue
  Failsafe Child
    In a queue, one of the children may be designated the Failsafe Child (see Agent-Caller Matchmaking)
  Matchmaking Slider
    A slider between:
      FIFO—First in, first out routing
      Skill Matching—Utilize agent, queue, and caller tags to make a match, de-emphasizing wait times.

In one embodiment, a bot node such as bot node 1504/bot node 1702 (see FIG. 17) may include these properties.
  Bot Name—Identifies the bot from a set of existing bots.
  Bot Version
  Voice
    Automated message
    Agent—Voice agent to use for this bot
    Inherit—Use the voice of the preceding node. If the node was a bot, inherit its voice. If it was a queue, inherit the voice of the agent who handled the call.

Route mapping—Maps bot outcomes to child nodes. This deconvolves the set of possible bot outcomes from the bot's position in the call flow. It also facilitates bot reuse.
  Target child node—Determines how a bot outcome routes to child nodes.
  b. Target metadata field—Determines how bot outcomes are stored, including mapping to metadata, contact name, or CSAT result.
Default route—A required field that is useful if the bot implements unhandled capabilities. Form-filling bots directly set call tags, which may be used for agent selection. For instance, a form-filling bot upstream may ask as a question "what language do you prefer?" and the "Spanish" tag is later used in agent selection when the caller is queued.

In one embodiment, an ender node such as ender node 1506 may include these properties:
Bot Name—Selects the bot from a set of existing bots or lets you create a new bot.
Bot Version
  Freezes the bot to a particular version.
  Latest
Voice (when bot-handled)
  Default automated voice attendant
  Agent—Defines an agent for the call
  Inherit—Use the voice of the preceding node. If the node was a bot, inherit its voice. If it was a queue, inherit the voice of the agent who handled the call.
Route mapping—Maps bot outcomes to child nodes. This deconvolves the set of possible bot outcomes from the bot's position in the call flow. It also facilitates bot reuse.
Default route—A required field that is useful if the bot implements unhandled capabilities.
Labor Pool—Default is Gridspace.
Target Performance—% of human—Default is 80%
Current Performance (Read only)
9. Q&A Methodology
  a. GSAT (Default)
  b. Default QA Form
Document Set—The indexed documents available to Enders.
Greeting—How the Ender should greet a caller.
Outcome Names—This node type requires a descriptive name for every outcome, so Enders are configured with activations (e.g., buttons) for different call endings.
  Outcome Descriptions (Optional)—Additional information for some outcomes.
Unhandled Outcomes—A link to the unhandled outcomes editor. The bot is set up with a user interface that is described in one embodiment below.

Figure 16:
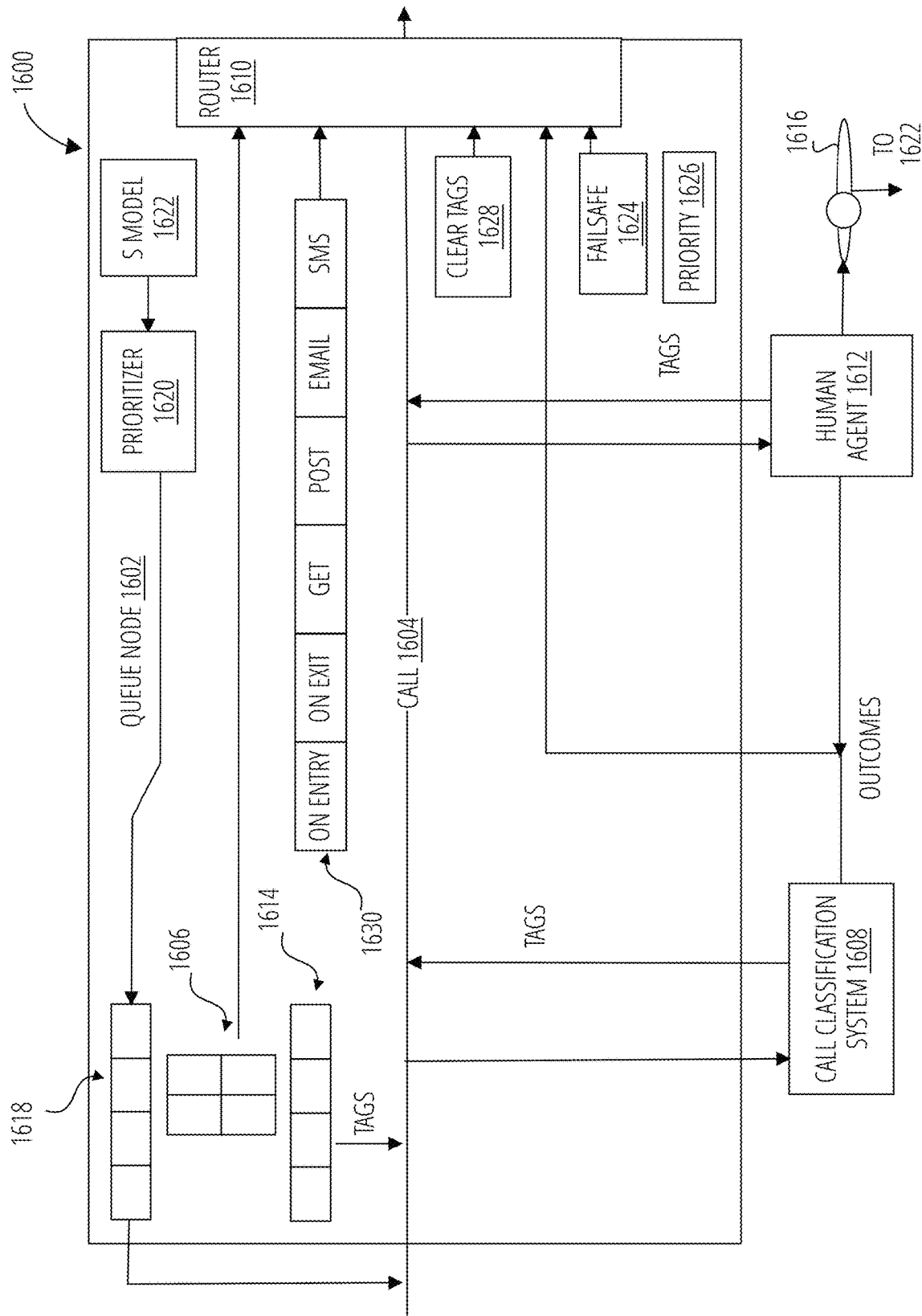
FIG. 16 depicts a queue node configuration 1600 in accordance with one embodiment.

FIG. 16 depicts a queue node configuration 1600 in one embodiment comprising a queue node 1602, a call 1604, an outcome routing map 1606, a call classification system 1608, a router 1610, a human agent 1612, implicit tags 1614, a slider 1616, a call queue 1618, a prioritizer 1620, an S model 1622, a failsafe 1624 route setting, a queue priority 1626, and a clear tags 1628 setting.

A call 1604 is pulled from the call queue 1618 for the queue node 1602 and tags are applied including implicit tags 1614, tags generated by a call classification system 1608 (such as described in U.S. application Ser. No. 15/653,411, "CALL CLASSIFICATION SYSTEM", filed on Jul. 18, 2017), and tags applied by a human agent 1612. The priority of the call for purposes of pulling it from the call queue 1618 may be determined by a prioritizer 1620 algorithm influenced by one or more of the call's position in the call queue 1618 and an S model 1622. An exemplary prioritizer 1620 algorithm and S model 1622 are described in more detail below.

The implicit tags 1614 and a configured priority 1626 may affect which calls are routed into the call queue 1618 for the queue node 1602.

The applied tags may affect the operation of the router 1610 for the queue node 1602, such that a next node in a call flow is selected to receive the call based on matching agents or bots assigned to the next node with the tags on the call 1604. Outcomes from the call classification system 1608 and human agent 1612 may also be applied to affect the routing, where outcomes are intentions derived from the call 1604 about the reason(s) the caller has for making the call 1604. Intentions may be derived from the spoken content of the call 1604, from forms presented to the caller, from historical data about the caller, or other means.

The router 1610 may also be influenced by an outcome routing map 1606, which maps determined outcomes for the call 1604 to routes to downstream nodes of the call flow. The output of the router 1610 may take one of a number of forms as defined by output format settings 1630, which may also configure the condition on which forwarding from the node is triggered.

A slider 1616 control may be operable by a human agent 1612 or by another means (e.g., automatically adjusted based on call volume/wait times, etc.) to balance between the influence of FIFO position/wait time and use of the S model 1622 on the priority of calls for servicing from the call queue 1618.

The router 1610 may be configured (clear tags 1628) to clear tags applied to the call, or not. The router 1610 may also be configured with a failsafe 1624 route for forwarding calls, in the event the call cannot be matched definitively to a downstream node using tags or outcomes.

Queue nodes operate to encode call state transitions, providing a singular queue caller tag that may be applied for call routing. A general pool of human agents and bots continuously undergoes a matchmaking process with existing callers. A type of node, herein referred to as a smart route node, may continuously select a best-match caller for an available agent, utilizing for example three parameters: 1) the hold time (which maybe represented by FIFO position), 2) the agent skill tags (if configured), and 3) the caller tags in coordination with historical agent performance.

In some embodiments, when selecting the best caller for an agent, the system evaluates a match score of this form.

$$M(a,c_i)=\alpha H(c_i)+(1-\alpha)(\beta B(a,c_i)+\varepsilon S(a,c_i)) \qquad \text{Equation 1}$$

Where,
M is the total match score
H is the caller's hold time
B is the bootstrap score, which compares the similarity of the agent skill tags and the caller tags
S is a model that computes $P(\neg r|a, c_i)$, the probability a call will not reroute, given the caller tags and the agent's historical performance with those tags.
$\alpha$ is a setting that interpolates between FIFO and the use of the S model
$\beta$ is a second weight parameter that controls how much the bootstrap score contributes relative to the S model output
$\varepsilon$ Is a setting to enable or disable use of the S model.

In one embodiment, $B(a, c_i)$ computes a minimum edit distance from each caller tag to each agent tag. This enables the system to reasonably understand that the caller tag "Speaks Spanish" and "Spanish" are related. One of ordinary skill in the art will appreciate that other fuzzy matching algorithms may also be utilized.

$$B(a, c_i) = \sum_{t_c \in caller\ tags} \min\{L(t_c, t_a)\} \qquad \text{Equation 2}$$

Here $L(t_c, t_a)$ is the edit distance (for example, the character match error rate). This score sums up the best-case error for each caller tag, given the agent tags. If an agent has no tags defined, the character error rate for each tag is 1.0, so they are penalized the number of caller tags.

Callers with more tags are more constrained, and, with no agent tag information to use, the bootstrap score may be such that they are deferred for later processing (e.g., moved back in the FIFO).

The S model score may be a Bayesian estimate of the likelihood the call will not need to be rerouted. For each caller tag, for an agent, the model may compute:

$$P(\neg r \mid a, c_i) = \frac{aP(\neg r \mid c_i) + bR(a, c_i)/O(a, c_i)}{a+b} \qquad \text{Equation 3}$$

This interpolates between the prior (likelihood of a reroute given the caller tags across all agents) and the posterior (number of reroutes that agent has encountered given the caller tag dividing by all callers with that tag the agent has seen). The posterior may be computed from one of many types of models, including statistical models, deep neural networks, decision forests, KNN or K-means clustering, larger Bayesian networks, or direct regression.

The total model score is the product of each of these Bayesian estimators.

$$P(\neg r \mid a) = \prod_i P(\neg r \mid a, c_i) \qquad \text{Equation 4}$$

Once these scores have been computed, the caller with the best score may be matched with the agent. Over time, the agent models learn about which agents handle which tags best. This allows upstream bots and agents (or CRM metadata) to be supplied blindly to the S model, to enable complex decisions such as matching agents to particular combinations of caller properties. New agents may be matched based on the Bayesian prior for the tags and the bootstrap measure.

Figure 17:
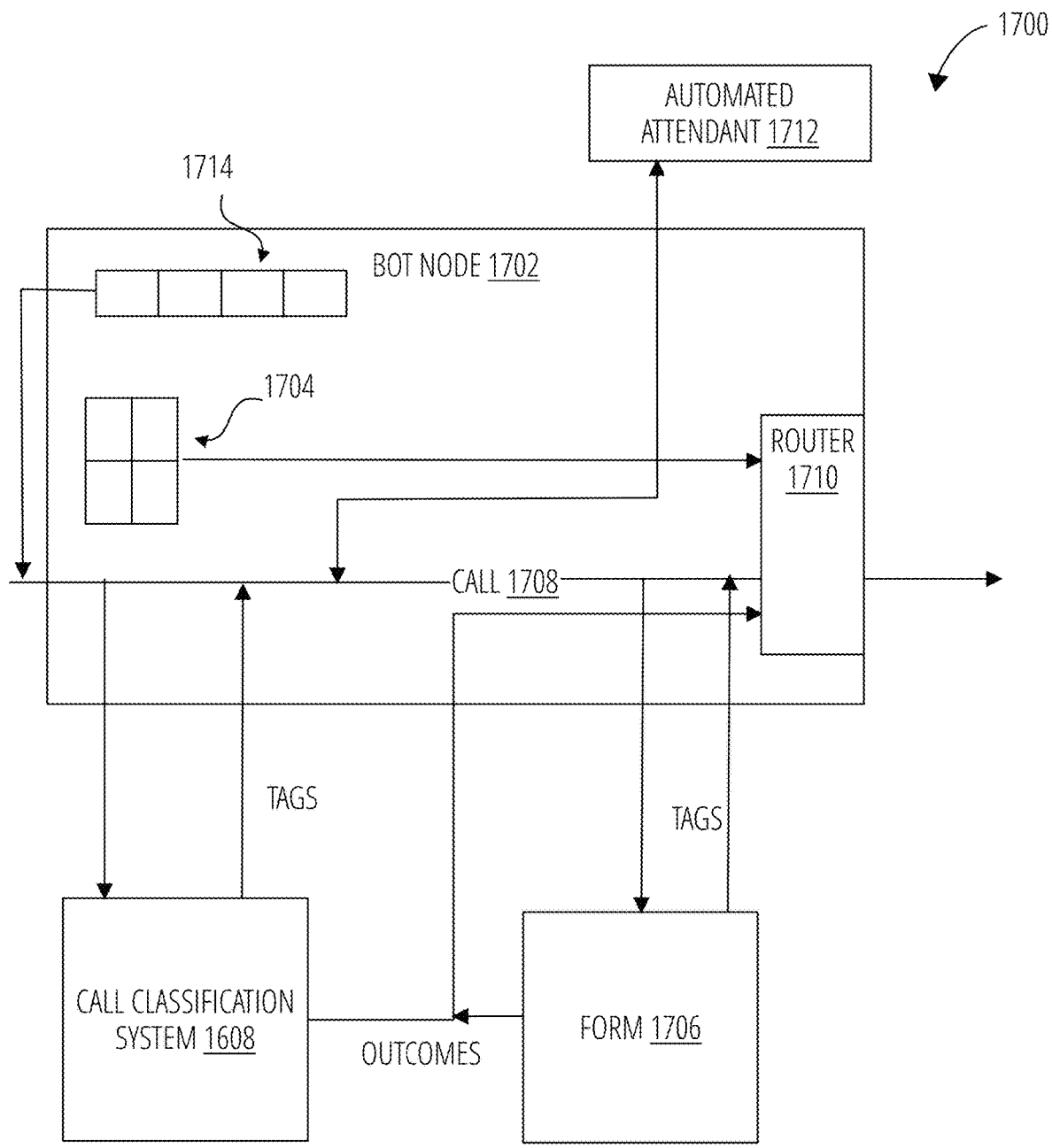
FIG. 17 depicts a bot node configuration 1700 in accordance with one embodiment.

FIG. 17 depicts a bot node configuration 1700 in one embodiment including a bot node 1702, an outcome routing map 1704, a call classification system 1608, a form 1706, a call 1708, a router 1710, an automated attendant 1712, and a call queue 1714. Other components of the 502 in common with a queue node 1602 are not depicted in the interest of clarity but will be understood to be present in some embodiments according to the following description.

The call 1708 is pulled from the call queue 1714 based on a priority determined for example in the manner described for a queue node 1602 (e.g., a balance setting between FIFO position and S model fit). Tags are applied to the call as determined by the call classification system 1608, an automated attendant 1712, and/or a form 1706 presented to the caller. Outcomes for the call 1708 may likewise be determined and assigned to downstream nodes by the router 1710 based on an outcome routing map 1704. The tags and/or outcomes influence the router 1710 to select a downstream node for routing the call 1708. The router 1710 may also be influenced by configured settings such as those described for the queue node 1602 (output format settings 1630, failsafe 1624 route etc.).

Figure 18:
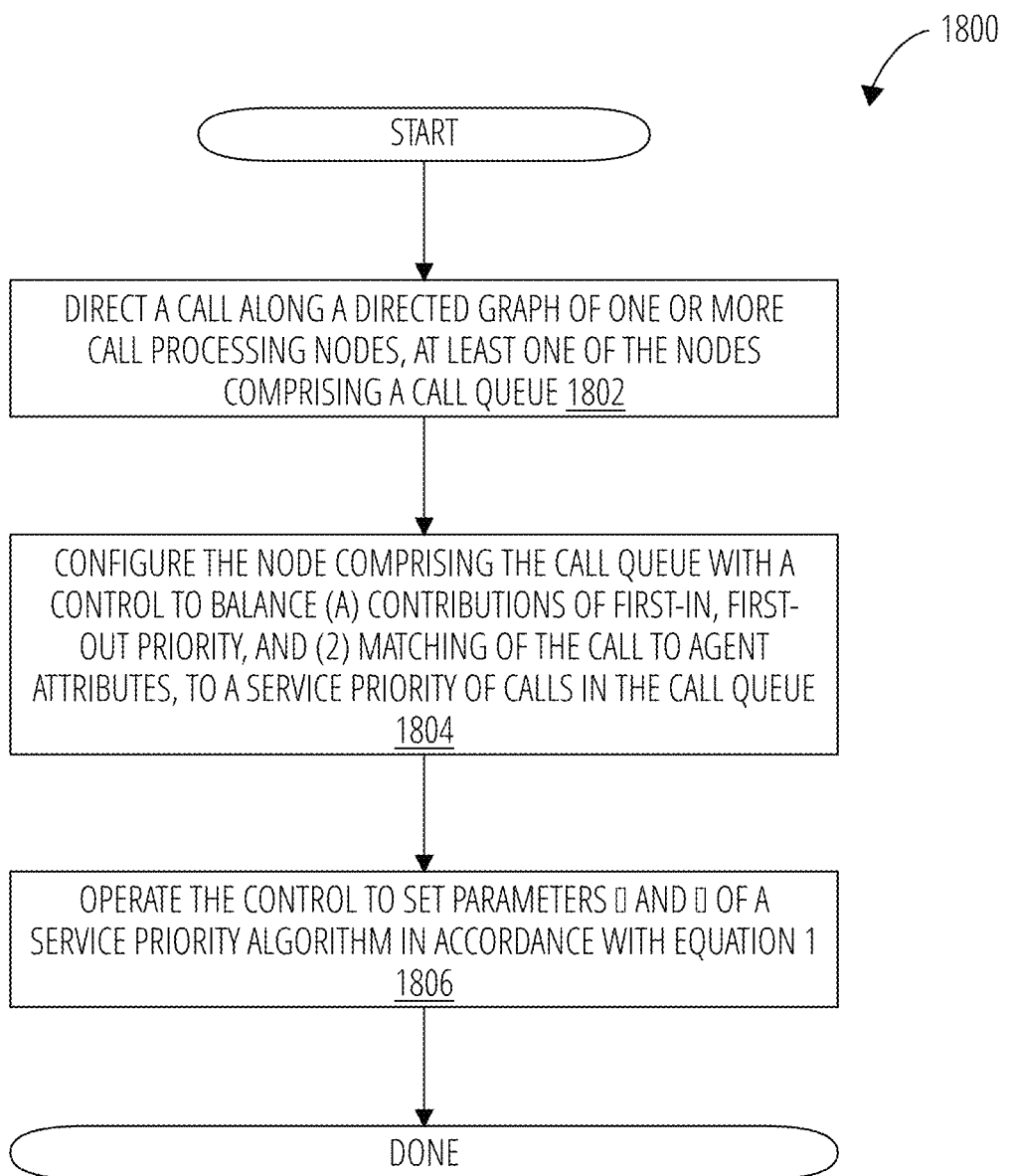
FIG. 18 depicts a call prioritization process 1800 in accordance with one embodiment.

FIG. 18 depicts a call prioritization process 1800 in one embodiment. In block 1802, the call prioritization process 1800 directs a call along a directed graph of one or more call processing nodes, at least one of the nodes comprising a call queue. In block 1804, the call prioritization process 1800 configures the node comprising the call queue with a control to balance (a) contributions of first-in, first-out priority, and (2) matching of the call to agent attributes, to a service priority of calls in the call queue. In block 1806, the call prioritization process 1800 operates the control to set parameters α and β of a service priority algorithm in accordance with Equation 1.

Figure 19:
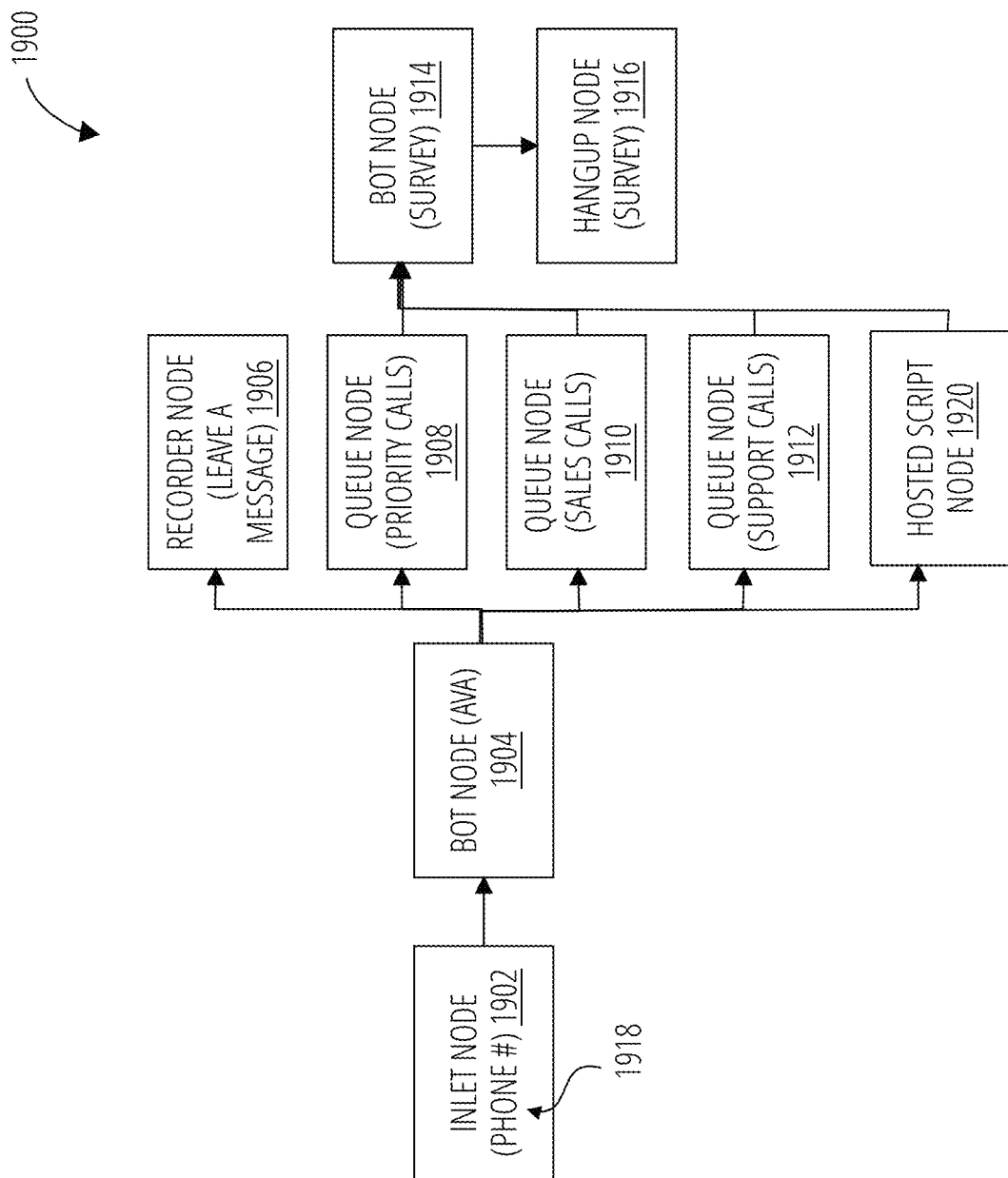
FIG. 19 depicts a call flow 1900 in accordance with one embodiment.

FIG. 19 depicts a call flow 1900 in one embodiment. The call flow 1900 comprises an inlet node 1902, a bot node (AVA) 1904, a recorder node (leave a message) 1906, a queue node (priority calls) 1908, a queue node (sales calls) 1910, a queue node (support calls) 1912, a bot node (survey) 1914, and a hangup node (survey) 1916. The inlet node 1902 binds a communication address 1918 to the call flow 1900. The call flow 1900 also includes a hosted script node 1920 with customized logic for handling calls that don't match to the capabilities provided by other nodes.

Calls to the communication address 1918 are received at the inlet node 1902 and from there directed to a bot node (AVA) 1904 with an automated voice attendant (AVA). Based on outcomes from the bot node (AVA) 1904, the call is selectively routed to either the recorder node (leave a message) 1906, the queue node (priority calls) 1908, the queue node (sales calls) 1910, the queue node (support calls) 1912, or the hosted script node 1920. Once processed at one of these nodes, the call is routed for a survey at bot node (survey) 1914, and then to hangup node (survey) 1916 to terminate the call.

In one embodiment, an inlet node such as inlet node 1902 may include these properties:
Inlet Type
    Phone number
    SIP address
Address—The phone number or SIP In one embodiment, a hangup node such as hangup node (survey) 1916 may include these properties.
Goodbye Sound
Enable Notifications
    Trigger
        All recordings
    Email notification
        Email address
    SMS notification
        Numbers
    Webhook
        GET/POST
        URI The call flow 1900 exemplifies a call flow in a call center. The call flow 1900 results in one agent each serving one queue each, and a bot that routes to three queues and a recorder.

The inlet node 1902 is configured with a communication address 1918 (e.g., phone number) that binds the communication address 1918 to the call flow 1900. Other type of communications addresses may also be utilized, such as IP addresses, email addresses, and so on.

A hosted script node allows custom scripting actions to be performed on a call. The call tags and call data are made available to the handler method of the node.

Figure 20A:
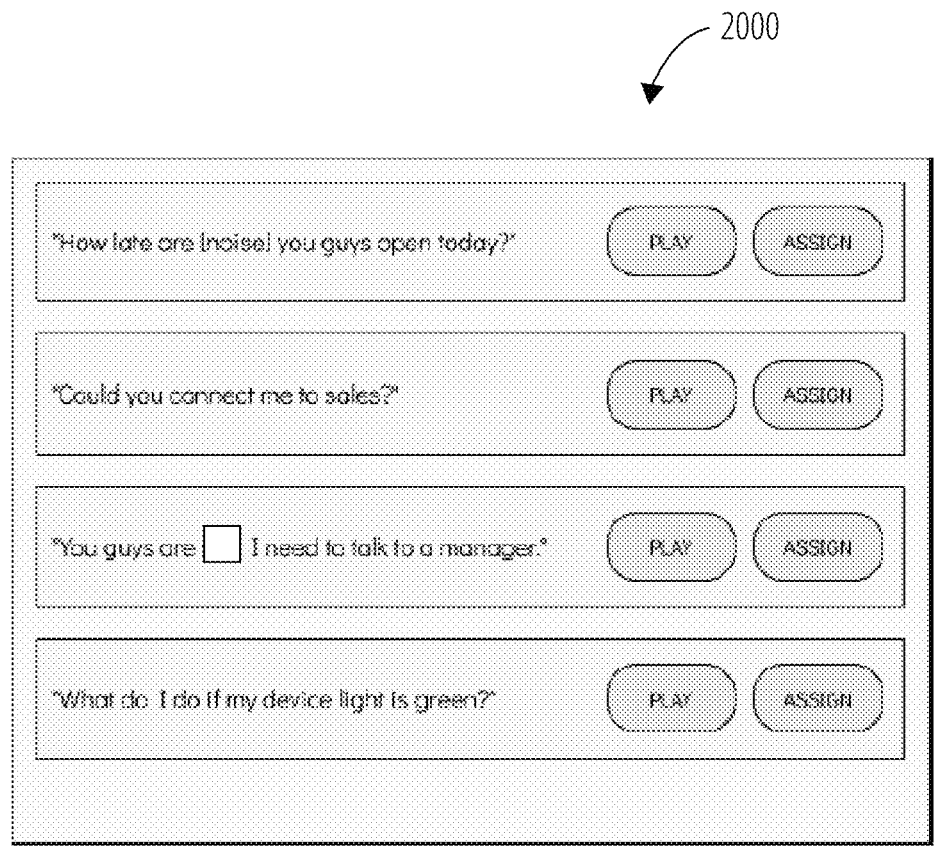
FIG. 20A depicts a call flow control interface 2000 in accordance with one embodiment.
Figure 20B:
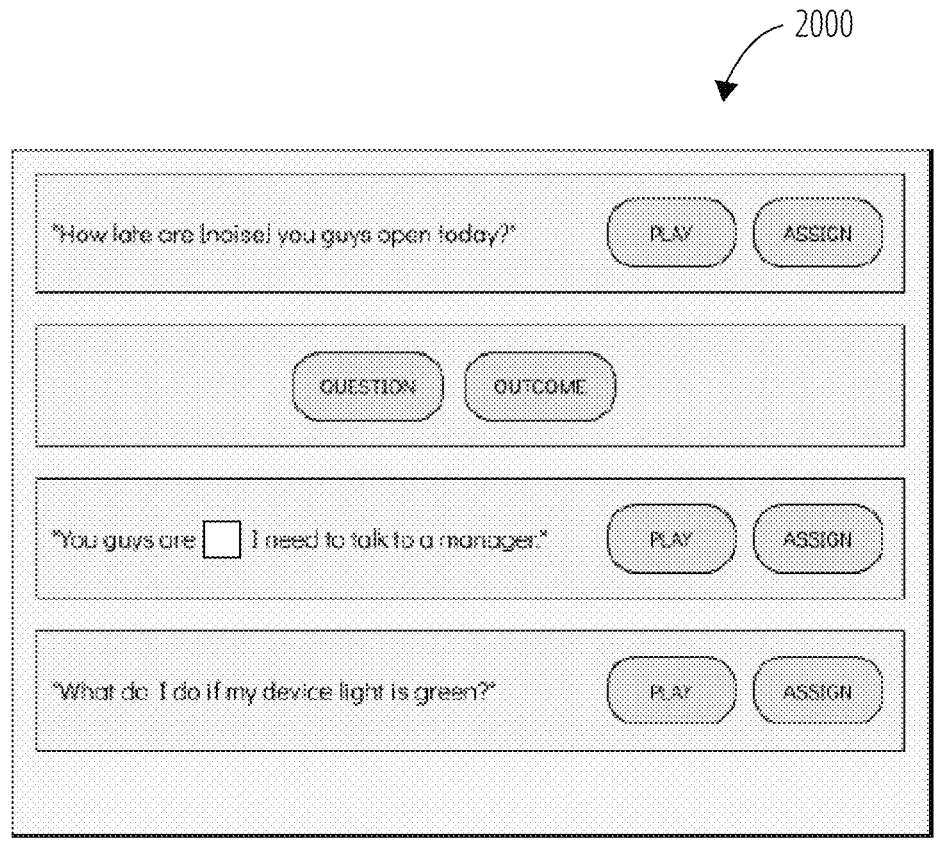
FIG. 20B depicts the call flow control interface 2000 in another aspect.
Figure 20C:
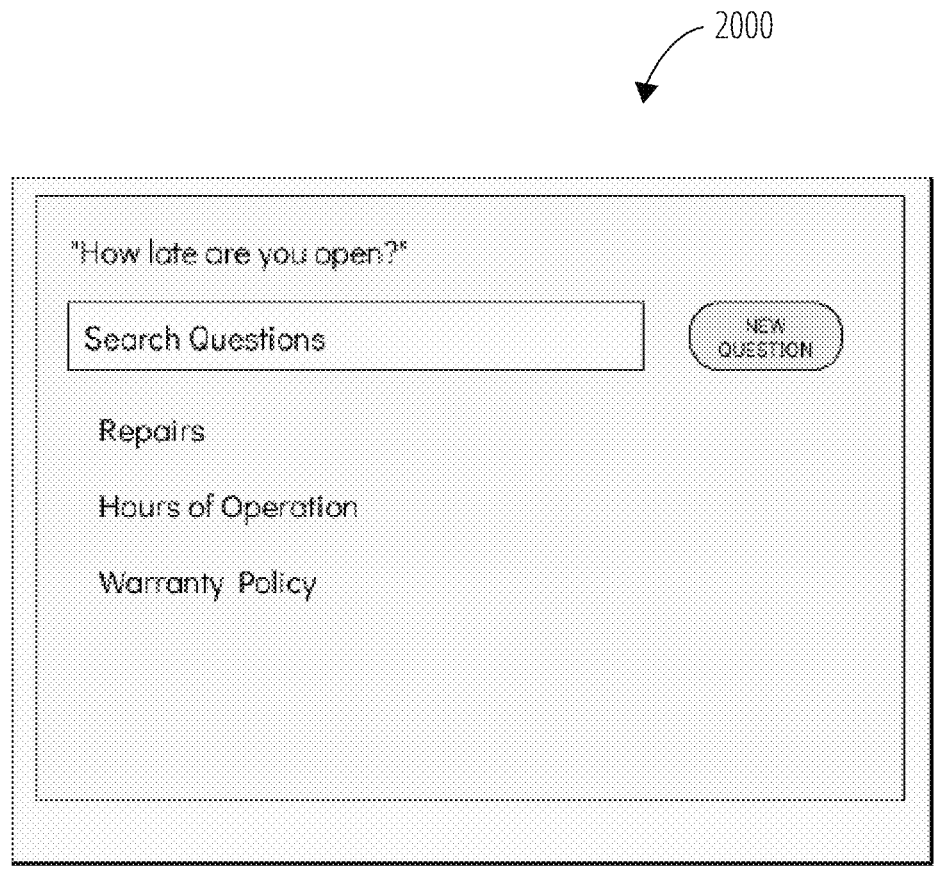
FIG. 20C depicts the call flow control interface 2000 in yet another aspect.

In one embodiment, a hosted script node such as hosted script node 1920 may include these properties:
- Script Name—The name of the hosted script
- Script Content—An editor (e.g., Javascript editor) for the hosted script.
- Save Script
- Console
- Link to documentation A call flow control interface 2000 in one embodiment for transcripts and recordings from conversations in which an ender node (e.g., ender node 1506) is not configured to handle the outcomes is depicted in FIG. 20A, FIG. 20B, and FIG. 20C. For each call, an administrator may mark the correct outcome or type an answer to the question.

Figure 21:
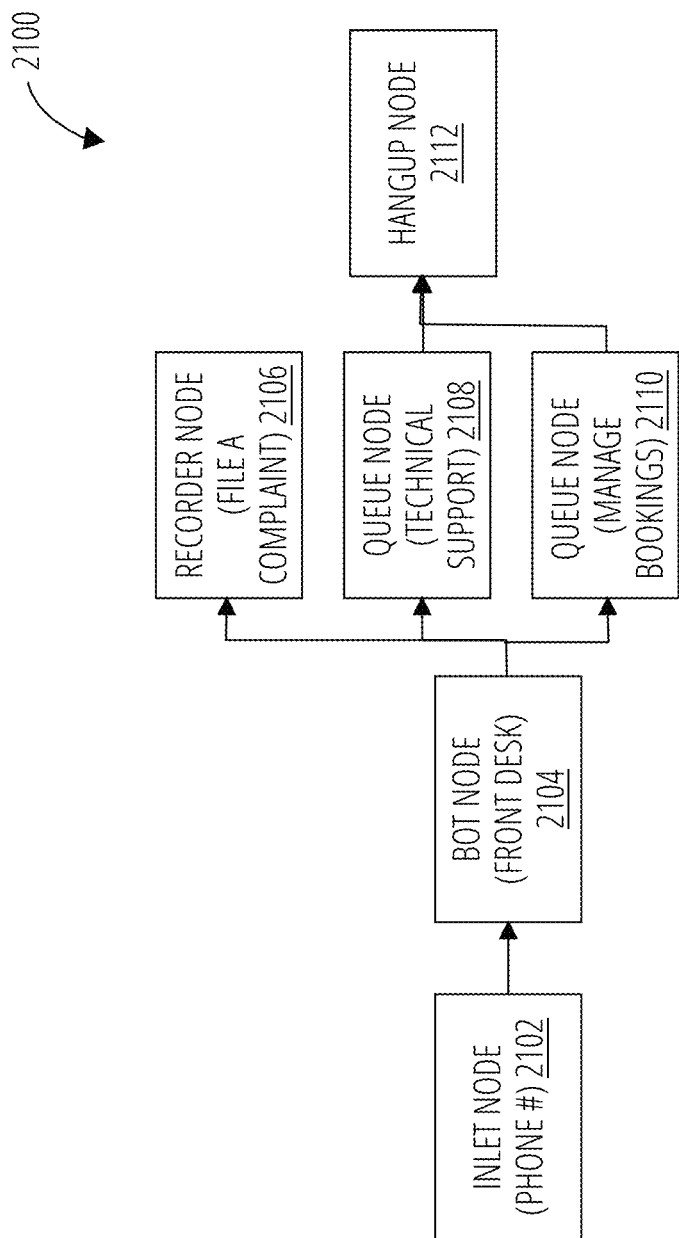
FIG. 21 depicts a call flow 2100 in accordance with one embodiment.

FIG. 21 depicts a call flow 2100 in one embodiment including an inlet node 2102, a bot node (front desk) 2104, a recorder node (file a complaint) 2106, a queue node (technical support) 2108, a queue node (manage bookings) 2110, and a hangup node 2112.

An inlet node 2102 receives calls into the call flow 2100. All calls are routed first to a bot node (front desk) 2104. A greeting and outcomes may be configured for the bot node (front desk) 2104, such as:
- Technical support
- Manage bookings
- File a complaint A different queue node is included in the call flow 2100, each a child of the bot node (front desk) 2104, and each for routing calls with a different determined outcome. The queue node (technical support) 2108 receives calls for callers expressing a desire for technical support. The queue node (manage bookings) 2110 receives calls for callers that want to book travel. From the queue nodes, the call flow 2100 proceeds to a hangup node 2112 for termination. A recorder node (file a complaint) 2106 receives and records complaint calls.

Human agents may be assigned to the queue node (technical support) 2108 and queue node (manage bookings) 2110. The agent for the queue node (technical support) 2108 may be assigned a tag such as "queue: technical support". If a the caller asks for technical support, the configured agent is connected to the caller via the queue node (technical support) 2108. They have a conversation and then the agent operates a control to direct the call to the hangup node 2112.

Figure 22:
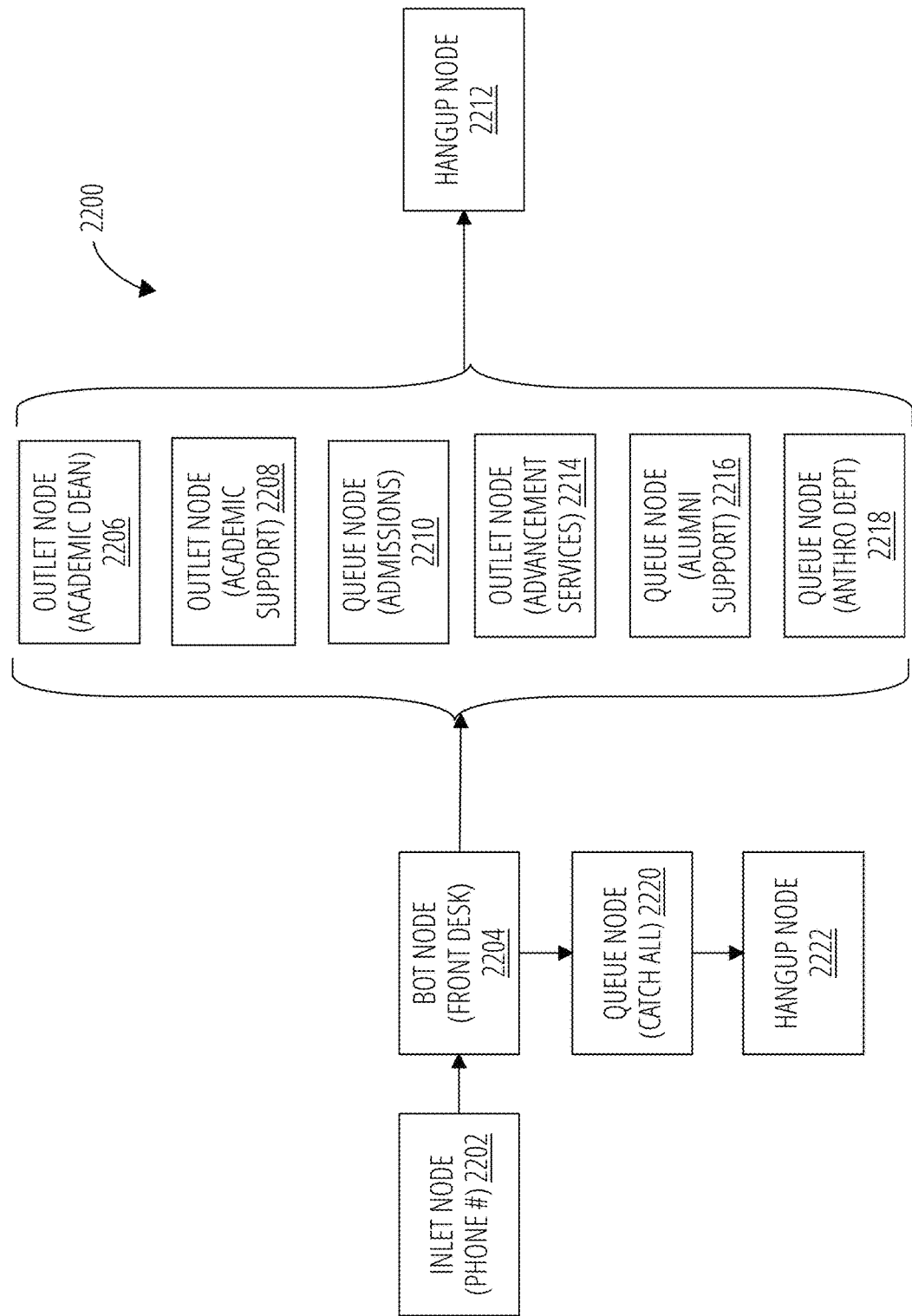
FIG. 22 depicts a call flow 2200 in accordance with one embodiment.

FIG. 22 depicts a call flow 2200 for a university in one embodiment including an inlet node 2202, a bot node (front desk) 2204, an outlet node (academic dean) 2206, an outlet node (academic support) 2208, a queue node (admissions) 2210, a hangup node 2212, an outlet node (advancement services) 2214, a queue node (alumni support) 2216, a queue node (anthro dept) 2218, a queue node (catch all) 2220, and a hangup node 2222.

The call flow 2200 implements a broad fan out to reflect a confederation of university staff and employees from various departments, which may include a few regular off-duty agents. Phone numbers for these people and departments may be spread out across various websites and directories. Given the distributed nature of the organization, it would typically be challenging to provide call center analytics.

A catch-all number is assigned to an inlet node 2202 that routes to a bot node (front desk) 2204 that both answers common questions (e.g., admissions deadlines) and also routes to a wide array of departments (outlet node (academic dean) 2206, outlet node (academic support) 2208, queue node (admissions) 2210, outlet node (advancement services) 2214, queue node (alumni support) 2216, queue node (anthro dept) 2218), and to a default queue node when none of these departments are suitable for the caller (queue node (catch all) 2220). Each routing branch eventually terminates at a hangup node (hangup node 2222, hangup node 2212). In one embodiment, university agents may mark themselves as "On-Call" to the call flow 2200, and they receive SMS messages and browser notifications when a call is ready for service at a queue node they are assigned to.

Figure 23:
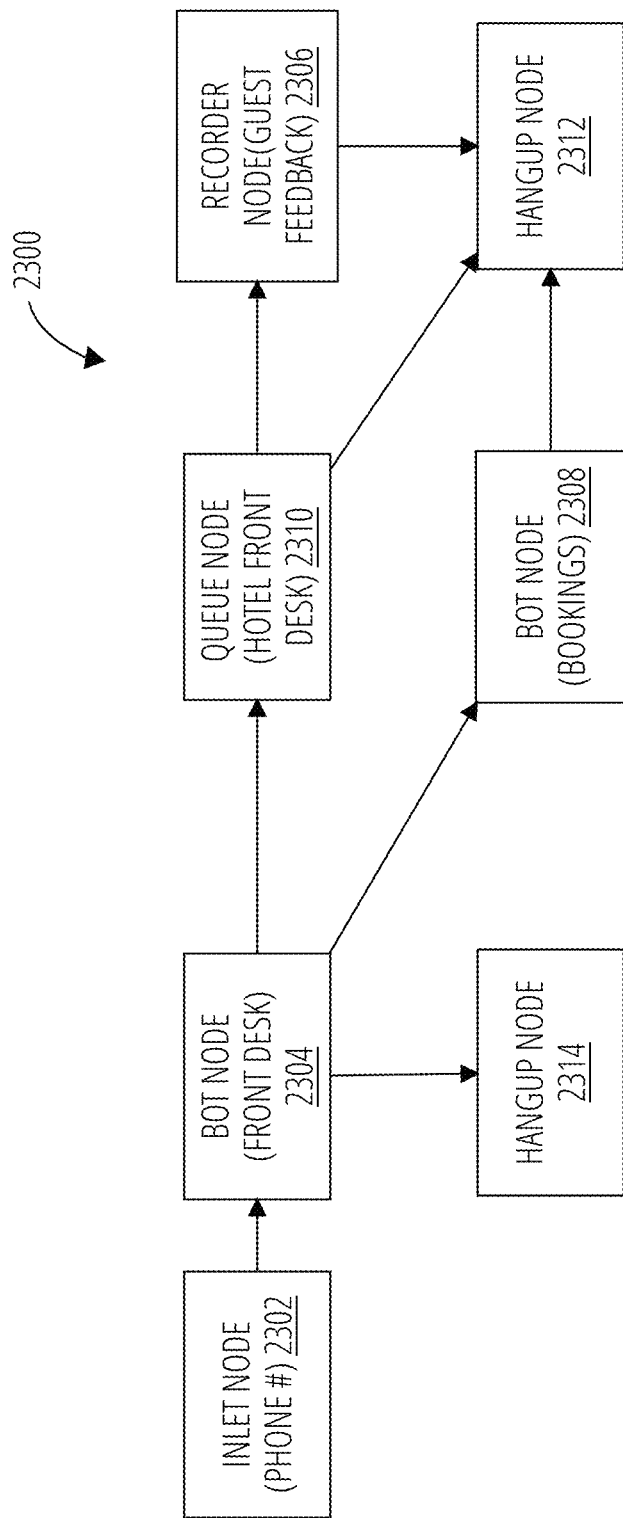
FIG. 23 depicts a call flow 2300 in accordance with one embodiment.

In one embodiment, an outlet node such as outlet node (academic dean) 2206 and/or outlet node (academic support) 2208 and/or outlet node (advancement services) 2214 may include these properties:
- Type
  - Phone number
  - SIP address
- Address—The phone number or SIP address
- Proxy
  - True—Continue to record and process analytics about the call after routing the call from the outlet node.
  - False—End the recording and processing upon routing.
- Ringback (only if Proxy is True)
  - Traditional Ringback
  - Proprietary Ringback
  - Hold Music
    - Custom Upload
    - Multiple licensed defaults FIG. 23 depicts a call flow 2300 for a hotel front desk in one embodiment including an inlet node 2302, a bot node (front desk) 2304, a recorder node(guest feedback) 2306, a bot node (bookings) 2308, a queue node (hotel front desk) 2310, a hangup node 2312, and a hangup node 2314.

The call flow 2300 may be less complicated than many other types of call flows, however, it provides substantial automation potential. Additionally, given the staff at a hotel may be often busy with other tasks, wait times may be long and bursty. The hotel has its main number assigned to an inlet node 2302 via their telephony provider. The inlet node routes to a bot node (front desk) 2304 that has a large number of intents (outcomes) configured. For example the AVA configured for the bot node (front desk) 2304 may answer questions about hours, hotel amenities, and upcoming events. The bot node (front desk) 2304 may additionally route to several departments, e.g., the front desk (queue node (hotel front desk) 2310) and the reservations desk (bot node (bookings) 2308).

The form filling bot node (bookings) 2308 may collect reservation information and route to the reservation department. If the reservation department is closed (and thus no matchmaking to an active agent can occur), a failsafe route from the queue node (hotel front desk) 2310 directs the call to recorder node(guest feedback) 2306. The recorder node (guest feedback) 2306 may be configured with a prompt thanking the caller, and the recorder node(guest feedback) 2306 may be configured to output call information via emailed to the reservation email address to be processed at a later time. When the caller says they want to leave feedback, they may be routed to a guest feedback form filling bot node (not depicted) that performs a survey and sends it to management before directing the call to the hangup node 2312.

A second call flow (not shown) may be implemented to handle internal calls, such as requests for room service, turn down service, Wi-Fi technical support, and valet service.

Figure 24:
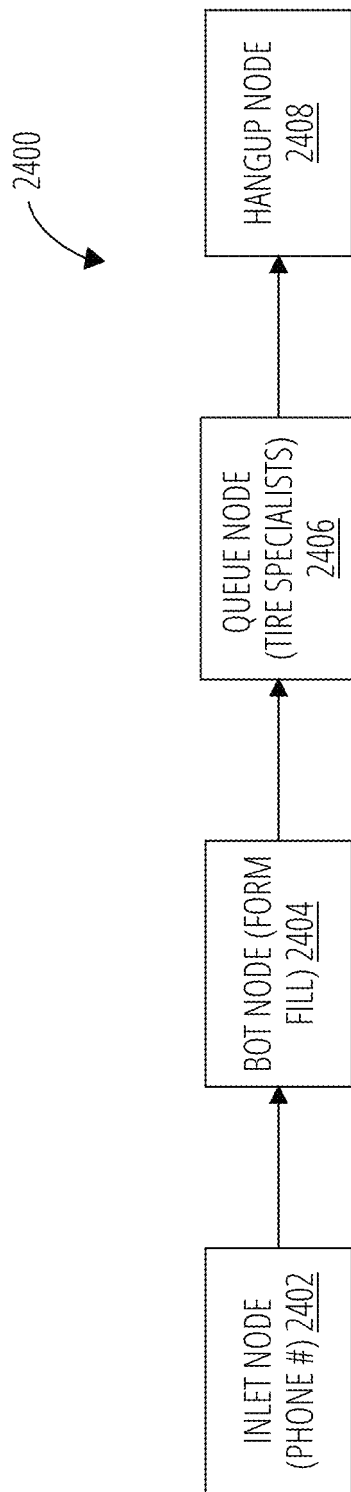
FIG. 24 depicts a call flow 2400 in accordance with one embodiment.

In one embodiment, a recorder node such as recorder node(guest feedback) 2306 may include these properties.
  Recording type
    Fixed Duration
      Seconds per recording
      Until speech stops
  2. Recording prompt or sound
  3. Enable Notifications
    Trigger
      All recordings
    b. Email notification
      Email address
    SMS notification
      Numbers
    Webhook
      GET/POST
      URI FIG. 24 depicts a call flow 2400 for a tire retail store in one embodiment including an inlet node 2402, a bot node (form fill) 2404, a queue node (tire specialists) 2406, and a hangup node 2408.

In the call flow 2400 a main phone number is bound to inlet node 2402 and from there directed to bot node (form fill) 2404 which presents the caller with a form. The form comprises a survey that asks, for example:
  Customer name
  Car make
  Car model
  Driving weather conditions
  Tire size
  Are you buying for a fleet or yourself?

The call is then routed into a single queue node (tire specialists) 2406. The tag generated in response to the answer to the fleet question on the form is used to match with the available agents, some of whom are specialists in the lucrative fleet business. Initially, agents that handle fleet calls have the agent tag assigned "fleet: true" and the queue node will preferentially match a call indicating a fleet purchase to bootstrapped agents with that tag. Over time, if use of the S model (see S model 1622) is enabled in the queue node (tire specialists) 2406, the S model learns not only which agents are best at handling fleet calls, but also, which agents are most familiar with certain car makes and driving conditions. All of these tags may be applied for improved matching of calls to agents in the future.

If the caller is unmatchable, they are quickly routed to the hangup node 2408. The form information may be emailed to the company's email ticketing system.

Figure 25A:
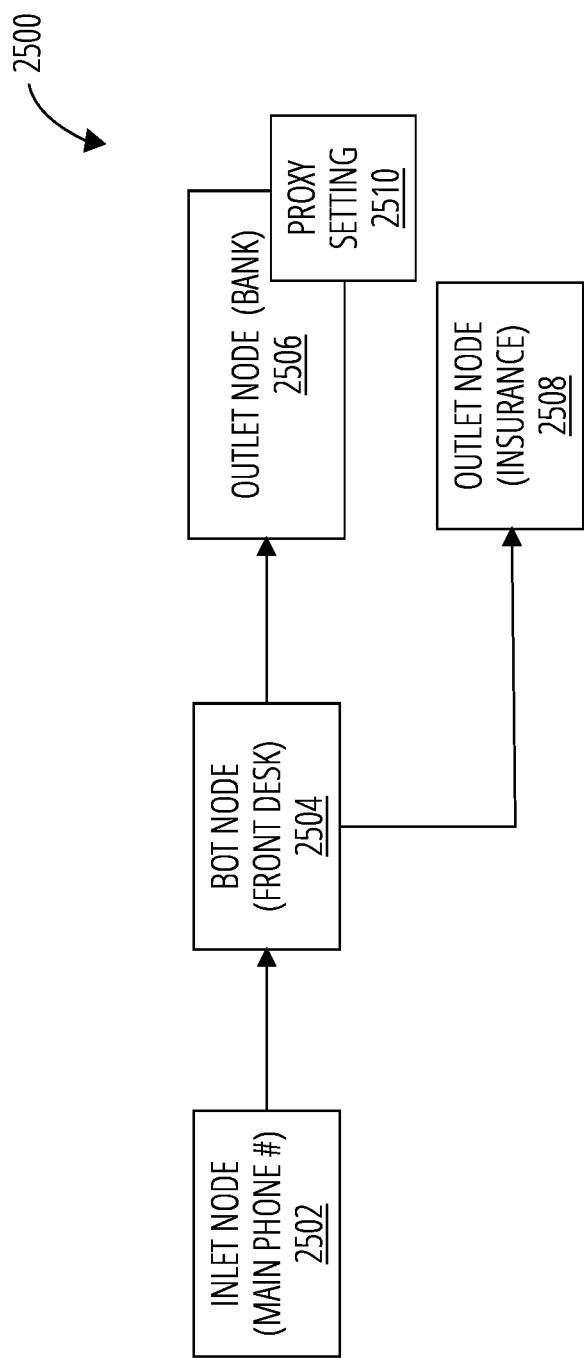
FIG. 25A depicts a call flow 2500 in accordance with one embodiment.

FIG. 25A depicts a call flow 2500 for a financial services organization in one embodiment including an inlet node 2502, a bot node (front desk) 2504, an outlet node (bank) 2506, and an outlet node (insurance) 2508.

The financial services organization in this example has two divisions: Bank and Insurance. The call centers for these divisions are independently operated, and therefore, agents only belong to one organization or the other. There may be three phone numbers to reach the call centers:
  Financial General
  Bank Direct
  Insurance Direct The general number is assigned to an inlet node 2502 and from there directs to a single bot node (front desk) 2504 that routes callers to the distinct organizations via outlet node (bank) 2506 and outlet node (insurance) 2508. In the case of Bank, there may be 10,000 agents, with over 1,000 discrete skills. Some of these skills are minor (FOOTBAL_TEAM: COWBOYS) and some are critical (ROLE:SUPERVISOR).

One or both outlet nodes may have a proxy setting 2510 enabled to continue to record and process analytics about the call after routing the call from the outlet node. Agents are assigned many different skills via tags, however some map directly onto queues they are intended to serve (QUEUE: MORTGAGES). Initially, the bootstrapping may perform well, as the agents are well-segmented into queues they are trained to handle.

However, understaffing may begin to result in longer hold times. Over time, the agents start receiving calls from queues they were not initially assigned to. Due to the evolving knowledge base of call and agent information, cross-trained agents are discovered to be more than competent at handling calls from queues they were not initially assigned to.

In the Insurance division, things may work differently. Agent matchmaking may be more complicated, and in their previous ACD, over-constrained. They instead use a form-filling bot to gather information about the caller and then fluidly match agents based on skills and experience.

Figure 25B:
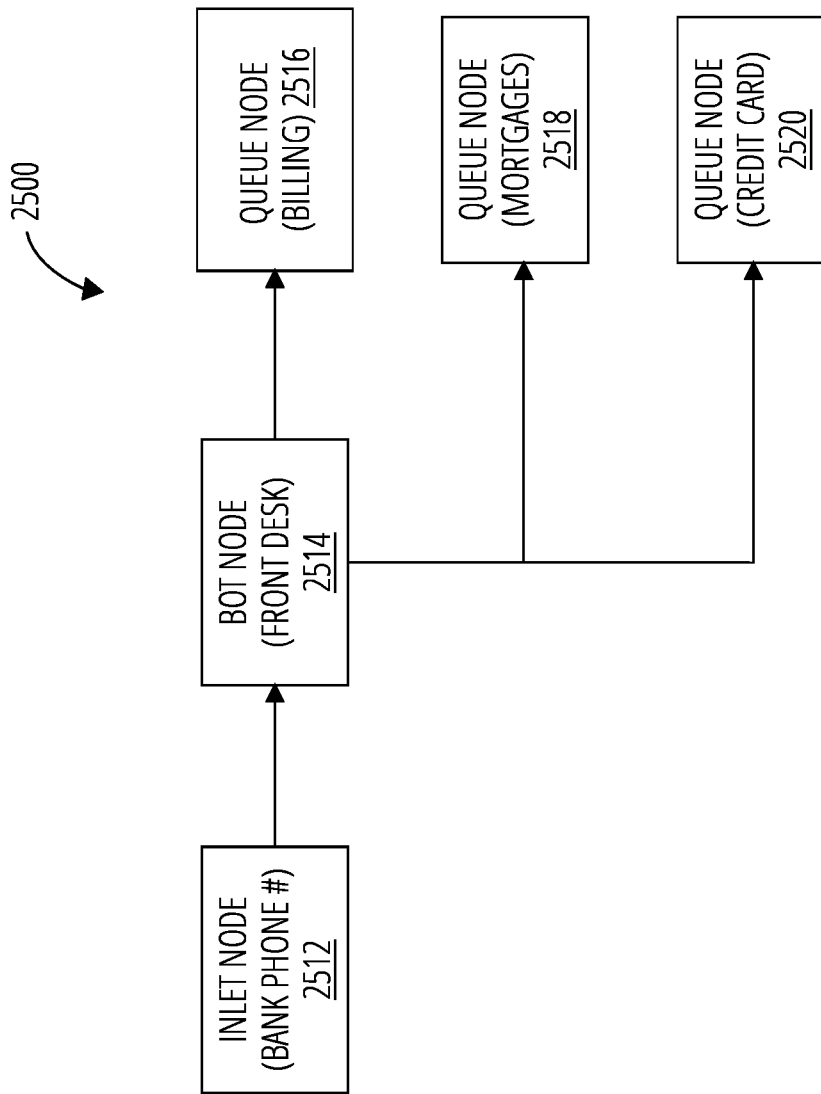
FIG. 25B depicts the call flow 2500 in another aspect.

FIG. 25B depicts the call flow 2500 in the bank division in additional aspects including an inlet node 2512, a bot node (front desk) 2514, a queue node (billing) 2516, a queue node (mortgages) 2518, and a queue node (credit card) 2520. A call routed from the outlet node (bank) 2506 is received at inlet node 2512, routed to bot node (front desk) 2514, and from there to one of several queue nodes for different departments (queue node (billing) 2516, queue node (mortgages) 2518, or queue node (credit card) 2520).

Figure 25C:
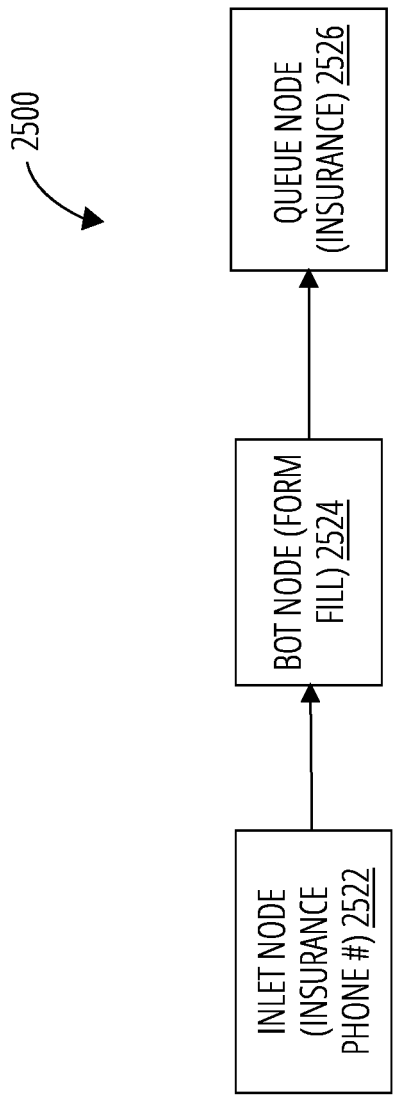
FIG. 25C depicts the call flow 2500 in yet another aspect.

FIG. 25C depicts the call flow 2500 in the insurance division in additional aspects including an inlet node 2522, a bot node (form fill) 2524, and a queue node (insurance) 2526. A call routed from the outlet node (insurance) 2508 is received at the inlet node 2522 and routed from there to the bot node (form fill) 2524 to have the caller fill out a form identifying more details of the reason for the call. From there the call is routed to the general queue node (insurance) 2526 for service by an agent.

FIG. 26-FIG. 36 depict embodiments of a call classification, metric generation, and anomalous call detection system and techniques. Aspects of these embodiments may be utilized for example to implement aspects of the machine learning models 112, heuristic algorithms 108, alert generator 126, machine learning models 204, and/or learning function 206.

Figure 26:
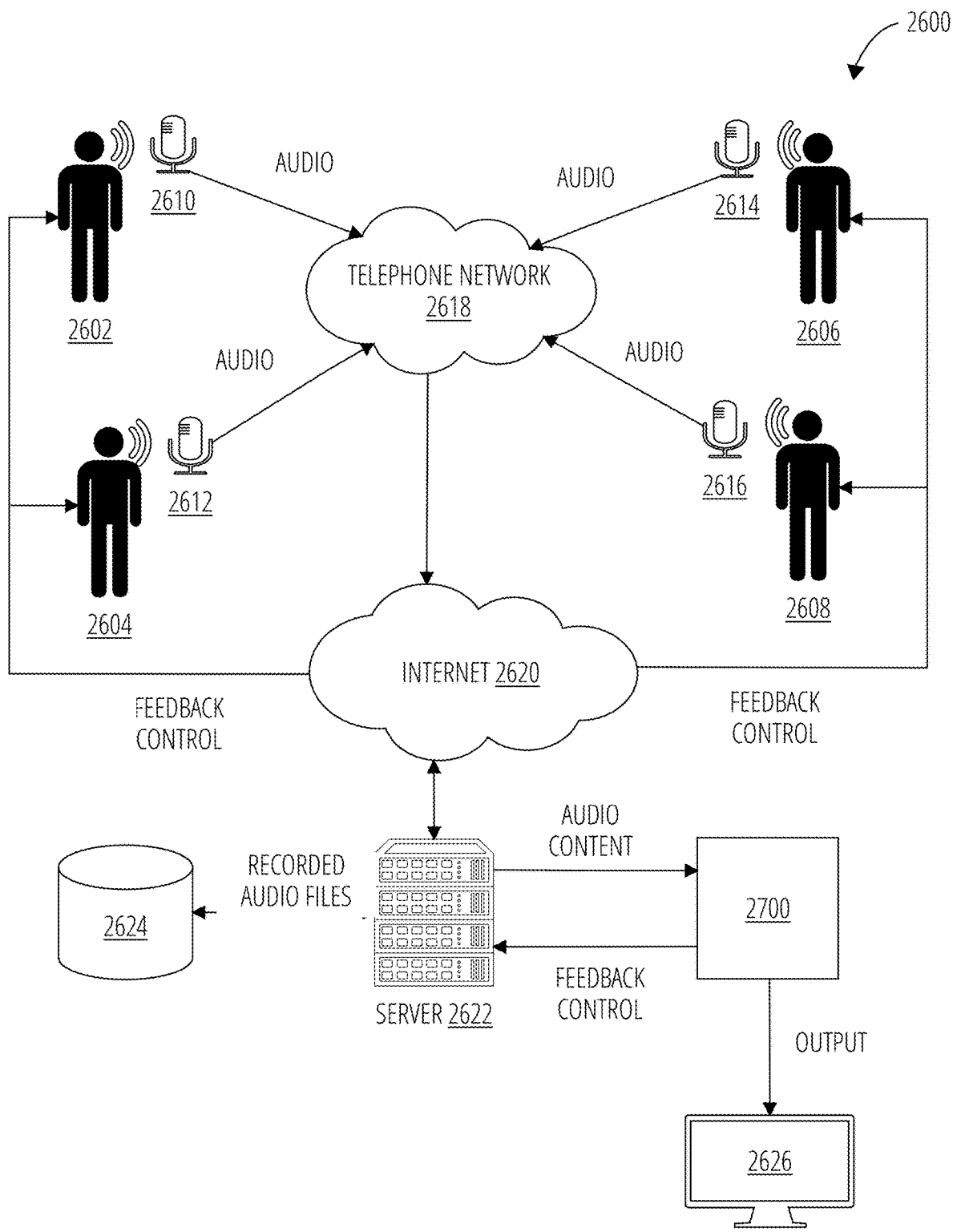
FIG. 26 depicts an embodiment of an audio environment 2600.

Referring to FIG. 26, the audio environment 2600 comprises a first audio provider 2602, a second audio provider 2604, a third audio provider 2606, a fourth audio provider 2608, a first audio transmitting device 2610, a second audio transmitting device 2612, a third audio transmitting device 2614, a fourth audio transmitting device 2616, a telephone network 2618, an internet 2620, a server 2622, an audio files control memory structure 2624, a machine display 2626, and an audio analysis system 2700.

The first audio provider 2602, the second audio provider 2604, the third audio provider 2606, and the fourth audio provider 2608 produce speech, which may be converted to audio. The first audio provider 2602, the second audio provider 2604, the third audio provider 2606, and the fourth audio provider 2608 may be a human, a machine configured to produce speech, or other structure capable of producing speech.

The first audio transmitting device 2610, the second audio transmitting device 2612, the third audio transmitting device 2614, and the fourth audio transmitting device 2616 receive the speech from the first audio provider 2602, the second audio provider 2604, the third audio provider 2606, and the fourth audio provider 2608, respectively. An audio transmitting device may receive speech from one or more audio providers. The first audio transmitting device 2610, the second audio transmitting device 2612, the third audio transmitting device 2614, and the fourth audio transmitting device 2616 transform the speech into audio and send the audio to the telephone network 2618. Each audio transmitting device may comprise a receiver to convert the sound wave associated with the speech to a electronic signal (i.e., the audio).

The telephone network 2618 receives the audio from each of the audio transmitting devices and sends the audio via the internet 2620, to the server 2622. Each audio may be associated with one or more other audio.

The server 2622 receives the audio and may send the audio, as recorded audio files, to the audio files control memory structure 2624. The server 2622 may also send audio content to the audio analysis system 2700.

The audio analysis system 2700 receives the audio content and generates an output that is sent to the machine display 2626 and/or a feedback control, which may be sent to the server 2622. The feedback control may also be sent to one or more of the audio providers to alter the generation of the speech.

Figure 27:
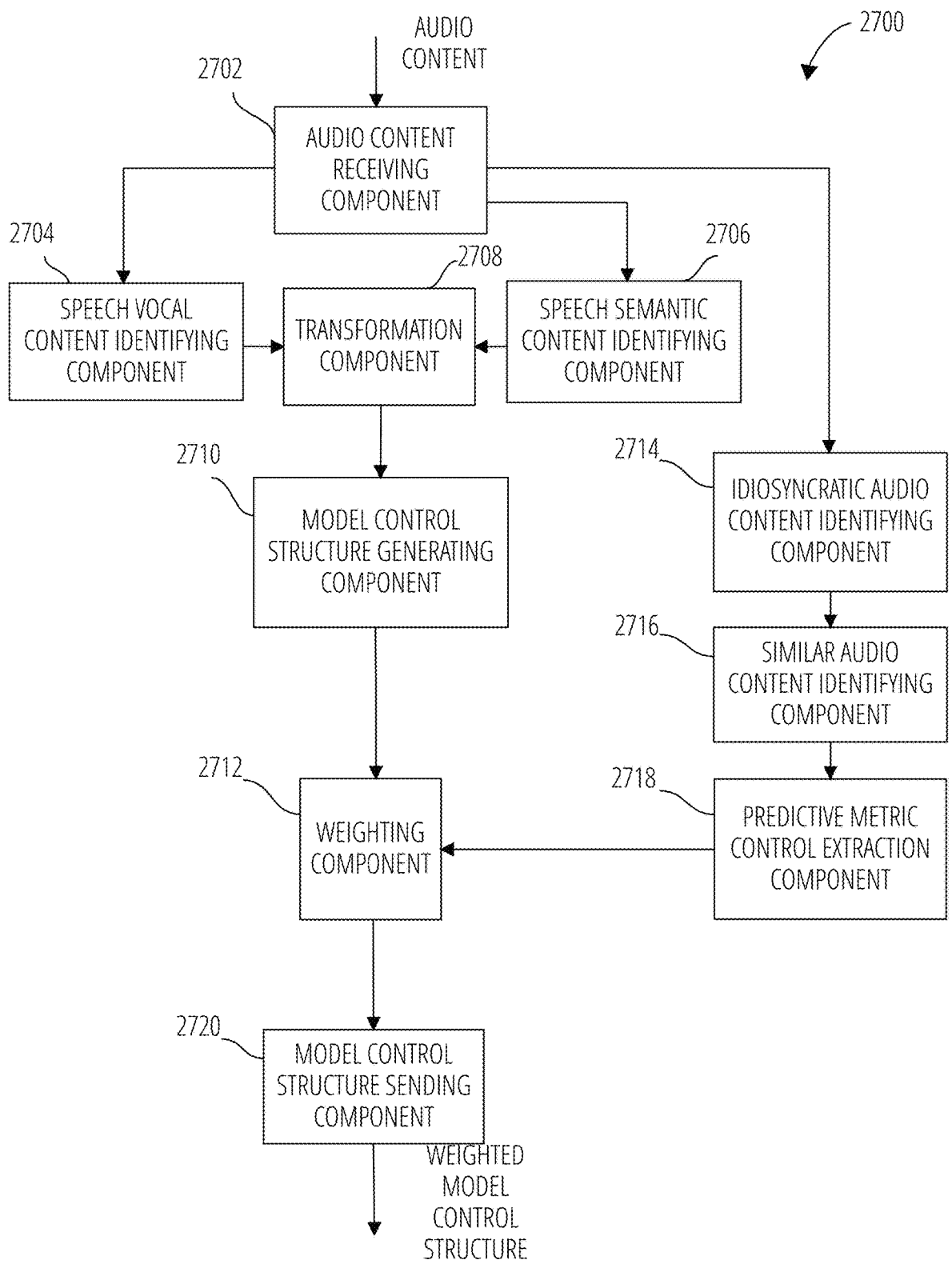
FIG. 27 depicts an embodiment of an audio analysis system 2700.

Referring to FIG. 27, the audio analysis system 2700 comprises an audio content receiving component 2702, a speech vocal content identifying component 2704, a speech semantic content identifying component 2706, a transformation component 2708, a model control structure generating component 2710, a weighting component 2712, an idiosyncratic audio content identifying component 2714, a similar audio content identifying component 2716, a predictive metric control extraction component 2718, and a model control structure sending component 2720.

The audio content receiving component 2702 may receive an audio content of human speech as an input. The audio content is sent to the speech vocal content identifying component 2704, the speech semantic content identifying component 2706, and the idiosyncratic audio content identifying component 2714.

The speech vocal content identifying component 2704 receives the audio content from the audio content receiving component 2702. The speech vocal content identifying component 2704 may analyze speech patterns, cadences, and tone, which may imply confidence, empathy, kindness, or satisfaction, among many other metrics to generate speech vocal content. The speech vocal content identifying component 2704 sends the speech vocal content to the transformation component 2708.

The speech semantic content identifying component 2706 receives the audio content from the audio content receiving component 2702. The speech semantic content identifying component 2706 may analyze the speech semantic content (what words were spoken) for clues as to how the conversation went against a trained set of metrics. The speech semantic content identifying component 2706 sends the speech semantic content to the transformation component 2708.

The transformation component 2708 merges and combines the outputs of the speech vocal content identifying component 2704 and the speech semantic content identifying component 2706 into a large vector. This vector may densely encode important features of both paths. The transformation component 2708 sends the combined vector to the model control structure generating component 2710.

The model control structure generating component 2710 receives the combined vector from the transformation component 2708. The model control structure generating component 2710 may be a dense neural network, or any other common machine learning technique. The combined information may be integrated into a model control structure. The model control structure may be a multi-modal model control structure. The model control structure is sent to the weighting component 2712.

The idiosyncratic audio content identifying component 2714 receives the audio content from the audio content receiving component 2702. The idiosyncratic audio content identifying component 2714 may utilize several methods when analyzing audio content to determine at how common or rare the audio content may be (e.g., does the audio content contain unusual words or phrases, is the audio content noteworthy). The idiosyncratic audio content identifying component 2714 sends the idiosyncratic audio content to the similar audio content identifying component 2716.

The similar audio content identifying component 2716 receives the idiosyncratic audio content from the idiosyncratic audio content identifying component 2714. In cases where the audio content may be designated to be a poor fit for the direct call grading in isolation, the similar audio content identifying component 2716 may utilize a matching technique may be used to compare the audio content against similar audio content. This may be performed by extracting the word embedded vectors of the audio content into a matrix, and optionally combining audio content features (e.g., special features, signal intensity, variance, etc.) along with the word embeddings. This forms a large matrix representing the audio content. The one or more stored audio content files may be stored as a matrix or some indexed set of features such that matching may be quickly performed. Matching algorithms include euclidean or cosine distance, minimum flow, or distance along a space filling curve (i.e., a Hilbert curve). These matching algorithms may have a low- and high-fidelity step such that the majority of audio content may be filtered, rather than performing a linear search. The similar audio content identifying component 2716 sends the similar audio content to the predictive metric control extraction component 2718.

The predictive metric control extraction component 2718 receives the similar audio content from the similar audio content identifying component 2716. When an audio content is matched with a similar audio content, the predictive metric control extraction component 2718 may extract the labels and annotations on the similar audio content (i.e., the predictive metric control). The predictive metric control is sent to the weighting component 2712.

The weighting component 2712 receives the model control structure from the model control structure generating component 2710 and the predictive metric control from the predictive metric control extraction component 2718. The weighting component 2712 may average the similar audio content into the predicted call grade generated by the model control structure. The weighting component 2712 sends the weighted model control structure to the model control structure sending component 2720.

A noteworthiness metric may be used to decides the weighting in the average. This system may be primarily unsupervised, and improves with the number of examples. This increases the serendipitous similarity of the most-similar audio content.

Audio Content Types

Once direct call grading and call similarity have been trained with a sufficiently large dataset, they may accurately replicate human grading. The two systems complement each other, as they excel at opposite ends of the idiosyncratic spectrum. As both systems produce outputs on the same scale (the former producing a vector estimating the result of a human response and the latter finding a human response from similar audio content), they may be combined in a weighted average by the weighting component 2712.

Where an audio content lies on the idiosyncratic spectrum may be estimated using call similarity. The similarity distance between the target audio content and a small set of randomly sampled audio content files may be computed. The higher the average match (lower distance to chosen audio content), the less idiosyncratic the audio content may be, and, therefore, the more weight may be placed on similarity.

If the average similarity match (higher is less distinct) over the random sample of audio content is:
Average Similarity
then the weighted average computed is:
Weighted Average
where g is the call grade, d is the result of sending the audio content and the transcript of the audio content through the direct call grading neural network, and s is the grade from the similar audio content in the similarity system.

While training the system may require large amounts of data and computation, running direct grading may typically be relatively quick. Call similarity may perform many matrix to matrix distance calculations between the audio content and the one or more stored audio content files and, therefore, may take longer to query than to train.

In one example implementation, direct call grading may be implemented using state of the art speech recognition, word embedding shallow neural networks, and a multimodal long short-term memory (LSTM) recurrent neural network. Call similarity may be performed by embedding the sequence of words into a sequence of vectors, with several signal features (i.e., energy, variance, spectral coefficients) appended to the word embedding. The distance function between two similarity matrices may minimize the distance between paired word/signal vectors.

The model control structure sending component 2720 receives the weighted model control structure from the weighting component 2712. The model control structure sending component 2720 may output the weighted model control structure as a vector of results, which may reproduce custom metrics (e.g., empathy, success, trust, competence), survey results (e.g., "On a scale of 1 to 5, how well did the agent resolve your issue?"), or other predictive analytics (e.g., future purchases, customer value, gender, demography). The weighted model control structure may also be sent as a feedback control to influence the creation of future audio records.

Figure 33:
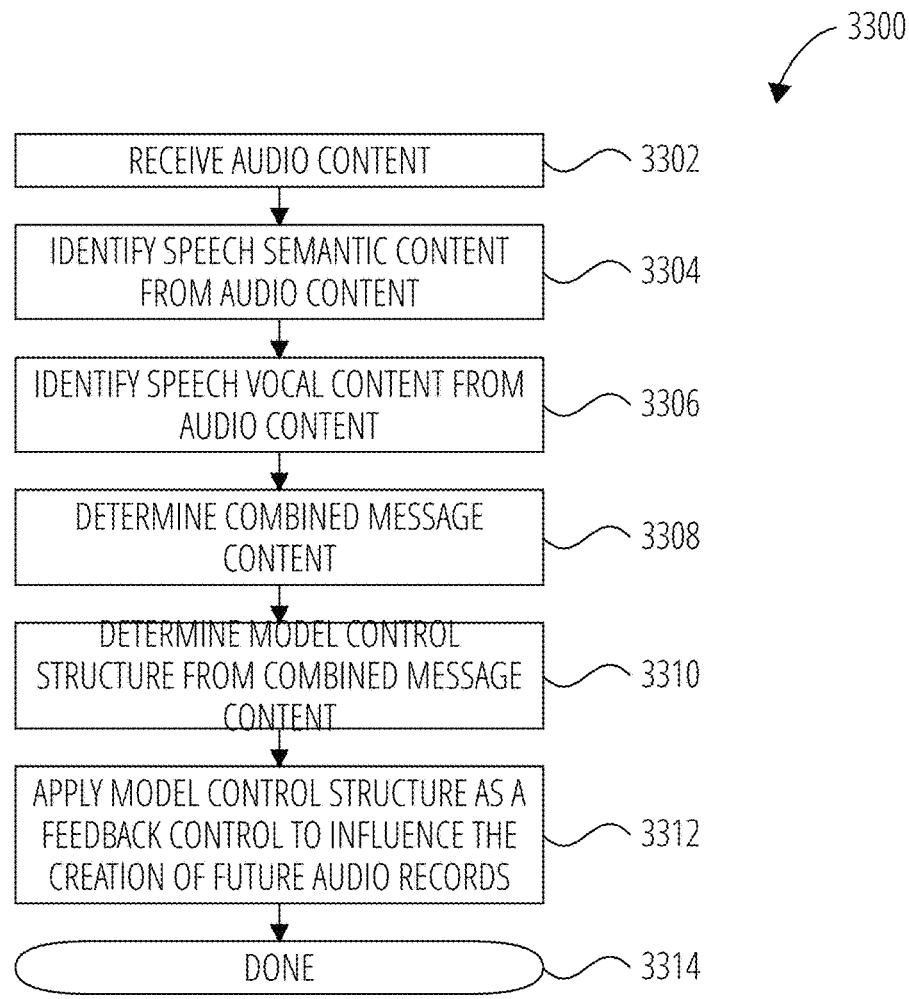
FIG. 33 depicts an embodiment of an audio analysis process 3300.
Figure 34:
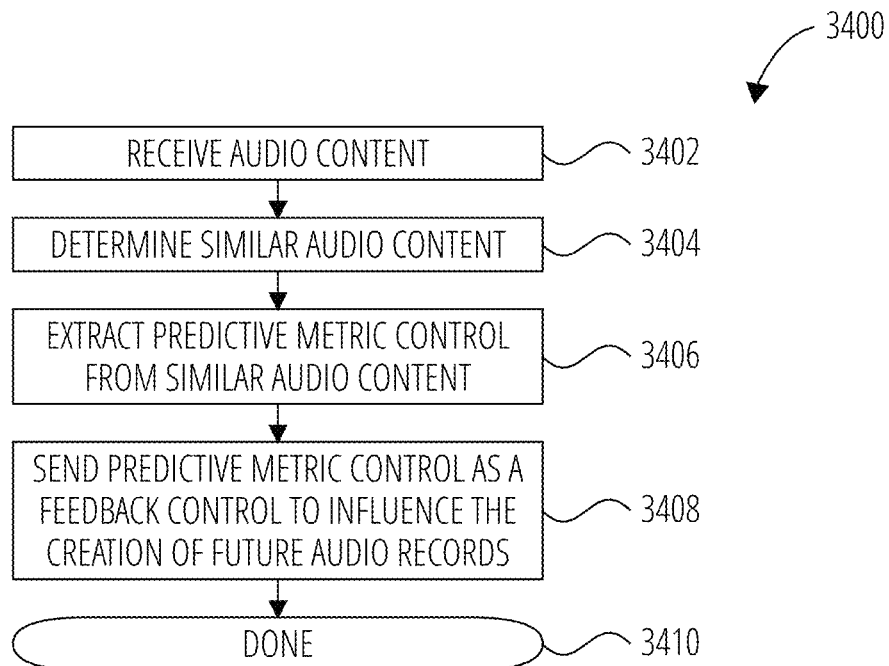
FIG. 34 depicts an embodiment of an audio analysis process 3400.

The audio analysis system 2700 may be operated in accordance with the processes describe in FIG. 33 and FIG. 34.

Figure 28:
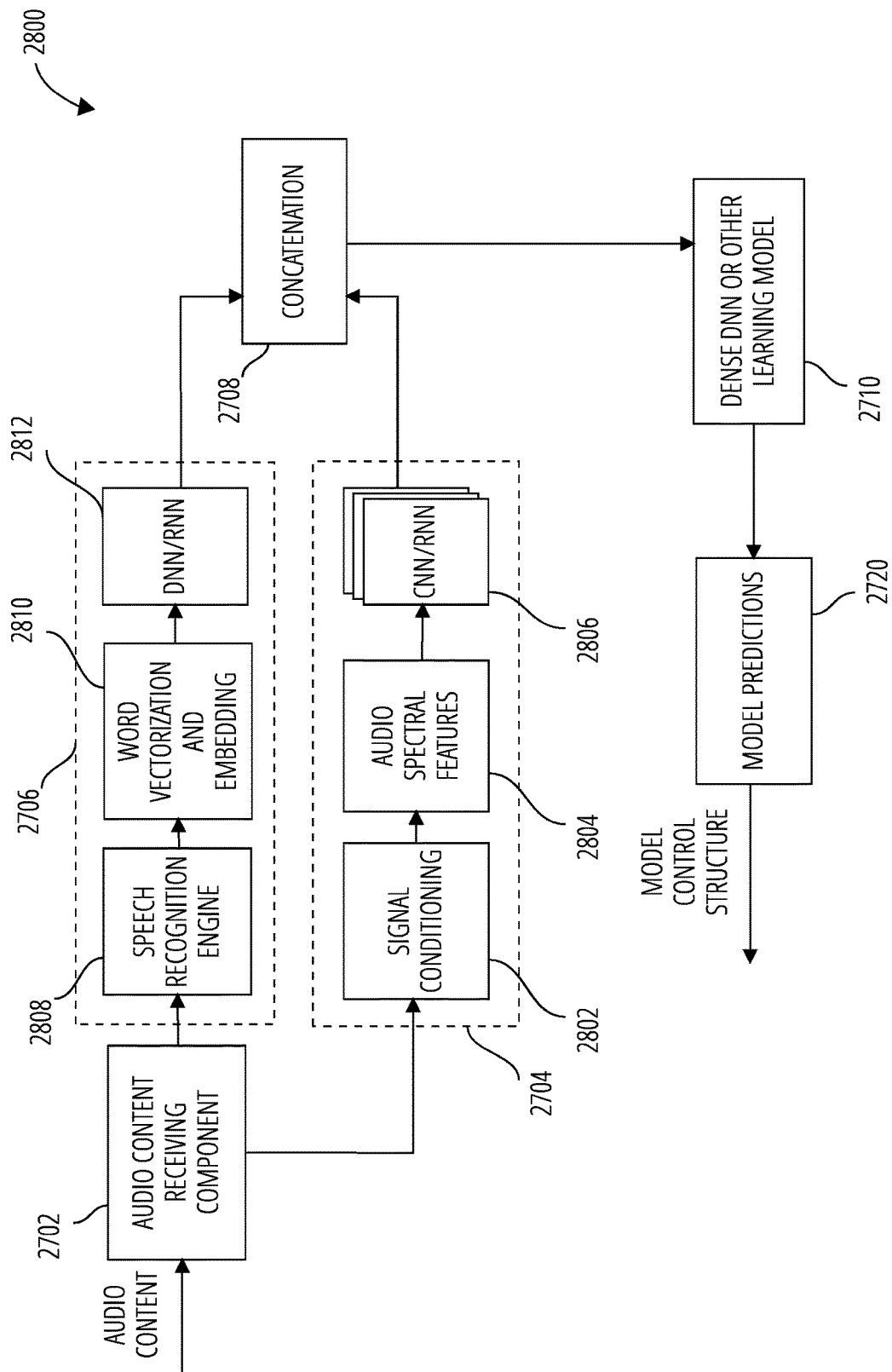
FIG. 28 depicts an embodiment of an audio analysis system 2800.

Referring to FIG. 28, the audio analysis system 2800 comprises an audio content receiving component 2702, a speech vocal content identifying component 2704, a speech semantic content identifying component 2706, a transformation component 2708, a model control structure generating component 2710, and a model control structure sending component 2720. The speech vocal content identifying component 2704 may further comprise a signal conditioning component 2802, an audio spectral features component 2804, and a CNN/RNN component 2806. The speech vocal speech semantic content identifying component 2706 may further comprise a speech recognition engine component 2808, a word vectorization and embedding component 2810, and a DNN/RNN component 2812.

The audio content receiving component 2702 receives the audio content and sends the audio content to the speech recognition engine component 2808 and the signal conditioning component 2802.

The speech recognition engine component 2808 receives the audio content from the audio content receiving component 2702. The speech recognition engine component 2808 transcribes the audio content. The transcribed audio content is sent to the word vectorization and embedding component 2810.

The word vectorization and embedding component 2810 receives the transcribed audio content from the speech recognition engine component 2808. The word vectorization and embedding component 2810 vectorizes the words in the transcribed audio content and embeds them into a lower dimensional vector space. Many different methods may be used to transform text to a denser vector space including matrix methods, logistic regression, and neural networks. The audio speech recognition step and vectorization steps are trained on larger corpuses of general speech or text. The transcribed and vectorized audio content is sent to the DNN/RNN component 2812.

The DNN/RNN component 2812 receives the transcribed and vectorized audio content from the word vectorization and embedding component 2810. The DNN/RNN component 2812 is the speech portion of call grading. The DNN/RNN component 2812 may include hand-designed heuristics, regression models, Bayesian models, latent Dirichlet allocation (LDA), latent semantic indexing (LSI), decision trees, decision forests, support vector machines, or a neural network, with or without recurrent units. The DNN/RNN component 2812 may have a slot to emphasize a portion of the audio content. The DNN/RNN component 2812 may be trained to emphasize this portion or may receive an input with instructions to do so. The portion may be fixed or based on the size of the audio content. For example, the portion emphasized may be the final thirty seconds of the audio content. The DNN/RNN component 2812 sends the speech semantic content to the transformation component 2708.

The signal conditioning component 2802 receives the audio content from the audio content receiving component 2702. The signal conditioning component 2802 conditions the audio content to better isolate or prepare the audio content. This may include de-reverberation, noise removal, normalization, distortion correction, beam-forming, mixing, frequency-depending filtering, or any other digital signal processing methods that prepares the audio content for the downstream processing. The signal conditioning component 2802 sends the conditioned audio content to the audio spectral features component 2804.

The audio spectral features component 2804 receives the conditioned audio content from the signal conditioning component 2802. The audio spectral features component 2804 processes the conditioned audio content with a feature extractor to generate spectrograms or some other spectral features. The features may be a 2D array of time-frequency data. The signal conditioning component 2802 sends the extracted features to the CNN/RNN component 2806.

The CNN/RNN component 2806 receives the extracted features from the audio spectral features component 2804. The CNN/RNN component 2806 may be a one- or two-dimensional convolutional neural network, an ordinary stacked neural network (with or without recurrent units), matrix models, hand-designed heuristics, decision trees, decision forests, support vector machines, or any other machine learning model that may examine a time and/or frequency domain signal. While the diagram here shows a choice of neural networks in the speech-and audio-path, one or several other statistical learning methods may be combined. The CNN/RNN component 2806 generates the speech vocal content and sends the speech vocal content to the transformation component 2708.

The transformation component 2708 receives the speech semantic content from the DNN/RNN component 2812 and the speech vocal content from the CNN/RNN component 2806. The transformation component 2708 concatenates the speech semantic content and the speech vocal content into a combined vector and sends the combined vector to the model control structure generating component 2710.

The model control structure generating component 2710 receives the combined vector from the transformation component 2708. The model control structure generating component 2710 may be a dense neural network, or any other common machine learning technique. At this stage, the combined information may be integrated into a model control structure. The model control structure is sent to the model control structure sending component 2720.

The model control structure sending component 2720 receives the model control structure from the model control structure generating component 2710, generates model prediction controls, and sends model prediction controls to drive a machine state of one or more machines. The model control structure may be applied as a feedback control to influence the creation of future audio records.

The audio analysis system 2800 may be operated in accordance with the processes describe in FIG. 33 and FIG. 34.

Figure 29:
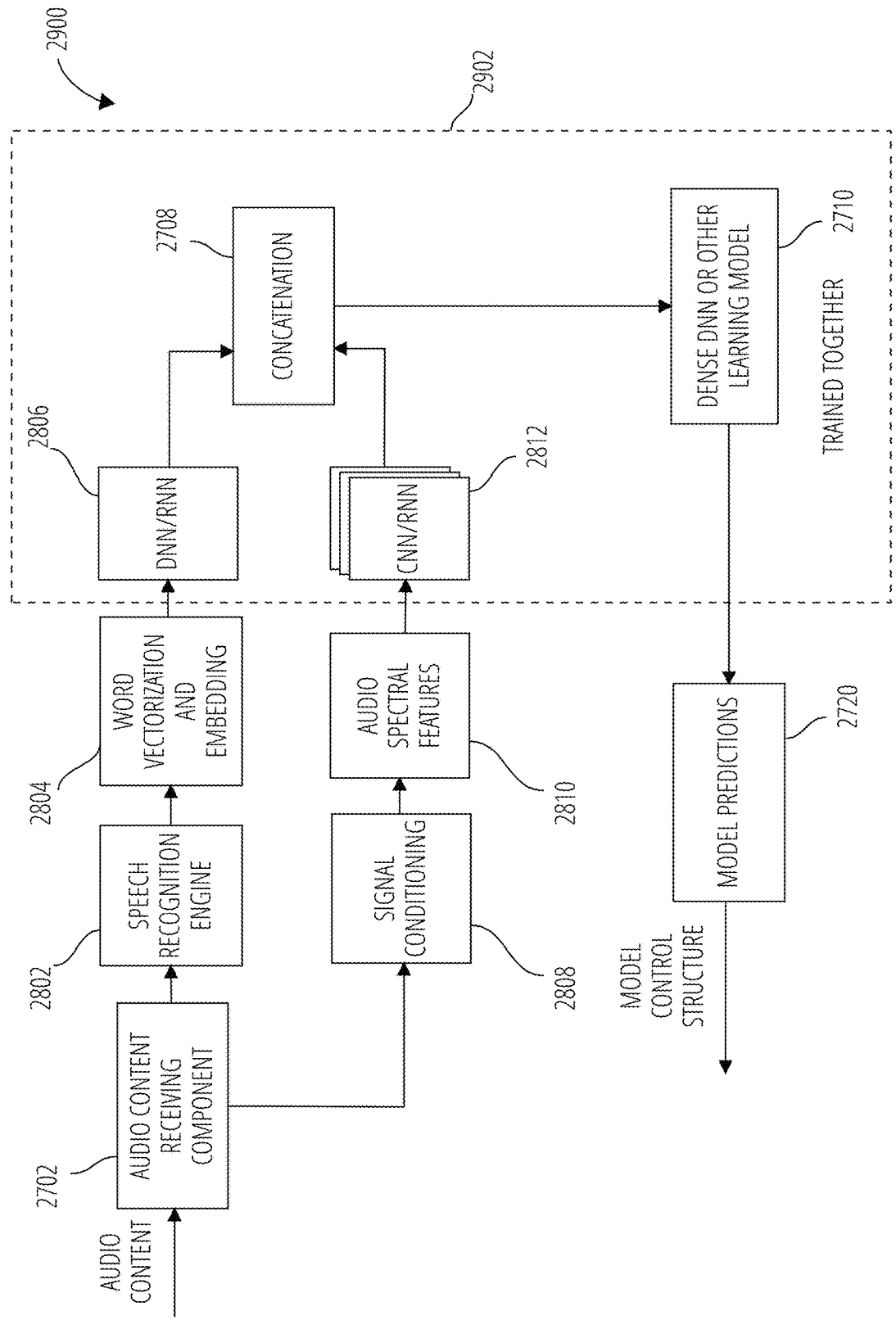
FIG. 29 depicts an embodiment of an audio analysis system 2900.

Referring to FIG. 29, the audio analysis system 2900 comprises an audio content receiving component 2702, a model control structure sending component 2720, a speech recognition engine component 2808, a word vectorization and embedding component 2810, a signal conditioning component 2802, an audio spectral features component 2804, and a call grading training component 2902. The call grading training component 2902 may further comprise a transformation component 2708, a model control structure generating component 2710, a DNN/RNN component 2812, and a CNN/RNN component 2806.

The call grading training component 2902 may be trained in a supervised manner using labelled pairs of audio recordings and desired model outputs. Portions of the model are either hard coded or trained on generic data. Depending on the complexity of the model and the quality of the audio data, the model may take variously sized datasets to train. Complex models may take tens of thousands of conversations to reach target accuracy. Once the model is fully-trained, it can be used as a replacement for manual human grading of calls, in some cases at human-level accuracy.

The audio analysis system 2900 may be operated in accordance with the processes describe in FIG. 33 and FIG. 34.

Figure 30:
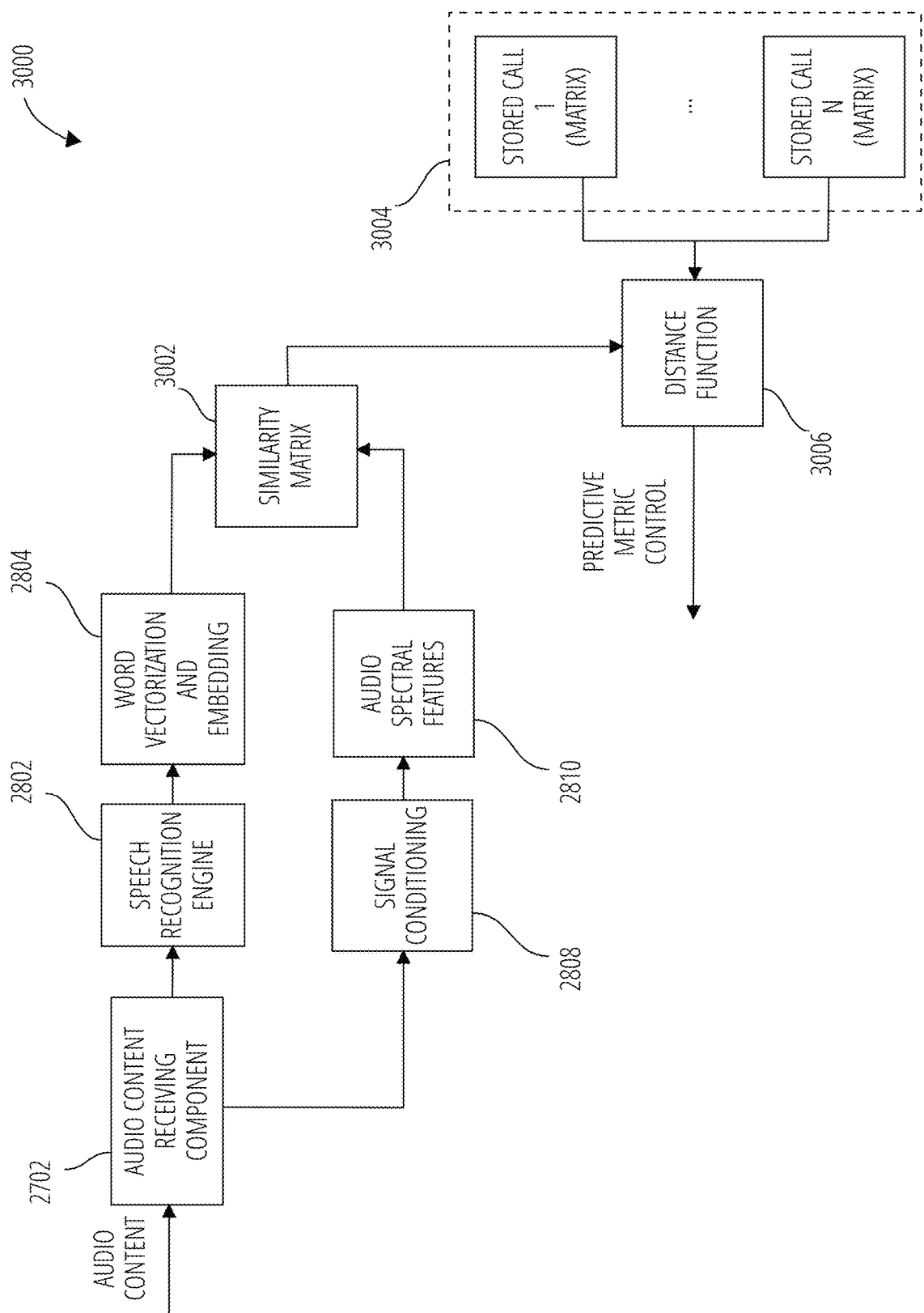
FIG. 30 depicts an embodiment of an audio analysis system 3000.

Referring to FIG. 30, the audio analysis system 3000 comprises an audio content receiving component 2702, a speech recognition engine component 2808, a word vectorization and embedding component 2810, a signal conditioning component 2802, an audio spectral features component 2804, a similarity matrix component 3002, a one or more stored audio content files 3004, and a distance function generating component 3006.

The audio content receiving component 2702, the speech recognition engine component 2808, the word vectorization and embedding component 2810, the signal conditioning component 2802, and the audio spectral features component 2804 operate as described above. The word vectorization and embedding component 2810 sends the transcribed and vectorized audio content to the similarity matrix component 3002. The audio spectral features component 2804 sends the extracted features to the similarity matrix component 3002.

The similarity matrix component 3002 receives the transcribed and vectorized audio content from the word vectorization and embedding component 2810 and the extracted features from the audio spectral features component 2804. The similarity matrix component 3002 concatenates the vectorized audio content and the extracted features into an audio content matrix that represents the audio content. The similarity matrix component 3002 sends the audio content matrix to the distance function generating component 3006.

The one or more stored audio content files 3004 may be formatted as a series of matrices. Each of the one or more stored audio content files 3004 may represent previous audio content that has been indexed with a set of features.

The distance function generating component 3006 receives the audio content matrix. The distance function generating component 3006 compares the audio content matrix to the one or more stored audio content files 3004. Matching algorithms include euclidean or cosine distance, minimum flow, or distance along a space filling curve (i.e., a Hilbert curve). These matching algorithms may have a low- and high-fidelity step so that the majority of calls may be filtered, rather than performing a linear search. When an audio content matrix is matched with one of the one or more stored audio content files 3004, the labels and annotations on the matched one or more stored audio content files 3004 are transformed into a predictive metric control. The predictive metric control may be applied as a feedback control to influence the creation of future audio records.

The audio analysis system 3000 may be operated in accordance with the processes describe in FIG. 33 and FIG. 34.

Figure 31:
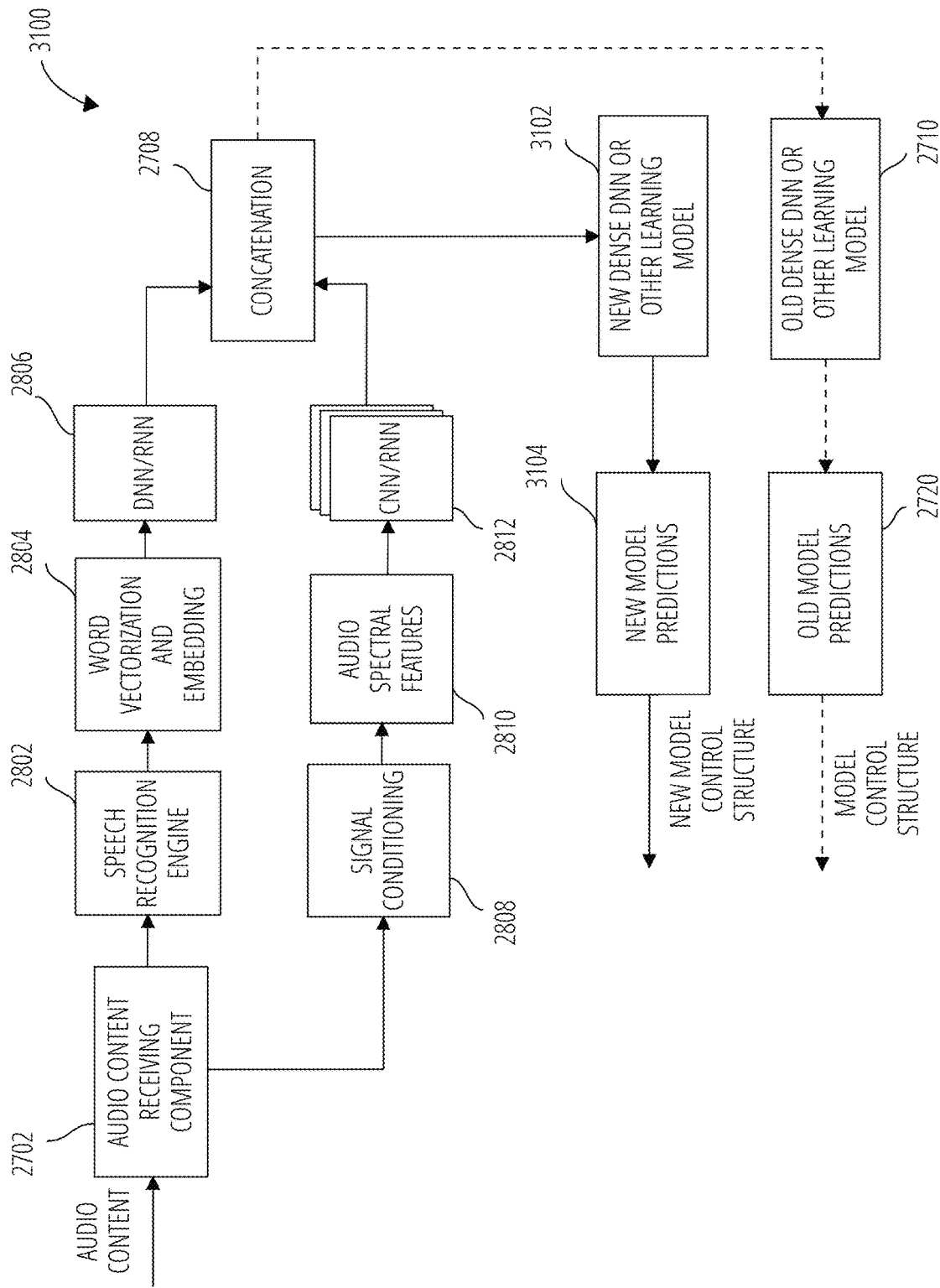
FIG. 31 depicts an embodiment of an audio analysis system 3100.

Referring to FIG. 31, the audio analysis system 3100 comprises an audio content receiving component 2702, a transformation component 2708, a model control structure generating component 2710, a model control structure sending component 2720, a speech recognition engine component 2808, a word vectorization and embedding component 2810, a DNN/RNN component 2812, a signal conditioning component 2802, an audio spectral features component 2804, a CNN/RNN component 2806, a new model control structure generating component 3102, and a new model control structure sending component 3104.

The audio analysis system 3100 may be retrained to utilize the new model control structure generating component 3102 and the new model control structure sending component 3104 in place of the model control structure generating component 2710 and the model control structure sending component 2720.

In some embodiments, the new model control structure generating component 3102 and the new model control structure sending component 3104 may be utilized with the model control structure generating component 2710 and the model control structure sending component 2720, providing multiple output controls. The audio analysis system 3100 may utilized one or more of the new model control structure generating component 3102 and the new model control structure sending component 3104, each generating a new model control structure. The new model control structures and the model control structure may be further combined into multi-modal model control structure. Each model control structure may be weighted prior to being combined. The multi-modal weight may be based on the correlation of each model control structure to the other model control structures.

A model control structure with a high correlation with other model control structures may be weighted lower than a model control structure with a low correlation with other model control structures. The correlation, and thus the multi-modal weights, may be pre-determined based on operating the model control structures with training audio content.

In other embodiments, new DNN/RNN component 2812 and new CNN/RNN component 2806 may be utilized. These new DNN/RNN component 2812 and new CNN/RNN component 2806 may be similarly weighted by the transformation component 2708 to generate a multi-modal model control structure, where components with higher correlations to other components are weighted less than those with lower correlations to other components. The correlation, and thus the multi-modal weights, may be pre-determined based on operating the components with training audio content.

Audio analysis system 3100 may be operated in accordance with the processes describe in FIG. 33 and FIG. 34.

Figure 32:
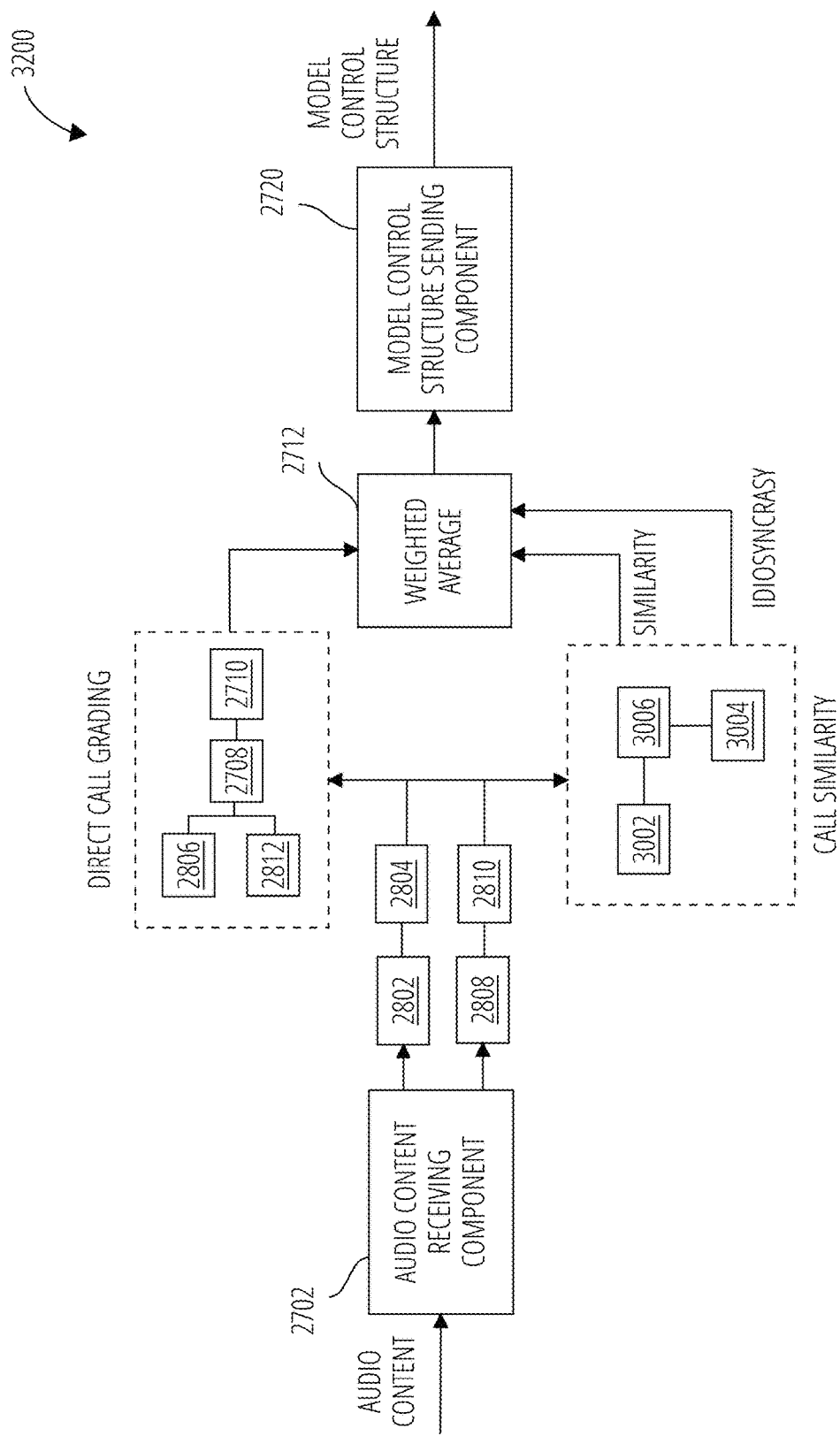
FIG. 32 depicts an embodiment of an audio analysis system 3200.

Referring to FIG. 32, the audio analysis system 3200 comprises an audio content receiving component 2702, a transformation component 2708, a model control structure generating component 2710, a weighting component 2712, a model control structure sending component 2720, a speech recognition engine component 2808, a word vectorization and embedding component 2810, a DNN/RNN component 2812, a signal conditioning component 2802, an audio spectral features component 2804, a CNN/RNN component 2806, a similarity matrix component 3002, a one or more stored audio content files 3004, and a distance function generating component 3006.

The audio content receiving component 2702 receives the audio content and sends the audio content to the speech recognition engine component 2808 and the signal conditioning component 2802.

The speech recognition engine component 2808, the word vectorization and embedding component 2810, the signal conditioning component 2802, and the audio spectral features component 2804 process the audio content and send to the direct call grading components (i.e., the DNN/RNN component 2812, the CNN/RNN component 2806, the transformation component 2708, and the model control structure generating component 2710) and the call similarity components (i.e., the similarity matrix component 3002, the one or more stored audio content files 3004, and the distance function generating component 3006).

The direct call grading components generate a multi-modal model control structure and send the multi-modal model control structure to the weighting component 2712.

The call similarity components generate a predictive metric control. The predictive metric control may comprise a measure of similarity and idiosyncrasy of the audio content. The predictive metric control is sent to the weighting component 2712.

The weighting component 2712 generates a weighted model control structure from the multi-modal model control structure and the predictive metric control and sends the weighted model control structure to the model control structure sending component 2720.

The model control structure sending component 2720 generates a model control structure. The model control structure may be applied as a feedback control to influence the creation of future audio records.

The audio analysis system 3200 may be operated in accordance with the processes describe in FIG. 33 and FIG. 34.

Referring to FIG. 33, the the audio analysis process 3300 receives audio content (block 3302). The speech semantic content is identified from the audio content (block 3304). The speech vocal content is identified from the audio content (block 3306). The combined message content id determined (block 3308). The combined message content is a transformation of the speech semantic content and the speech vocal content. The model control structure is determined from the combined message content (block 3310). The model control structure is applied as a feedback control to influence the creation of future audio records (block 3312). The audio analysis process 3300 then ends (done block 3314).

The audio analysis process 3300 receives audio signals and generates controls to drive the machine state of one or more machines. The model control structure may be a grade of the audio content, the one or more machines comprising a machine display, the machine display altered to display the grade.

The audio analysis process 3300 may perform a subroutine comprising determining the similar audio content, the similar audio content selected from one or more stored audio content files by comparing the audio content to the one or more stored audio content files; extracting a predictive metric control from the similar audio content; determining a weighted model control structure by combining the predictive metric control with the model control structure; and sending the weighted model control structure to affect the machine state of the one or more machines. During determining the similar audio content from the one or more stored audio content files, a tree structure may be utilized to reduce the number of comparisons between the audio content and the one or more stored audio content files. The tree structure may comprise a indication of the similarity among the one or more stored audio content files. As the audio content is compared to one of the one or more stored audio content files, the remaining one or more stored audio content files are filtered based on their relationship to the one compared to the audio content. The other one or more stored audio content files may be filtered if the comparison indicates similarity and the relationship indicates dissimilarity or the comparison indicates dissimilarity and the relationship indicates similarity. The unfiltered one or more stored audio content files may be compared with the audio content or may be further filtered based on further similarity and relationships. Additionally, other data culling techniques may be utilized. The subroutine may be performed for all data sets of one or more stored audio content files. The subroutine may also be performed for data sets below a pre-determined content files size. The subroutine may also determine the audio content to be idiosyncratic audio content and performing the other steps in response to the audio content being idiosyncratic audio content. The audio content may be compared to a pre-determined list of idiosyncratic terms comprising unusual words or phrases or other noteworthy characteristics, which if detected would activate the subroutine.

The audio analysis process 3300 may be operated multiple times. After each operation, a confidence value may be calculated that associated with the grade for each portion of the audio content (e.g., for each second). Each operation of the audio analysis process 3300 on the audio content may be averaged with the previous operations of the audio analysis process 3300 on the audio content. Once the confidence value is greater than a pre-determined threshold value, the audio analysis process 3300 is not operated on the audio content. The output controls may operate a machine display to display the plurality of grades for each of a plurality of segments of the audio content. The audio analysis process 3300 may then determine the speech semantic content and the speech vocal content associated with a change in the grade. The audio analysis process 3300 may determine those that exceed a threshold value of change.

Referring to FIG. 34, the audio analysis process 3400 receives the audio content (block 3402). The similar audio content is determined (block 3404). The similar audio content is selected from one or more stored audio content files by comparing the audio content to the one or more stored audio content files. A predictive metric control is extracted from the similar audio content (block 3406). The predictive metric control is sent as a feedback control to influence the creation of future audio records (block 3408). The audio analysis process 3400 ends (done block 3410).

The audio analysis process 3400 receives audio signals and generates controls to affect the machine state of one or more machines. The predictive metric control may be a grade of the audio content, the one or more machines comprising a machine display, the machine display altered to display the grade.

During determining the similar audio content from the one or more stored audio content files, the audio analysis process 3400 may utilize a tree structure to reduce the number of comparisons between the audio content and the one or more stored audio content files. The tree structure may comprise a indication of the similarity among the one or more stored audio content files. As the audio content is compared to one of the one or more stored audio content files, the remaining one or more stored audio content files are filtered based on their relationship to the one compared to the audio content. The other one or more stored audio content files may be filtered if the comparison indicates similarity and the relationship indicates dissimilarity or the comparison indicates dissimilarity and the relationship indicates similarity. The unfiltered one or more stored audio content files may be compared with the audio content or may be further filtered based on further similarity and relationships. Additionally, other data culling techniques may be utilized.

The audio analysis process 3400 may be performed for all data sets of one or more stored audio content files. The audio analysis process 3400 may also be performed for data sets below a pre-determined content files size. The audio analysis process 3400 may also determine the audio content to be idiosyncratic audio content and performing the other steps in response to the audio content being idiosyncratic audio content. The audio content may be compared to a pre-determined list of idiosyncratic terms comprising unusual words or phrases or other noteworthy characteristics, which if detected would activate the subroutine.

The audio analysis process 3400 may be operated multiple times. After each operation, a confidence value may be calculated that associated with the grade for each of a plurality of segments of the audio content (e.g., for each second). Each operation of the audio analysis process 3400 on the audio content may be averaged with the previous operations of the audio analysis process 3400 on the audio content. Once the confidence value is greater than a pre-determined threshold value, the audio analysis process 3400 is not operated on the audio content. The output controls may operate a machine display to display the plurality of grades for each of a plurality of segments of the audio content. The audio analysis process 3400 may then determine the speech semantic content and the speech vocal content associated with a change in the grade. The audio analysis process 3400 may determine those that exceed a threshold value of change.

Figure 35:
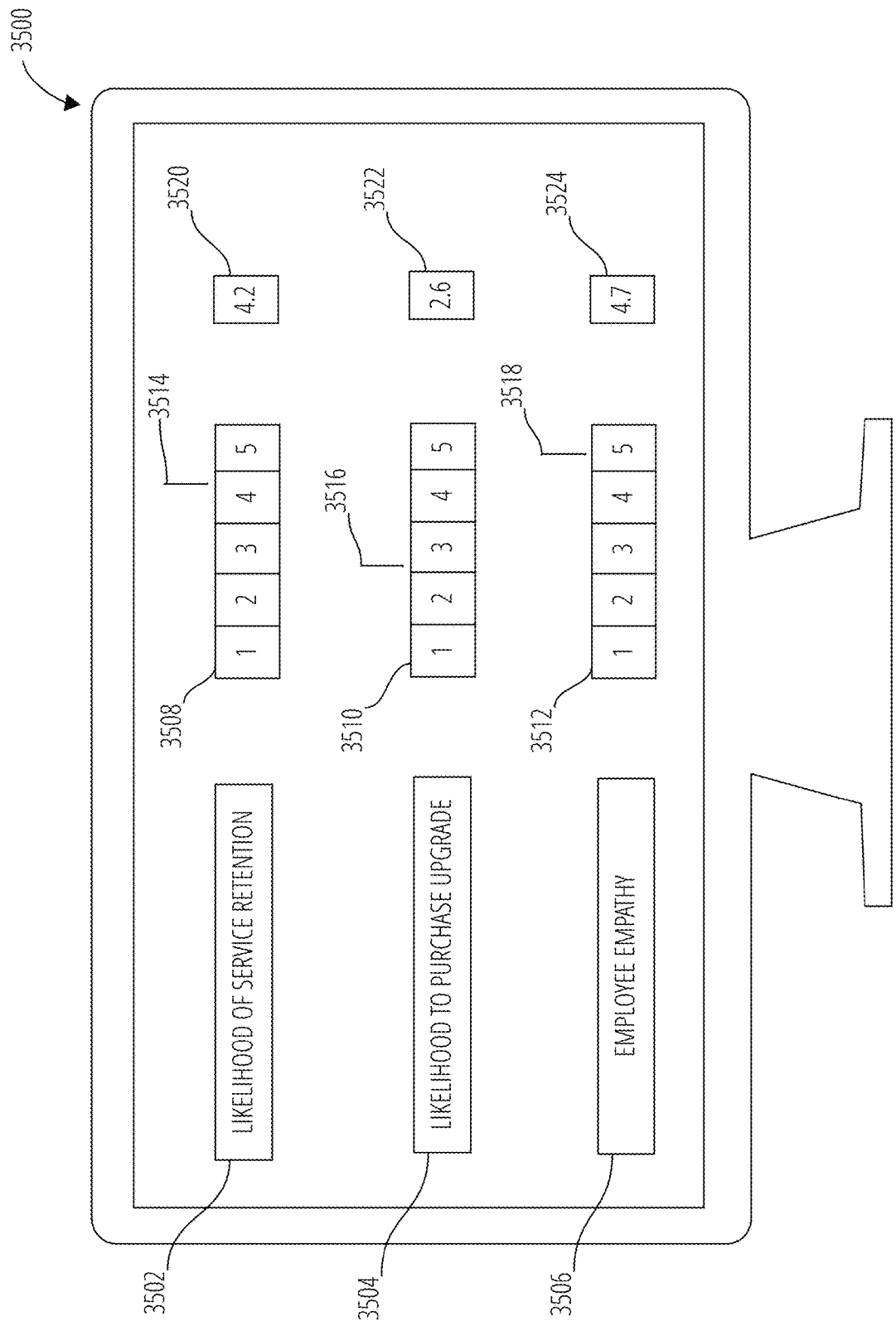
FIG. 35 depicts an embodiment of an altered machine display 3500.

Referring to FIG. 35, the altered machine display 3500 comprises a first metric 3502, a second metric 3504, a third metric 3506, a first scale 3508, a second scale 3510, a third scale 3512, a first grade indication 3514, a second grade indication 3516, a third grade indication 3518, a first grade 3520, a second grade 3522, and a third grade 3524.

The altered machine display 3500 receives a model control structure (or weighted model control structure) and is altered to display one or more grades (i.e., the first grade 3520, the second grade 3522, and the third grade 3524).

The first metric 3502, the second metric 3504, and the third metric 3506 indicate what the model control structure is measuring. The first scale 3508, the second scale 3510, and the third scale 3512 indicate the range of the grades. The scale may be 1-5, a percentage, a binary "yes or no", etc. The first grade indication 3514, the second grade indication 3516, and the third grade indication 3518 depict where the grade is located on the respective scale. The first grade 3520, the second grade 3522, and the third grade 3524 depict the output of the audio analysis system 2700 based on an audio content.

Figure 36:
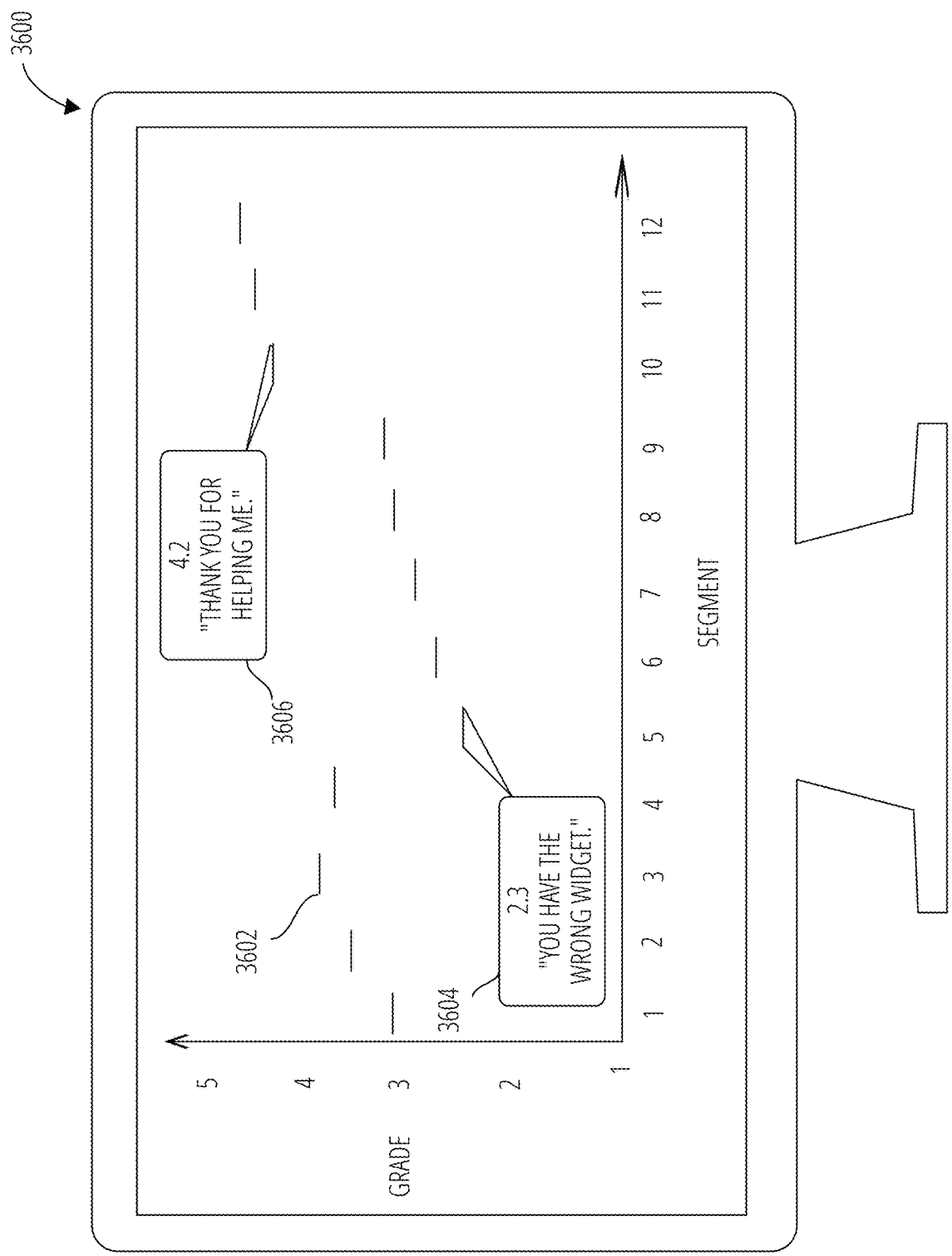
FIG. 36 depicts an embodiment of an altered machine display 3600.

Referring to FIG. 36, the altered machine display 3600 comprises a grade indication 3602, a fifth segment detail 3604, and a tenth segment detail 3606.

The altered machine display 3600 depicts a plurality of grades associated with a plurality of segments of an audio content. Each segment may be a time interval of the audio content, and each time interval may have the same or different duration. The grade indication 3602 shows the grade for each segment. The fifth segment detail 3604 and the tenth segment detail 3606 may be displayed either when activated by an input from an input device, such as a computer mouse, touch screen, audio control, etc. The fifth segment detail 3604 and the tenth segment detail 3606 may be automatically display in response to the change in the grade being greater than a pre-determined grade threshold value. The fifth segment detail 3604 and the tenth segment detail 3606 may depict the grade (e.g., 2.3 and 4.2, respectively) and semantic content associated with the segment (e.g., "You have the wrong widget." and "Thank you for helping me.", respectively). Other speech semantic or vocal content may be displayed.

Software Implementations

The systems disclosed herein, or particular components thereof, may in some embodiments be implemented as software comprising instructions executed on one or more programmable device. By way of example, components of the disclosed systems may be implemented as an application, an app, drivers, or services. In one particular embodiment, the system is implemented as a service that executes as one or more processes, modules, subroutines, or tasks on a server device so as to provide the described capabilities to one or more client devices over a network. However the system need not necessarily be accessed over a network and could, in some embodiments, be implemented by one or more app or applications on a single device or distributed between a mobile device and a computer, for example.

In a particular embodiment, the call flow and node components previously described are implemented within and by services of a cloud computer system.

Figure 37:
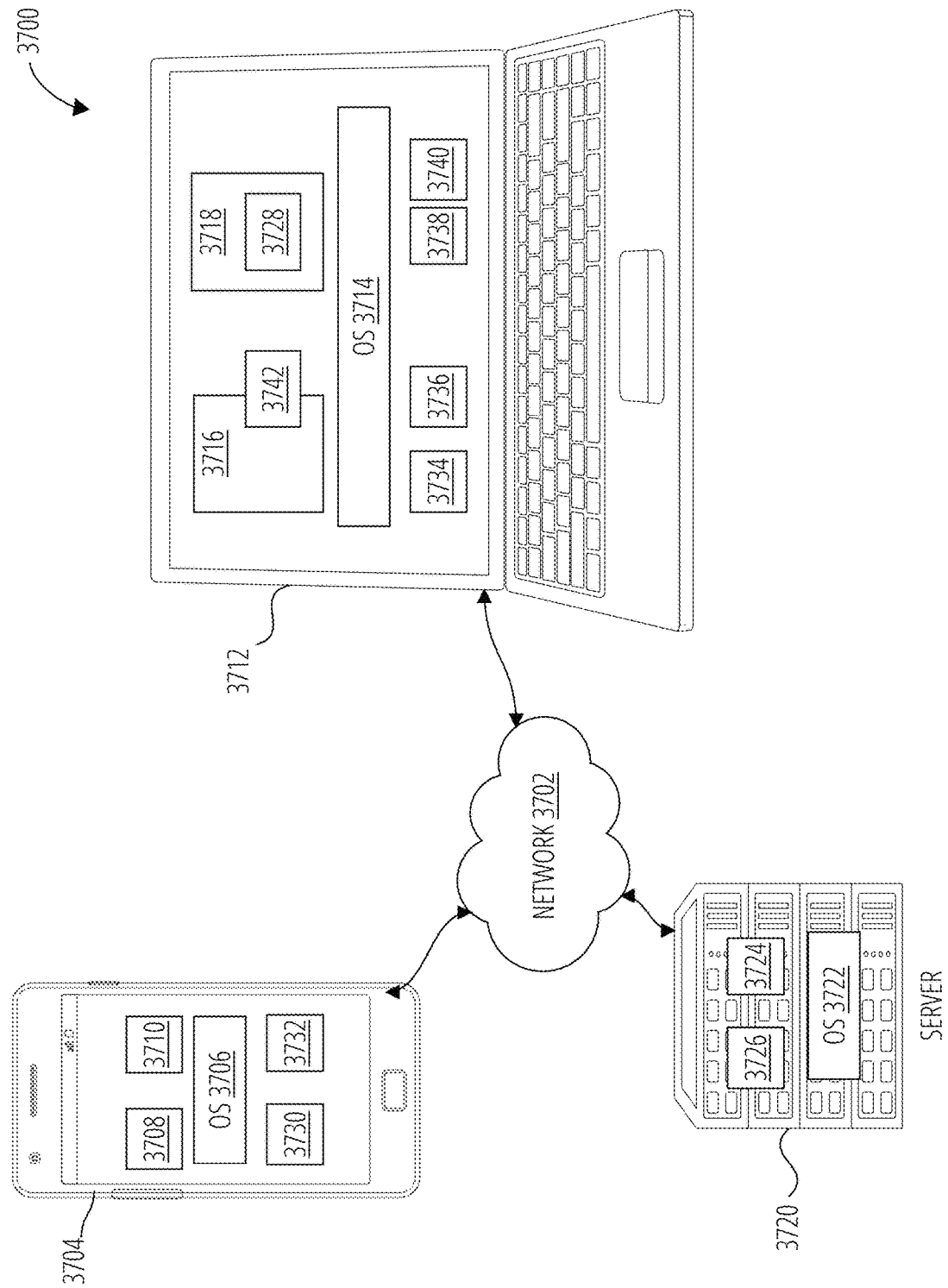
FIG. 37 depicts a client server network configuration 3700 for implementing aspects of the systems disclosed herein, in accordance with one embodiment.

Referring to FIG. 37, a client server network configuration 3700 depicts various computer hardware devices and software modules coupled by a network 3702 in one embodiment. Each device includes a native operating system, typically pre-installed on its non-volatile RAM, and a variety of software applications or apps for performing various functions.

The mobile programmable device 3704 comprises a native operating system 3706 and various apps (e.g., app 3708 and app 3710). A computer 3712 also includes an operating system 3714 that may include one or more library of native routines to run executable software on that device. The computer 3712 also includes various executable applications (e.g., application 3716 and application 3718). The mobile programmable device 3704 and computer 3712 are configured as clients on the network 3702. A server 3720 is also provided and includes an operating system 3722 with native routines specific to providing a service (e.g., service 3724 and service 3726) available to the networked clients in this configuration.

As is well known in the art, an application, an app, or a service may be created by first writing computer code to form a computer program, which typically comprises one or more computer code sections or modules. Computer code may comprise instructions in many forms, including source code, assembly code, object code, executable code, and machine language. Computer programs often implement mathematical functions or algorithms and may implement or utilize one or more application program interfaces.

A compiler is typically used to transform source code into object code and thereafter a linker combines object code files into an executable application, recognized by those skilled in the art as an "executable". The distinct file comprising the executable would then be available for use by the computer 3712, mobile programmable device 3704, and/or server 3720. Any of these devices may employ a loader to place the executable and any associated library in memory for execution. The operating system executes the program by passing control to the loaded program code, creating a task or process. An alternate means of executing an application or app involves the use of an interpreter (e.g., interpreter 3728).

In addition to executing applications ("apps") and services, the operating system is also typically employed to execute drivers to perform common tasks such as connecting to third-party hardware devices (e.g., printers, displays, input devices), storing data, interpreting commands, and extending the capabilities of applications. For example, a driver 3730 or driver 3732 on the mobile programmable device 3704 or computer 3712 (e.g., driver 3734 and driver 3736) might enable wireless headphones to be used for audio output(s) and a camera to be used for video inputs. Any of the devices may read and write data from and to files (e.g., file 3738 or file 3740) and applications or apps may utilize one or more plug-in (e.g., plug-in 3742) to extend their capabilities (e.g., to encode or decode video files).

The network 3702 in the client server network configuration 3700 can be of a type understood by those skilled in the art, including a Local Area Network (LAN), Wide Area Network (WAN), Transmission Communication Protocol/Internet Protocol (TCP/IP) network, and so forth. These protocols used by the network 3702 dictate the mechanisms by which data is exchanged between devices.

Machine Embodiments

Figure 38:
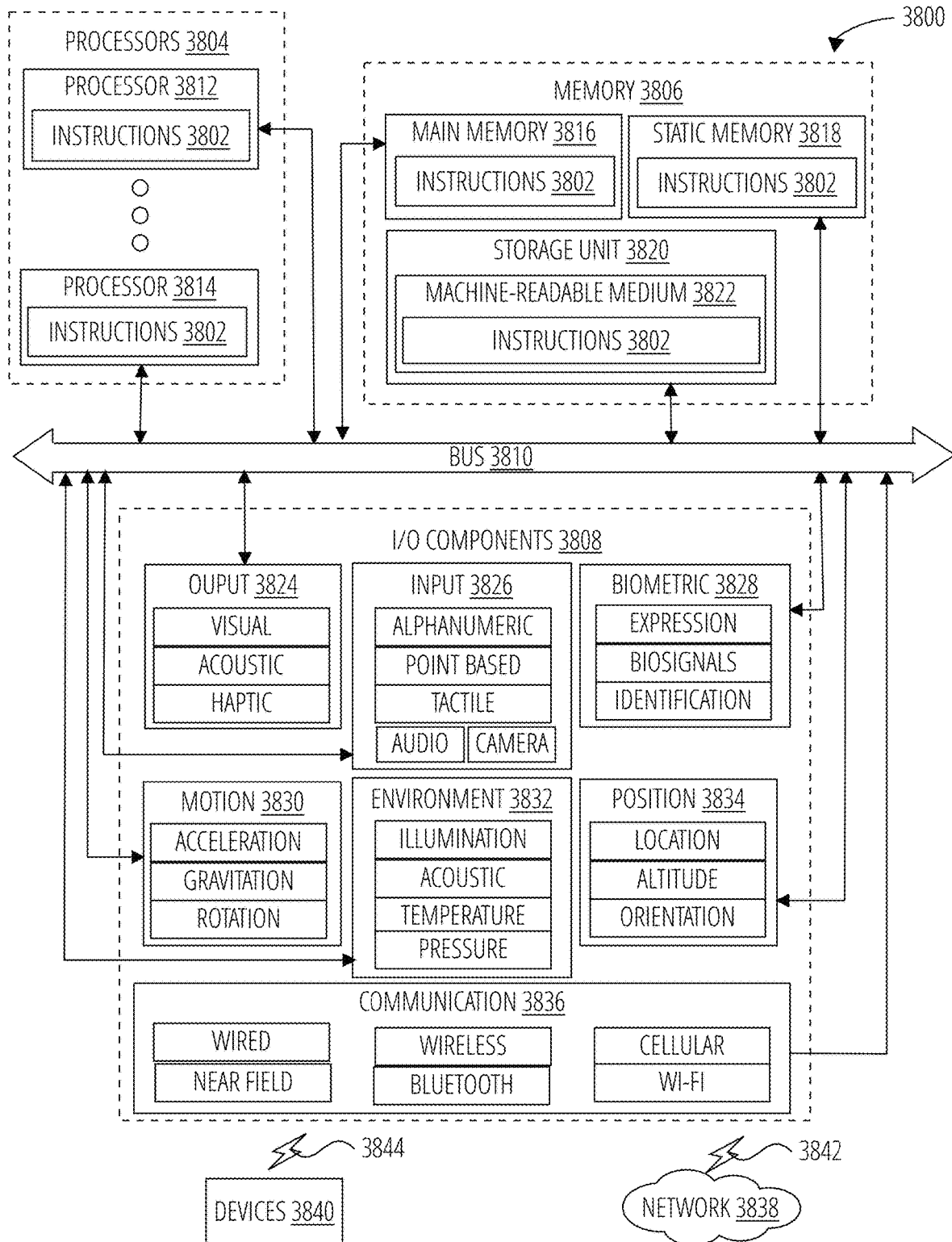
FIG. 38 depicts a machine 3800 in the form of a computer system within which a set of instructions may be executed for causing the machine to perform any one or more of the methodologies discussed herein, according to an example embodiment.

FIG. 38 depicts a diagrammatic representation of a machine 3800 in the form of a computer system within which logic may be implemented to cause the machine to perform any one or more of the functions or methods disclosed herein, according to an example embodiment.

Specifically, FIG. 38 depicts a machine 3800 comprising instructions 3802 (e.g., a program, an application, an applet, an app, or other executable code) for causing the machine 3800 to perform any one or more of the functions or methods discussed herein. For example the instructions 3802 may cause the machine 3800 to implement the call flow control structures 1400, call flow control nodes 1500, call prioritization process 1800, and particular call control nodes (queue node configuration 1600, bot node configuration 1700 etc.). The instructions 3802 configure a general, non-programmed machine into a particular machine 3800 programmed to carry out said functions and/or methods.

In alternative embodiments, the machine 3800 operates as a standalone device or may be coupled (e.g., networked) to other machines. In a networked deployment, the machine 3800 may operate in the capacity of a server machine or a client machine in a server-client network environment, or as a peer machine in a peer-to-peer (or distributed) network environment. The machine 3800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 3802, sequentially or otherwise, that specify actions to be taken by the machine 3800. Further, while only a single machine 3800 is depicted, the term "machine" shall also be taken to include a collection of machines that individually or jointly execute the instructions 3802 to perform any one or more of the methodologies or subsets thereof discussed herein.

The machine 3800 may include processors 3804, memory 3806, and I/O components 3808, which may be configured to communicate with each other such as via one or more bus 3810. In an example embodiment, the processors 3804 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, one or more processor (e.g., processor 3812 and processor 3814) to execute the instructions 3802. The term "processor" is intended to include multi-core processors that may comprise two or more independent processors (sometimes referred to as "cores") that may execute instructions contemporaneously. Although FIG. 38 depicts multiple processors 3804, the machine 3800 may include a single processor with a single core, a single processor with multiple cores (e.g., a multi-core processor), multiple processors with a single core, multiple processors with multiples cores, or any combination thereof.

The memory 3806 may include one or more of a main memory 3816, a static memory 3818, and a storage unit 3820, each accessible to the processors 3804 such as via the bus 3810. The main memory 3816, the static memory 3818, and storage unit 3820 may be utilized, individually or in combination, to store the instructions 3802 embodying any one or more of the functionality described herein. The instructions 3802 may reside, completely or partially, within the main memory 3816, within the static memory 3818, within a machine-readable medium 3822 within the storage unit 3820, within at least one of the processors 3804 (e.g., within the processor's cache memory), or any suitable combination thereof, during execution thereof by the machine 3800.

The I/O components 3808 may include a wide variety of components to receive input, provide output, produce output, transmit information, exchange information, capture measurements, and so on. The specific I/O components 3808 that are included in a particular machine will depend on the type of machine. For example, portable machines such as mobile phones will likely include a touch input device or other such input mechanisms, while a headless server machine will likely not include such a touch input device. It will be appreciated that the I/O components 3808 may include many other components that are not shown in FIG. 38. The I/O components 3808 are grouped according to functionality merely for simplifying the following discussion and the grouping is in no way limiting. In various example embodiments, the I/O components 3808 may include output components 3824 and input components 3826. The output components 3824 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 3826 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), one or more cameras for capturing still images and video, and the like.

In further example embodiments, the I/O components 3808 may include biometric components 3828, motion components 3830, environmental components 3832, or position components 3834, among a wide array of possibilities. For example, the biometric components 3828 may include components to detect expressions (e.g., hand expressions, facial expressions, vocal expressions, body gestures, or eye tracking), measure bio-signals (e.g., blood pressure, heart rate, body temperature, perspiration, or brain waves), identify a person (e.g., voice identification, retinal identification, facial identification, fingerprint identification, or electroencephalogram-based identification), and the like. The motion components 3830 may include acceleration sensor components (e.g., accelerometer), gravitation sensor components, rotation sensor components (e.g., gyroscope), and so forth. The environmental components 3832 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 3834 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 3808 may include communication components 3836 operable to couple the machine 3800 to a network 3838 or devices 3840 via a coupling 3842 and a coupling 3844, respectively. For example, the communication components 3836 may include a network interface component or another suitable device to interface with the network 3838. In further examples, the communication components 3836 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 3840 may be another machine or any of a wide variety of peripheral devices (e.g., a peripheral device coupled via a USB).

Moreover, the communication components 3836 may detect identifiers or include components operable to detect identifiers. For example, the communication components 3836 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 3836, such as location via Internet Protocol (IP) geolocation, location via Wi-Fi® signal triangulation, location via detecting an NFC beacon signal that may indicate a particular location, and so forth.

Instruction and Data Storage Medium Embodiments

The various memories (i.e., memory 3806, main memory 3816, static memory 3818, and/or memory of the processors 3804) and/or storage unit 3820 may store one or more sets of instructions and data structures (e.g., software) embodying or utilized by any one or more of the methodologies or functions described herein. These instructions (e.g., the instructions 3802), when executed by processors 3804, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors and internal or external to computer systems. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such intangible media, at least some of which are covered under the term "signal medium" discussed below.

Some aspects of the described subject matter may in some embodiments be implemented as computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular data structures in memory. The subject matter of this application may be practiced in a variety of system configurations, including hand-held devices, consumer electronics, general-purpose computers, more specialty computing devices, etc. The subject matter may also be practiced in distributed computing environments where tasks are performed by remote-processing devices that are linked through a communications network.

Communication Network Embodiments

In various example embodiments, one or more portions of the network 3838 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 3838 or a portion of the network 3838 may include a wireless or cellular network, and the coupling 3842 may be a Code Division Multiple Access (CDMA) connection, a Global System for Mobile communications (GSM) connection, or another type of cellular or wireless coupling. In this example, the coupling 3842 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 3802 and/or data generated by or received and processed by the instructions 3802 may be transmitted or received over the network 3838 using a transmission medium via a network interface device (e.g., a network interface component included in the communication components 3836) and utilizing any one of a number of well-known transfer protocols (e.g., hypertext transfer protocol (HTTP)). Similarly, the instructions 3802 may be transmitted or received using a transmission medium via the coupling 3844 (e.g., a peer-to-peer coupling) to the devices 3840. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 3802 for execution by the machine 3800, and/or data generated by execution of the instructions 3802, and/or data to be operated on during execution of the instructions 3802, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

LISTING OF DRAWING ELEMENTS

100 communication system
102 call processing system
104 audio signal processor
106 natural language processor
108 heuristic algorithms
110 weights
112 machine learning models
114 learning function
116 GSAT algorithm
118 templates
120 call processing control logic
122 automated voice attendant
124 scorecard display interface
126 alert generator
128 agents
130 call history repository
202 condition settings
204 machine learning models
206 learning function
208 threshold detector
300 call flow process
302 block
304 block
306 block
308 block
310 block
312 block
314 block
316 block
400 alert generation process
402 block
404 block
406 block
408 block
410 block
412 block
414 block
500 Gaussian cumulative distribution function
600 renormalized metric control
700 time series graph
800 composite histogram display
902 scorecard display interface
904 interactive machine display
906 metric values
908 interval selection control
910 target control
912 performance history
914 metric selection control
916 visualization selection controls
918 performance feed
920 event selection control
922 target list
924 metric selection control 926 target list
928 team comparison control
930 site comparison control
932 drill down view activation control
934 coaching examples
936 coaching articles
1000 comparative visualization display
1100 categorical line chart display
1200 color coded distribution displays
1300 call processing system
1302 telephony carrier network
1304 call center
1306 external endpoint
1308 external endpoint
1310 call flow
1312 call flow
1314 call flow
1316 analog handset
1318 computing device
1320 mobile phone
1322 communication interface
1400 call flow control structure
1402 call flow graph
1404 generic node attributes
1406 specific node attributes
1408 nodes
1410 edges
1500 call flow control nodes
1502 queue node
1504 bot node
1506 ender node
1508 call flow node
1510 FIFO
1512 FIFO
1514 FIFO
1600 queue node configuration
1602 queue node
1604 call
1606 outcome routing map
1608 call classification system
1610 router
1612 human agent
1614 implicit tags
1616 slider
1618 call queue
1620 prioritizer
1622 S model
1624 failsafe
1626 priority
1628 clear tags
1630 output format settings
1700 bot node configuration
1702 bot node
1704 outcome routing map
1706 form
1708 call
1710 router
1712 automated attendant
1714 call queue
1800 call prioritization process
1802 block
1804 block
1806 block
1900 call flow
1902 inlet node
1904 bot node (AVA)
1906 recorder node (leave a message)
1908 queue node (priority calls)
1910 queue node (sales calls)
1912 queue node (support calls)
1914 bot node (survey)
1916 hangup node (survey)
1918 communication address
1920 hosted script node
2000 call flow control interface
2100 call flow
2102 inlet node
2104 bot node (front desk)
2106 recorder node (file a complaint)
2108 queue node (technical support)
2110 queue node (manage bookings)
2112 hangup node
2200 call flow
2202 inlet node
2204 bot node (front desk)
2206 outlet node (academic dean)
2208 outlet node (academic support)
2210 queue node (admissions)
2212 hangup node
2214 outlet node (advancement services)
2216 queue node (alumni support)
2218 queue node (anthro dept)
2220 queue node (catch all)
2222 hangup node
2300 call flow
2302 inlet node
2304 bot node (front desk)
2306 recorder node(guest feedback)
2308 bot node (bookings)
2310 queue node (hotel front desk)
2312 hangup node
2314 hangup node
2400 call flow
2402 inlet node
2404 bot node (form fill)
2406 queue node (tire specialists)
2408 hangup node
2500 call flow
2502 inlet node
2504 bot node (front desk)
2506 outlet node (bank)
2508 outlet node (insurance)
2510 proxy setting
2512 inlet node
2514 bot node (front desk)
2516 queue node (billing)
2518 queue node (mortgages)
2520 queue node (credit card)
2522 inlet node
2524 bot node (form fill)
2526 queue node (insurance)
2600 audio environment
2602 first audio provider
2604 second audio provider
2606 third audio provider
2608 fourth audio provider
2610 first audio transmitting device
2612 second audio transmitting device
2614 third audio transmitting device
2616 fourth audio transmitting device
2618 telephone network
2620 internet
2622 server
2624 audio files control memory structure 2626 machine display
2700 audio analysis system
2702 audio content receiving component
2704 speech vocal content identifying component
2706 speech semantic content identifying component
2708 transformation component
2710 model control structure generating component
2712 weighting component
2714 idiosyncratic audio content identifying component
2716 similar audio content identifying component
2718 predictive metric control extraction component
2720 model control structure sending component
2800 audio analysis system
2802 signal conditioning component
2804 audio spectral features component
2806 CNN/RNN component
2808 speech recognition engine component
2810 word vectorization and embedding component
2812 DNN/RNN component
2900 audio analysis system
2902 call grading training component
3000 audio analysis system
3002 similarity matrix component
3004 one or more stored audio content files
3006 distance function generating component
3100 audio analysis system
3102 new model control structure generating component
3104 new model control structure sending component
3200 audio analysis system
3300 audio analysis process
3302 block
3304 block
3306 block
3308 block
3310 block
3312 block
3314 done block
3400 audio analysis process
3402 block
3404 block
3406 block
3408 block
3410 done block
3500 altered machine display
3502 first metric
3504 second metric
3506 third metric
3508 first scale
3510 second scale
3512 third scale
3514 first grade indication
3516 second grade indication
3518 third grade indication
3520 first grade
3522 second grade
3524 third grade
3600 altered machine display
3602 grade indication
3604 fifth segment detail
3606 tenth segment detail
3700 client server network configuration
3702 network
3704 mobile programmable device
3706 operating system
3708 app
3710 app
3712 computer
3714 operating system
3716 application
3718 application
3720 server
3722 operating system
3724 service
3726 service
3728 interpreter
3730 driver
3732 driver
3734 driver
3736 driver
3738 file
3740 file
3742 plug-in
3800 machine
3802 instructions
3804 processors
3806 memory
3808 I/O components
3810 bus
3812 processor
3814 processor
3816 main memory
3818 static memory
3820 storage unit
3822 machine-readable medium
3824 output components
3826 input components
3828 biometric components
3830 motion components
3832 environmental components
3834 position components
3836 communication components
3838 network
3840 devices
3842 coupling
3844 coupling "Active call" refers to a call that is in progress and has not yet ended.

"Agent" refers to a system component that monitors the content of calls and responds to that content by taking some action. Agents may be automated (chat bots, automated voice attendants), may be human, or a combination of automation and human (e.g., at ender nodes).

"Algorithm" refers to any set of instructions configured to cause a machine to carry out a particular function or process.

"Anomaly detector" refers to logic that analyzes call features and/or call metrics to identify patterns or values indicative of conditions that are out of a configured normal range (e.g., for one or more particular emotion metrics). This may include idiosyncratic call (e.g., audio) content.

"App" refers to a type of application with limited functionality, most commonly associated with applications executed on mobile devices. Apps tend to have a more limited feature set and simpler user interface than applications as those terms are commonly understood in the art.

"Application" refers to any software that is executed on a device above a level of the operating system. An application will typically be loaded by the operating system for execution and will make function calls to the operating system for lower-level services. An application often has a user interface but this is not always the case. Therefore, the term 'application' includes background processes that execute at a higher level than the operating system.

"Application program interface" refers to instructions implementing entry points and return values to a module.

"Assembly code" refers to a low-level source code language comprising a strong correspondence between the source code statements and machine language instructions. Assembly code is converted into executable code by an assembler. The conversion process is referred to as assembly. Assembly language usually has one statement per machine language instruction, but comments and statements that are assembler directives, macros, and symbolic labels may also be supported.

"Associator" refers to a Correlator (see the definition for Correlator).

"Audio content" refers to a sound signal or recording comprising speech.

"Automated voice attendant" refers to logic that generates audio to a caller to solicit caller actions, and interprets and acts upon caller actions such as spoken words or phrases or tones.

"Call" refers to any communication session conducted over machine networks. Calls can include analog voice calls, digital (e.g., IP) calls, chat sessions, and email conversations.

"Call flow" refers to a collection of linked control structures in a machine system. Communication sessions in the form of audio calls, data calls (e.g., chat) etc. are routed between the control structures (nodes) and for some types of nodes, are queued for processing within the nodes according to a call priority algorithm operated on the queue.

"Call flow node" refers to a call routing or call operation structure in a call flow.

"Call queue" refers to a structure to delay received calls while they await processing.

"Combiner" refers to a logic element that combines two or more inputs into fewer (often a single) output. Example hardware Combiners are arithmetic units (adders, multipliers, etc.), time-division multiplexers, and analog or digital modulators (these may also be implemented is software or firmware). Another type of Combiner builds an association table or structure (e.g., a data structure instance having members set to the input values) in memory for its inputs. For example: val1, val2, val3→Combiner logic→{val1, val2, val3} set.val1=val1; set.val2=val2; set.val3=val3; Other examples of Combiners will be evident to those of skill in the art without undo experimentation.

"Comparator" refers to a logic element that compares two or more inputs to produce one or more outputs that reflects similarity or difference of the inputs. An example of a hardware Comparator is an operational amplifier that outputs a signal indicating whether one input is greater, less than, or about equal to the other. An example software or firmware Comparator is: if (input1==input2) output=val1; else if (input1>input2) output=val2; else output=val3; Many other examples of Comparators will be evident to those of skill in the art, without undo experimentation.

"Compiled computer code" refers to object code or executable code derived by executing a source code compiler and/or subsequent tools such as a linker or loader.

"Compiler" refers to logic that transforms source code from a high-level programming language into object code or in some cases, into executable code.

"Computer code" refers to any of source code, object code, or executable code.

"Computer code section" refers to one or more instructions.

"Computer program" refers to another term for 'application' or 'app'.

"Confidence value" refers to the frequency (i.e., the proportion) of confidence intervals that contain the true value of their corresponding parameter.

"Correlator" refers to a logic element that identifies a configured association between its inputs. One examples of a Correlator is a lookup table (LUT) configured in software or firmware. Correlators may be implemented as relational or relational databases. An example LUT Correlator is: |low_alarm_condition|low_threshold_value|0|safe_condition|safe_lower_bound |safe_upper_bound| |high_alarm_condition|high_threshold_value|0|Generally, a Correlator receives two or more inputs and produces an output indicative of a mutual relationship or connection between the inputs. Examples of Correlators that do not use LUTs include any of a broad class of statistical Correlators that identify dependence between input variables, often the extent to which two input variables have a linear relationship with each other. One commonly used statistical Correlator is one that computes Pearson's product-moment coefficient for two input variables (e.g., two digital or analog input signals). Other well-known Correlators compute a distance correlation, Spearman's rank correlation, a randomized dependence correlation, and Kendall's rank correlation. Many other examples of Correlators will be evident to those of skill in the art, without undo experimentation.

"Driver" refers to low-level logic, typically software, that controls components of a device. Drivers often control the interface between an operating system or application and input/output components or peripherals of a device, for example.

"Executable" refers to a file comprising executable code. If the executable code is not interpreted computer code, a loader is typically used to load the executable for execution by a programmable device.

"Executable code" refers to instructions in a ready-to-execute form by a programmable device. For example, source code instructions in non-interpreted execution environments are not executable code because they must usually first undergo compilation, linking, and loading by the operating system before they have the proper form for execution. Interpreted computer code may be considered executable code because it can be directly applied to a programmable device (an interpreter) for execution, even though the interpreter itself may further transform the interpreted computer code into machine language instructions.

"File" refers to a unitary package for storing, retrieving, and communicating data and/or instructions. A file is distinguished from other types of packaging by having associated management metadata utilized by the operating system to identify, characterize, and access the file.

"Grade" refers to a valuation of an aspect of an audio content. Call metrics are a type of grade.

"Idiosyncratic audio content" refers to audio content that is dissimilar to the content utilized to train a model.

"Inherent queue tag" refers to settings configured in a queue that are automatically applied as tags to calls that enter the queue.

"Instructions" refers to symbols representing commands for execution by a device using a processor, microprocessor, controller, interpreter, or other programmable logic. Broadly, 'instructions' can mean source code, object code, and executable code. 'instructions' herein is also meant to include commands embodied in programmable read-only memories (EPROM) or hard coded into hardware (e.g., 'micro-code') and like implementations wherein the instructions are configured into a machine memory or other hardware component at manufacturing time of a device.

"Interpreted computer code" refers to instructions in a form suitable for execution by an interpreter.

"Interpreter" refers to an interpreter is logic that directly executes instructions written in a source code scripting language, without requiring the instructions to a priori be compiled into machine language. An interpreter translates the instructions into another form, for example into machine language, or into calls to internal functions and/or calls to functions in other software modules.

"Library" refers to a collection of modules organized such that the functionality of all the modules may be included for use by software using references to the library in source code.

"Linker" refers to logic that inputs one or more object code files generated by a compiler or an assembler and combines them into a single executable, library, or other unified object code output. One implementation of a linker directs its output directly to machine memory as executable code (performing the function of a loader as well).

"Loader" refers to logic for loading programs and libraries. The loader is typically implemented by the operating system. A typical loader copies an executable into memory and prepares it for execution by performing certain transformations, such as on memory addresses.

"Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Machine language" refers to instructions in a form that is directly executable by a programmable device without further translation by a compiler, interpreter, or assembler. In digital devices, machine language instructions are typically sequences of ones and zeros.

"Metric control" refers to a signal generated as a metric and in which the metric value affects a type or amount of control applied to a system component, or if control is applied at all (e.g., binary or thresholded metric controls).

"Model control structure" refers to an output from a model for a specific audio content.

"Module" refers to a computer code section having defined entry and exit points. Examples of modules are any software comprising an application program interface, drivers, libraries, functions, and subroutines.

"Multi-modal weight" refers to a value applied to a model when utilized with other models.

"Object code" refers to the computer code output by a compiler or as an intermediate output of an interpreter. Object code often takes the form of machine language or an intermediate language such as register transfer language (RTL).

"Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

"Plug-in" refers to software that adds features to an existing computer program without rebuilding (e.g., changing or re-compiling) the computer program. Plug-ins are commonly used for example with Internet browser applications.

"Plurality of segments" refers to intervals of the audio content, each interval may or may not be equal in duration.

"Portion", in the context of a call, refers to a sub-set (less than all) of the content of the call.

"Predictive metric control" refers to labels and annotations associated with a similar audio content.

"Priority response" refers to actions assigned an elevated priority in a priority hierarchy in a system.

"Process" refers to software that is in the process of being executed on a device.

"Programmable device" refers to any logic (including hardware and software logic) who's operational behavior is configurable with instructions.

"S model" refers to a fitting algorithm that determines one or more match metrics between calls and agents and/or nodes to service the calls. S models may include machine learning capability to improve the accuracy and/or efficiency of matching over time as more calls are processed. Specific S models are described herein, and one of ordinary skill in the art will appreciate that other models known in the art such as Support Vector Machine, perceptrons (neural networks), and statistical models may also be utilized.

"Selector" refers to a logic element that selects one of two or more inputs to its output as determined by one or more selection controls. Examples of hardware Selectors are multiplexers and demultiplexers. An example software or firmware Selector is: if (selection_control==true) output=input1; else output=input2; Many other examples of Selectors will be evident to those of skill in the art, without undo experimentation.

"Service" refers to a process configurable with one or more associated policies for use of the process. Services are commonly invoked on server devices by client devices, usually over a machine communication network such as the Internet. Many instances of a service may execute as different processes, each configured with a different or the same policies, each for a different client.

"Similar audio content" refers to audio content matching other audio content for some metric or vector or other measure of similarity.

"Software" refers to logic implemented as instructions for controlling a programmable device or component of a device (e.g., a programmable processor, controller). Software can be source code, object code, executable code, machine language code. Unless otherwise indicated by context, software shall be understood to mean the embodiment of said code in a machine memory or hardware component, including "firmware" and micro-code.

"Source code" refers to a high-level textual computer language that requires either interpretation or compilation in order to be executed by a device.

"Speech semantic content" refers to words spoken in an audio content.

"Speech vocal content" refers to characteristics, such as speech patterns, cadences, and tone, of an audio content.

"Sub-metric" refers to metrics used to generate other metrics.

"Subroutine" refers to a module configured to perform one or more calculations or other processes. In some contexts the term 'subroutine' refers to a module that does not return a value to the logic that invokes it, whereas a 'function' returns a value. However herein the term 'subroutine' is used synonymously with 'function'.

"Tag" refers to a setting assigned to a call.

"Task" refers to one or more operations that a process performs.

"Template" refers to electronic forms, or configured action-response sequences or algorithms or models.

"Threshold analyzer" refers to logic to analyze metrics to determine if they meet a threshold value or range condition.

Various functional operations described herein may be implemented in logic that is referred to using a noun or noun phrase reflecting said operation or function. For example, an association operation may be carried out by an "Associator" or "Correlator". Likewise, switching may be carried out by a "switch", selection by a "Selector", and so on.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C. § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A system comprising:
   a communication interface configured to receive a call from a telephony carrier network;
   logic to configure a call flow between the communication interface and one or more of an outlet node and a call hangup node, the call flow comprising:
   an inlet node binding a communication address to the call flow;

at least one bot node configured to:
route the call to particular child nodes of the bot node based on particular outcomes of the bot node;
apply one or more tags to the call; and
route the call to the child nodes based on the applied tags;
one or more queue nodes; and
at least one of the queue nodes coupled to one of the outlet node and the call hangup node.

2. A system comprising:
a communication interface configured to receive a call from a telephony carrier network;
logic to configure a call flow between the communication interface and one or more of an outlet node and a call hangup node, the call flow comprising:
an inlet node binding a communication address to the call flow;
at least one bot node;
at least one of the queue nodes coupled to one of the outlet node and the call hangup node; and
one or more of the queue nodes comprising a state forwarding switch to enable or disable propagation of state information from the queue node to a next node in the call flow.

3. The system of claim 2, wherein the queue node is configured to perform state forwarding upon one or both of entry to the queue node and exit from the queue node.

4. The system of claim 2, wherein the outlet node is configured to operate as a proxy to continue generating call analytics after routing of the call from the outlet node.

5. A system comprising:
a communication interface configured to receive a call from a telephony carrier network;
logic to configure a call flow between the communication interface and one or more of an outlet node and a call hangup node, the call flow comprising:
an inlet node binding a communication address to the call flow;
one or more queue nodes; and
at least one of the queue nodes coupled to one of the outlet node and the call hangup node;
wherein the queue node is configured with a control balancing (a) contributions of first-in, first-out priority, and (b) matching of the call to agent attributes, in determining a service priority of calls in the queue node; and
wherein the control sets parameters $\alpha$ and $\beta$ of a service priority algorithm $$M(\alpha,c_i)=\alpha H(c_i)+(1-\alpha)(\beta B(a,c_i)+\varepsilon S(a,c_i))$$

where,
M is a total match score;
H is a hold time of the call;
B is a bootstrap score that compares a similarity of the agent attributes call tags applied to the call;
an S model that computes $P(\neg r|a, c_i)$, a probability the call will not reroute, given the call tags and an agent's historical performance with the call tags;
$\alpha$ is a setting that interpolates between first-in, first-out position of the call in the queue node and influence of the S model;
$\beta$ is a parameter that controls a contribution of the bootstrap score relative to the S model; and
$\varepsilon$ is a setting that enables or disables use of the S model.

6. A method comprising:
configuring a communication interface to receive a call from a telephony carrier network;
configuring a call flow between the communication interface and one or more of an outlet node and a call hangup node, the call flow comprising:
an inlet node binding a communication address to the call flow;
one or more queue nodes; and
at least one of the queue nodes coupled to one of the outlet node and the call hangup node;
wherein the queue node is configured with a control balancing (a) contributions of first-in, first-out priority, and (b) matching of the call to agent attributes, in determining a service priority of calls in the queue node; and
wherein the control sets parameters $\alpha$ and $\beta$ of a service priority algorithm $$M(\alpha,c_i)=\alpha H(c_i)+(1-\alpha)(\beta B(a,c_i)+\varepsilon S(a,c_i))$$

where,
M is a total match score;
H is a hold time of the call;
B is a bootstrap score that compares a similarity of the agent attributes call tags applied to the call;
an S model that computes $P(\neg r|a, c_i)$, a probability the call will not reroute, given the call tags and an agent's historical performance with the call tags;
$\alpha$ is a setting that interpolates between first-in, first-out position of the call in the queue node and influence of the S model;
$\beta$ is a parameter that controls a contribution of the bootstrap score relative to the S model; and
$\varepsilon$ is a setting that enables or disables use of the S model.

7. The method of claim 6, further comprising:
configuring the call flow with at least one bot node; and
configuring the at least one bot node to route the call to particular child nodes of the bot node based on particular outcomes of the bot node.

8. The method of claim 7, further comprising:
applying one or more tags to the call; and
routing the call to the child nodes based on the applied tags.

9. The method of claim 6, wherein one or more of the queue nodes comprises a state forwarding switch to enable or disable propagation of state information from the queue node to a next node in the call flow, and
wherein the queue node is configured to perform state forwarding upon one or both of entry to the queue node and exit from the queue node.

10. The method of claim 9, wherein the outlet node is configured to operate as a proxy to continue generating call analytics after routing of the call from the outlet node.

* * * * *